(12) United States Patent  
Shellhammer et al.

(10) Patent No.: US 7,132,011 B2  
(45) Date of Patent: Nov. 7, 2006

(54) REACTIVE GAS FILTER

(75) Inventors: Carly Shellhammer, Brighton, MA (US); David J. Ruede, Northbridge, MA (US); Jeff Halperin, Arlington, MA (US); John Gaudreau, Chepachet, RI (US); William M. Goodwin, Medway, MA (US)

(73) Assignee: Entegris, Inc., Chaska, MN (US)

( * ) Notice: Subject to any disclaimer, the term of this patent is extended or adjusted under 35 U.S.C. 154(b) by 88 days.

(21) Appl. No.: 10/653,430

(22) Filed: Sep. 2, 2003

(65) Prior Publication Data  
US 2005/0045039 A1 Mar. 3, 2005

(51) Int. Cl.  
*B01D 53/02* (2006.01)

(52) U.S. Cl. .............................. 96/135; 96/138; 96/153; 55/523

(58) Field of Classification Search .................. 96/108, 96/134, 135, 138, 142, 147, 151, 153, 154; 95/901; 55/516, 518, 519, 523  
See application file for complete search history.

(56) References Cited

U.S. PATENT DOCUMENTS

| | | | | |
|---|---|---|---|---|
| 2,593,132 A | * | 4/1952 | Gannon | 96/151 |
| 2,845,138 A | * | 7/1958 | Gageby | 96/151 |
| 3,358,428 A | * | 12/1967 | Mann | 96/151 |
| 3,876,393 A | * | 4/1975 | Kasai et al. | 95/134 |
| 4,297,117 A | * | 10/1981 | Holter et al. | 96/153 |
| 4,683,862 A | * | 8/1987 | Fornuto et al. | 123/520 |
| 4,786,298 A | * | 11/1988 | Billiet et al. | 96/138 |
| 4,999,034 A | * | 3/1991 | Mager et al. | 96/117.5 |
| 5,110,330 A | * | 5/1992 | Loughran | 96/117.5 |
| 5,118,329 A | * | 6/1992 | Kosaka et al. | 95/143 |
| 5,482,536 A | * | 1/1996 | Ngai et al. | 95/131 |
| 5,574,230 A | | 11/1996 | Baugh | 73/863 |
| 5,718,743 A | * | 2/1998 | Donnelly et al. | 96/135 |
| 6,059,859 A | | 5/2000 | Alvarez, Jr. et al. | 95/117 |
| 6,093,237 A | | 7/2000 | Keller et al. | 95/287 |
| 6,096,267 A | | 8/2000 | Kishkovich et al. | 422/52 |
| 6,135,431 A | * | 10/2000 | Muhmel et al. | 261/101 |
| 6,156,089 A | * | 12/2000 | Stemmer et al. | 55/467 |

(Continued)

FOREIGN PATENT DOCUMENTS

FR WO 01/36326 5/2001

(Continued)

OTHER PUBLICATIONS

Copy of International Search Report, 2004.

*Primary Examiner*—Frank M. Lawrence  
(74) *Attorney, Agent, or Firm*—Weingarten, Schurgin, Gagnebin & Lebovici LLP

(57) ABSTRACT

In preferred embodiments, the invention provides a gas filter for a reactive gas used in semiconductor processing tools and processes that are sensitive to molecular contamination. The reactive gas filter of the invention have improved pressure drop and can supply an output gas stream having concentrations of less than about 1 ppbv for both ammonia and sulfur dioxide for an input gas stream with ammonia and sulfur dioxide concentrations, respectively, of no greater than about 10 ppbv and 5 ppbv. In one aspect the invention provides a reactive gas filter with an improved pressure drop that can supply an output gas stream having concentrations of less than about 1 ppbv for both ammonia and sulfur dioxide for an input gas stream with ammonia and sulfur dioxide concentrations, respectively, of no greater than about 10 ppbv and 5 ppbv, using a filter media volume of no greater than about 0.5 liters.

27 Claims, 53 Drawing Sheets

U.S. PATENT DOCUMENTS

| | | | |
|---|---|---|---|
| 6,364,921 B1 | 4/2002 | Raether et al. | 55/302 |
| 6,387,162 B1 | 5/2002 | Kosmider et al. | 95/273 |
| 6,488,746 B1 | 12/2002 | Kosmider et al. | 95/273 |
| 6,503,301 B1* | 1/2003 | Uchino et al. | 96/132 |
| 6,752,853 B1* | 6/2004 | Simpson et al. | 95/143 |
| 2002/0078829 A1* | 6/2002 | Scardino et al. | 96/147 |
| 2002/0178921 A1 | 12/2002 | Kosmider et al. | 95/273 |
| 2003/0113943 A1 | 6/2003 | Kishkovich et al. | 438/14 |
| 2003/0136267 A1* | 7/2003 | Ku | 96/135 |

FOREIGN PATENT DOCUMENTS

| | | |
|---|---|---|
| WO | WO 00/25896 | 5/2000 |
| WO | WO 01/85308 | 11/2001 |
| WO | EP 1 195 188 | 10/2002 |

\* cited by examiner

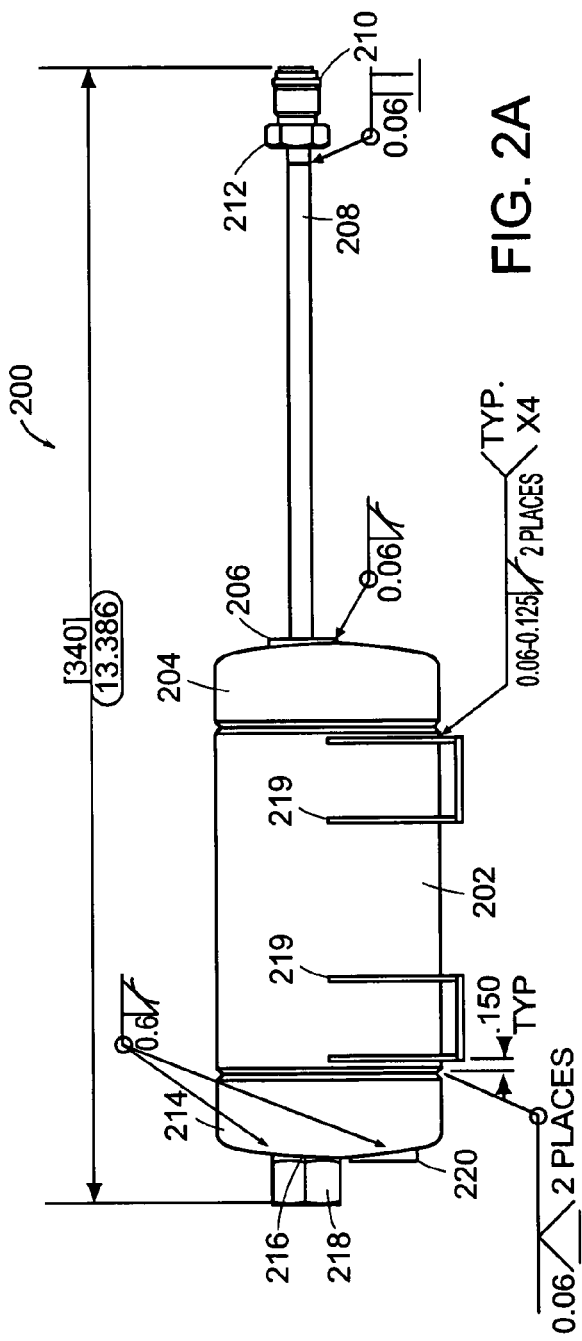
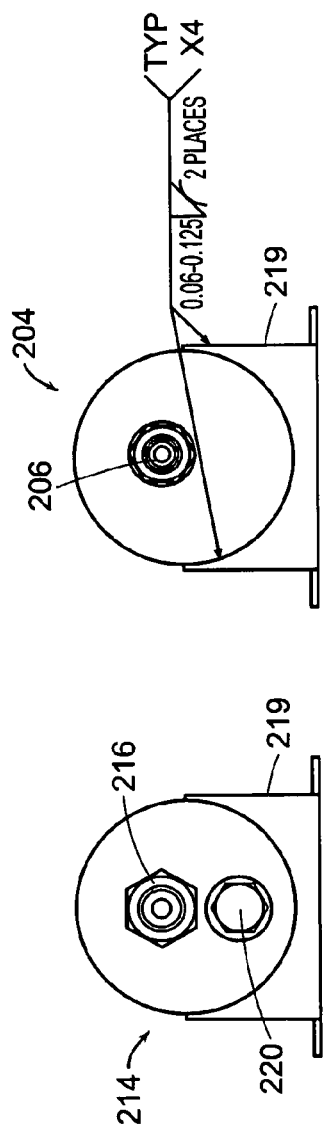
FIG. 2A
FIG. 2C
FIG. 2B

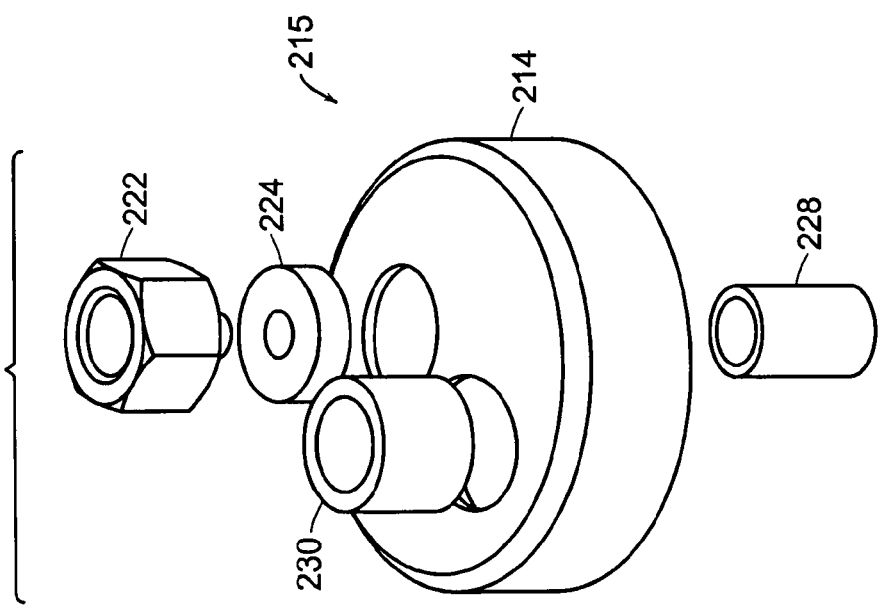
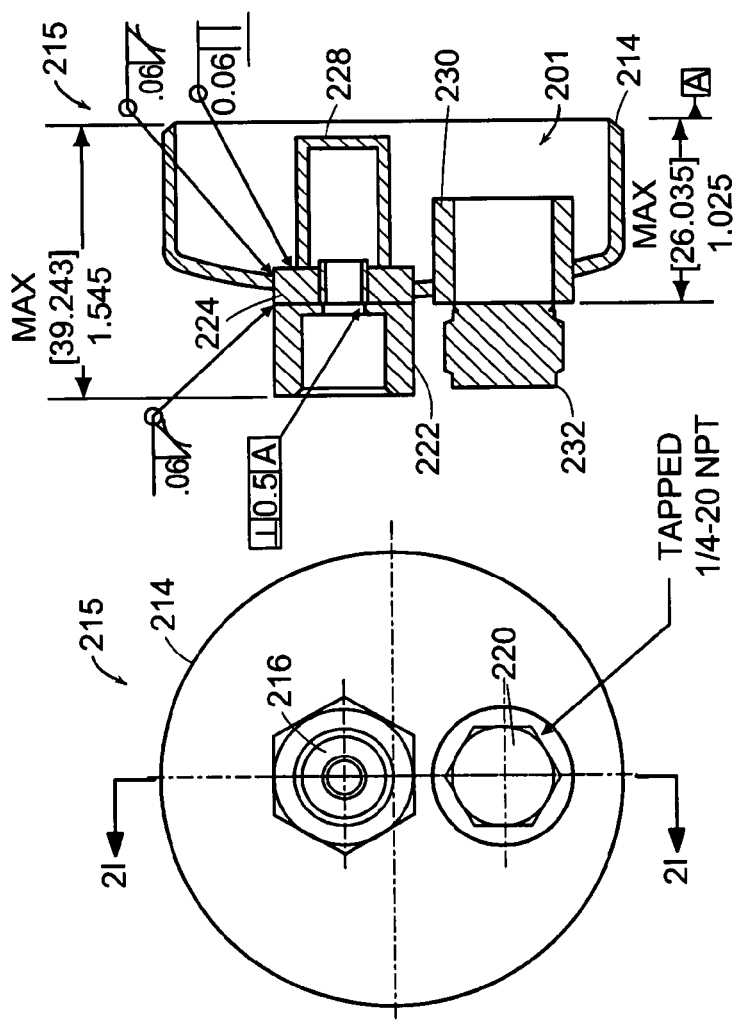

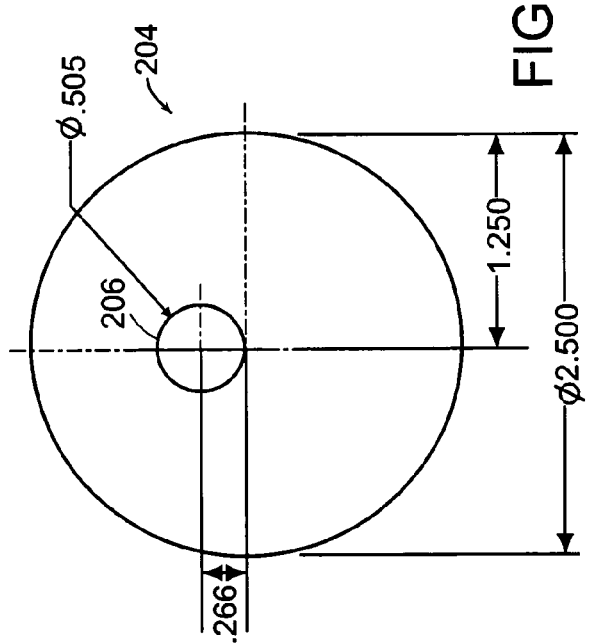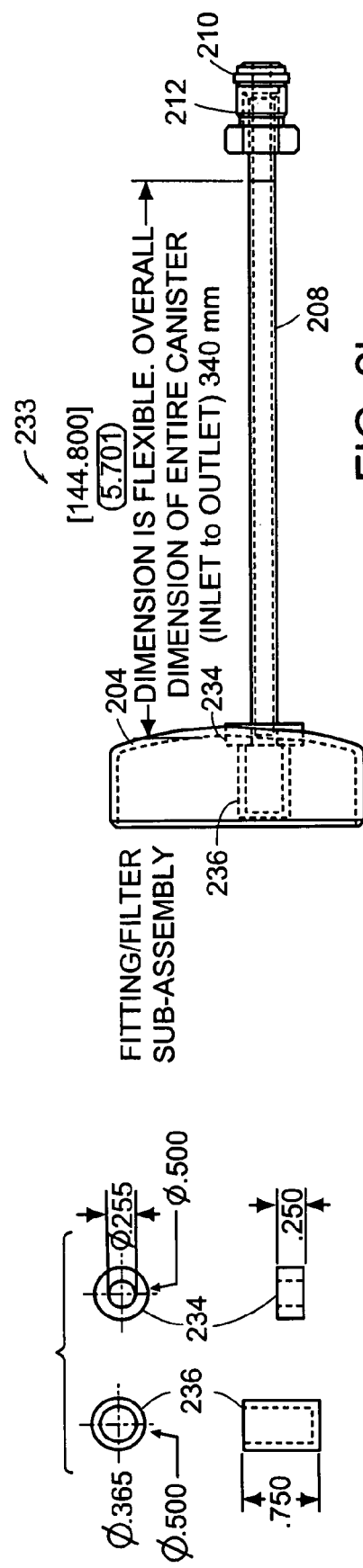

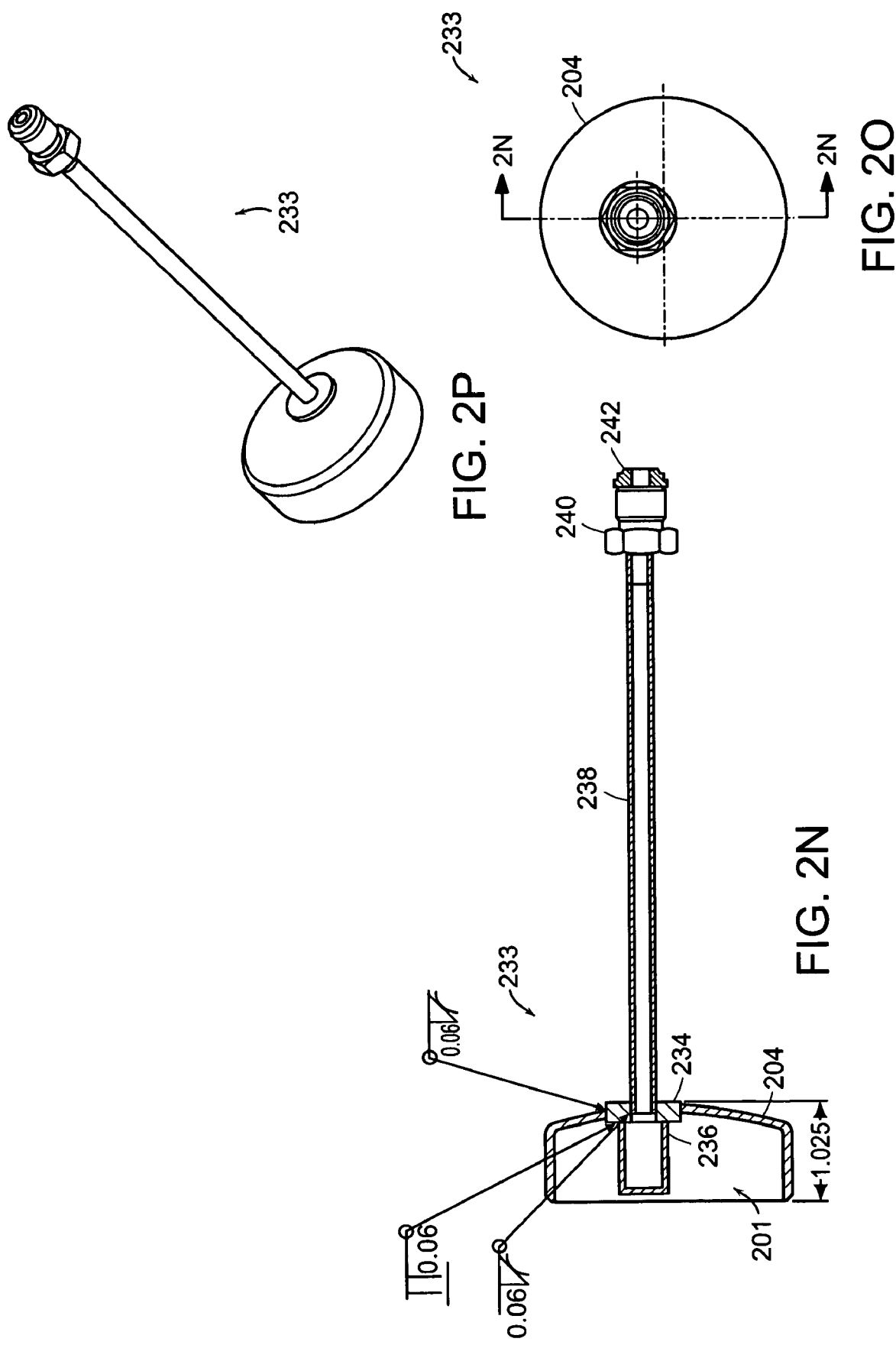

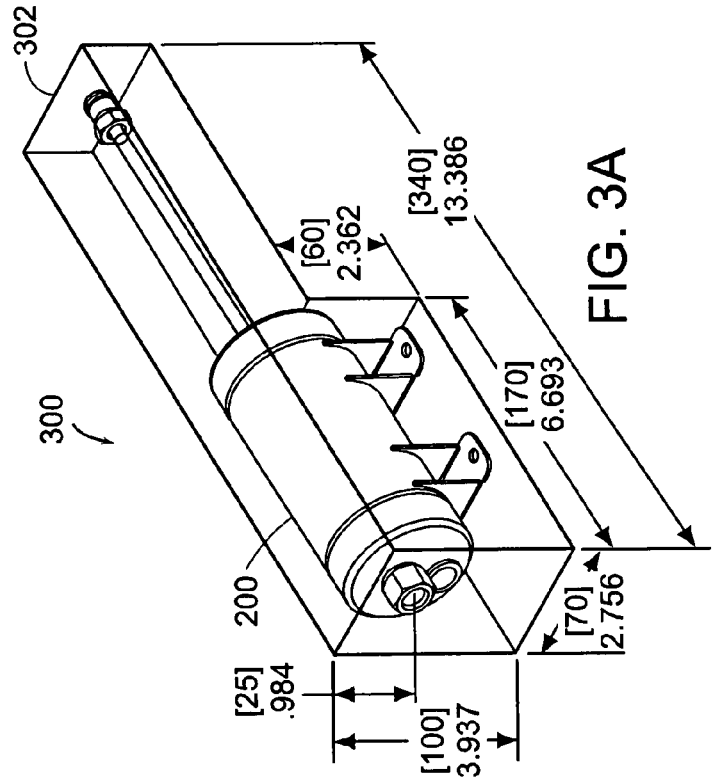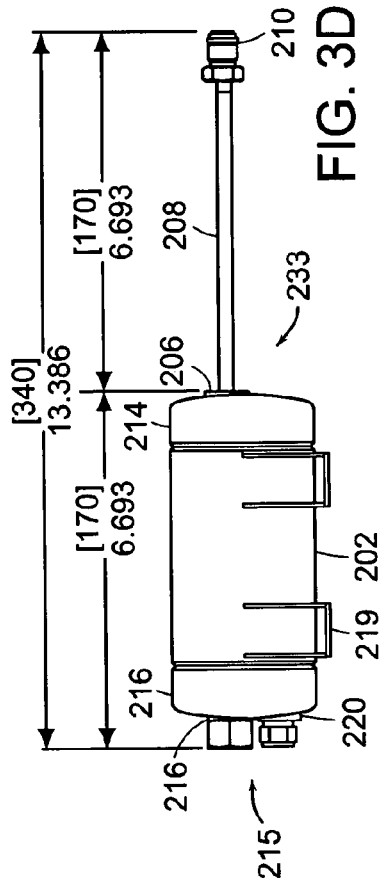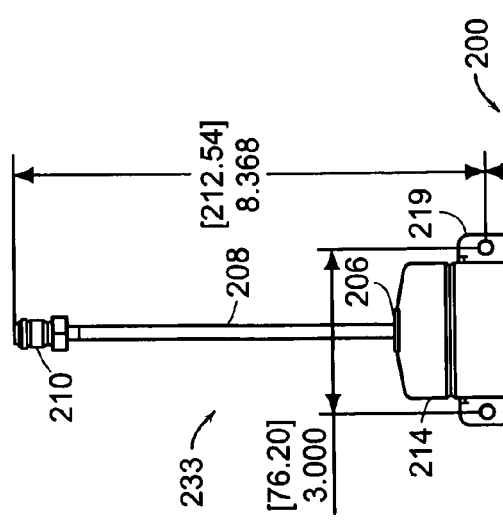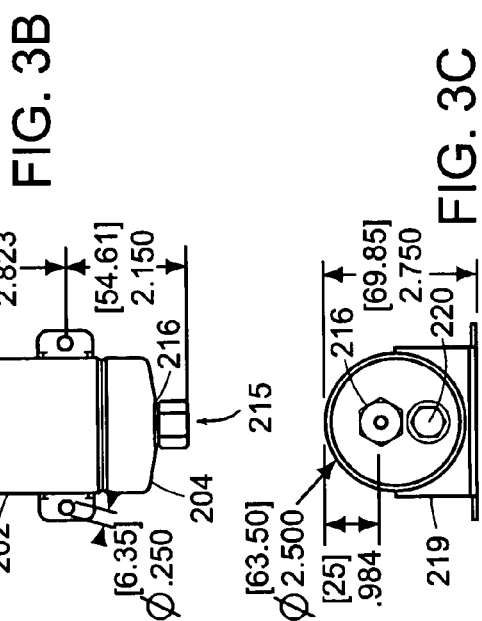

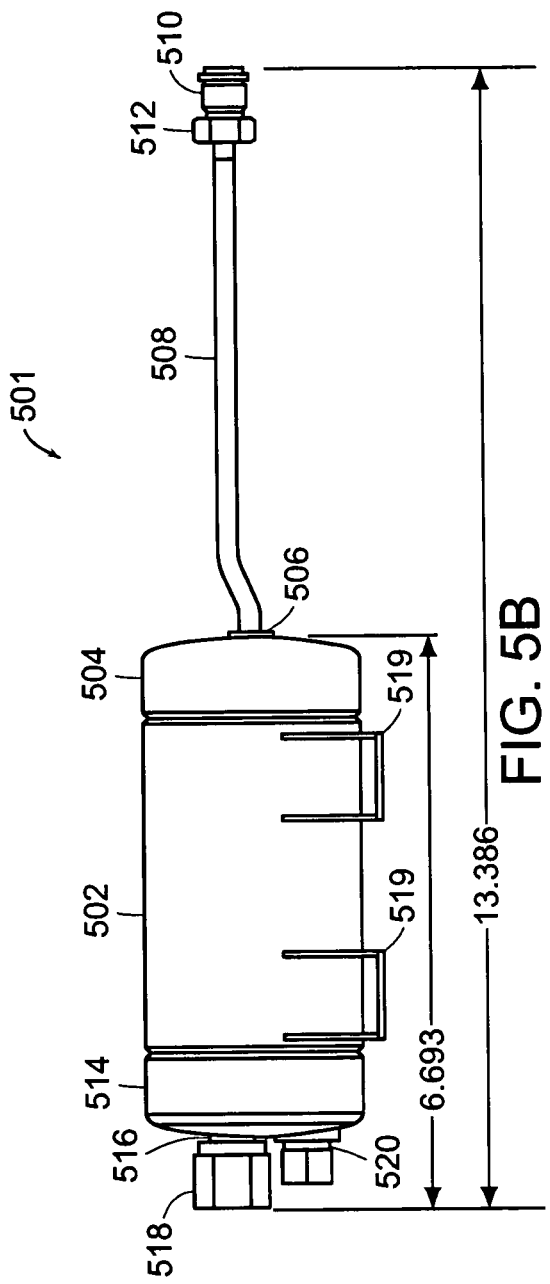
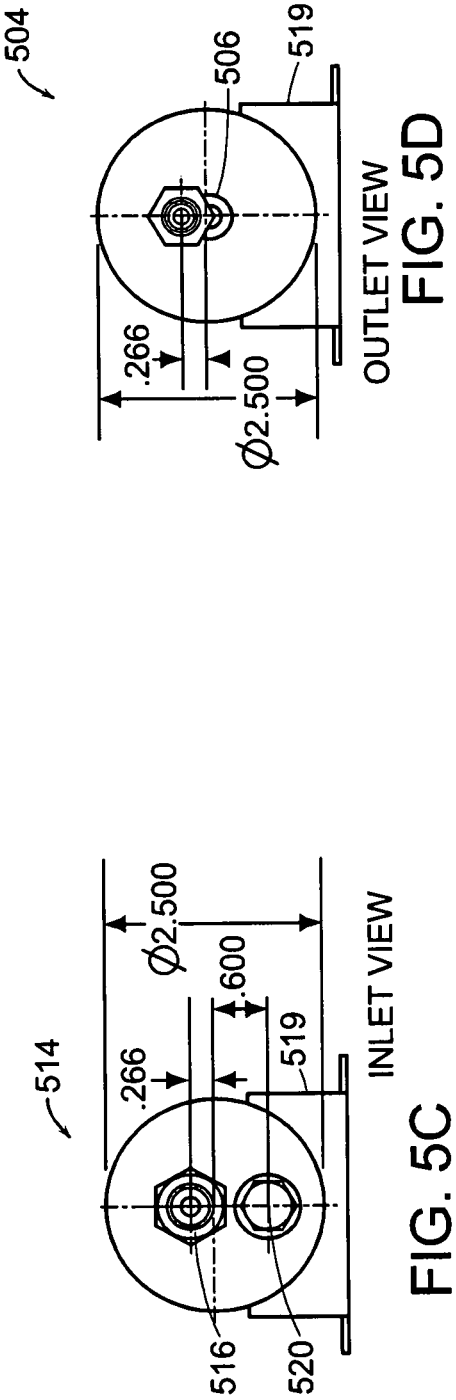
FIG. 5B
FIG. 5C INLET VIEW
FIG. 5D OUTLET VIEW

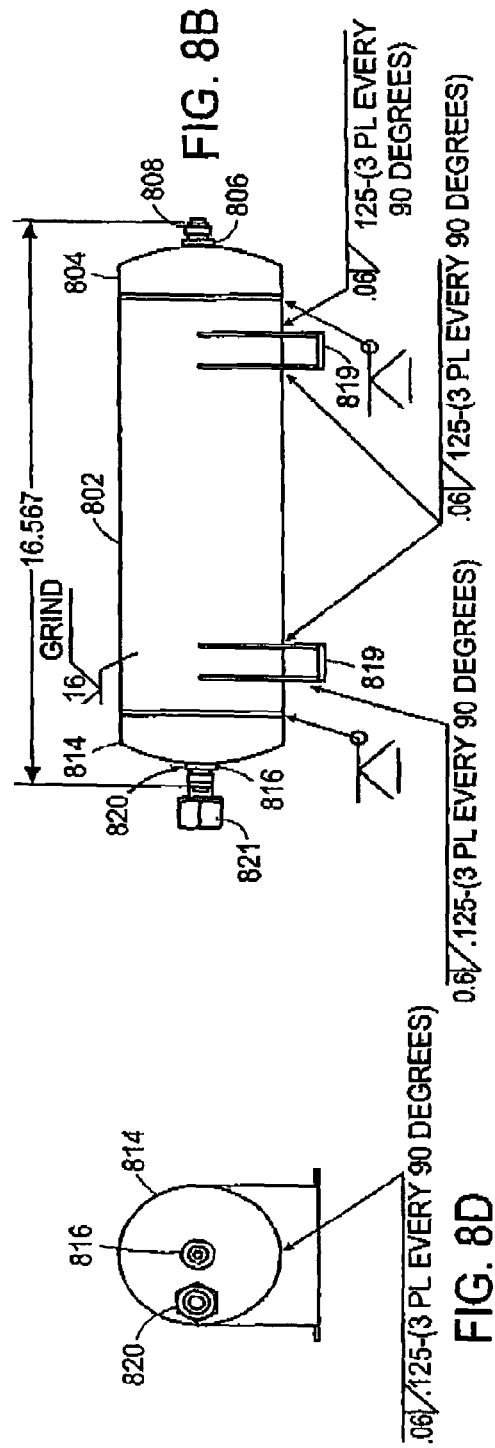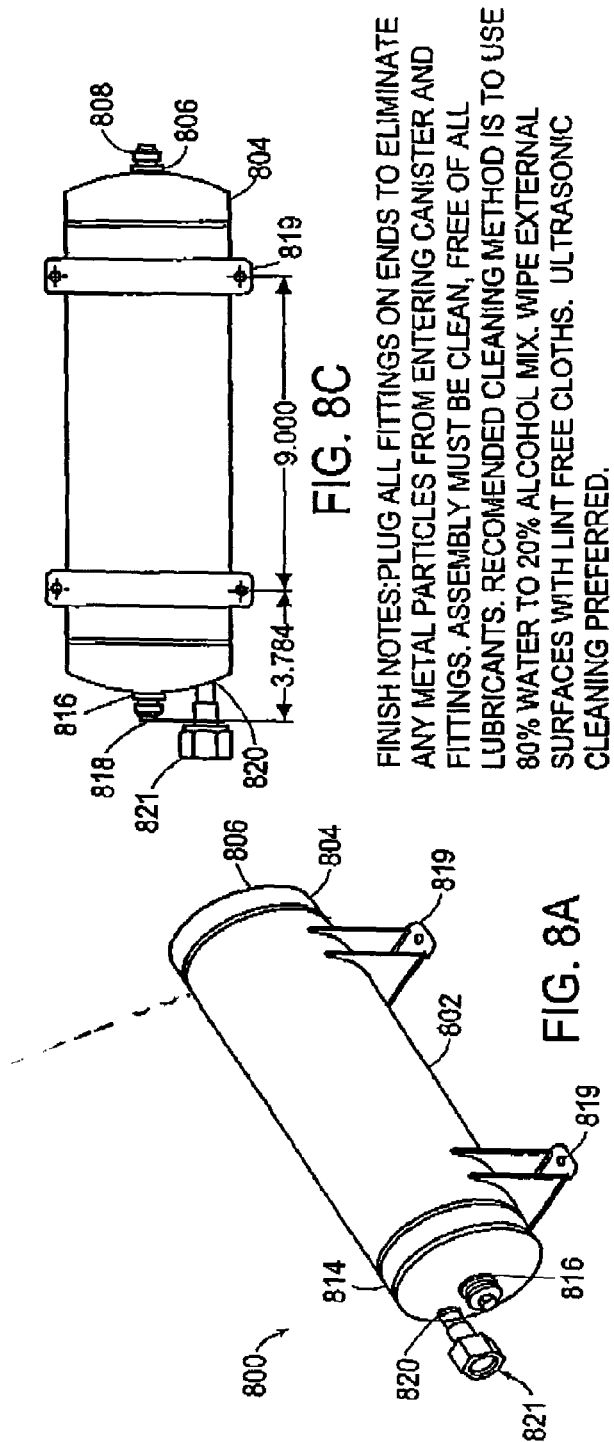

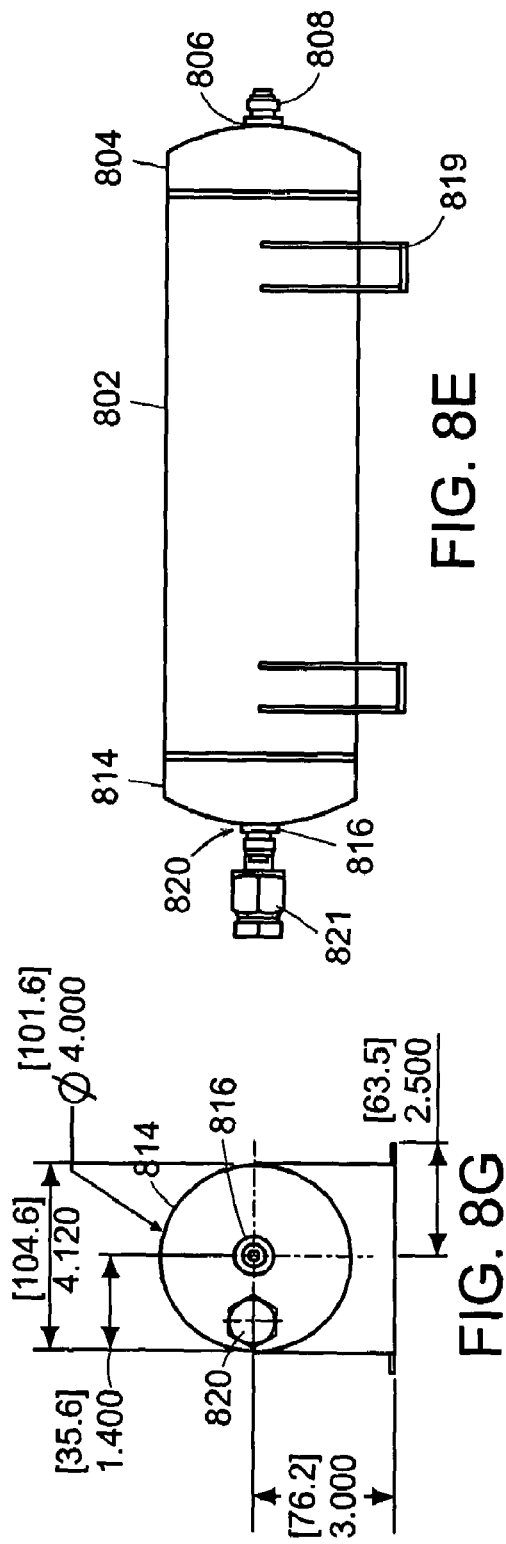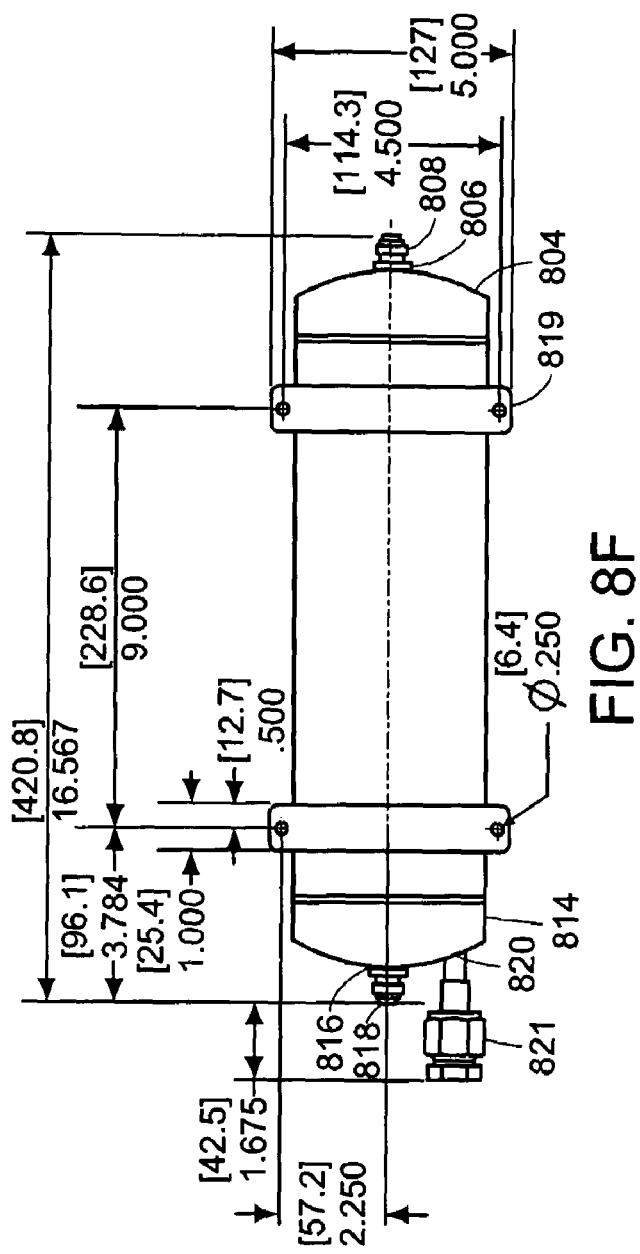

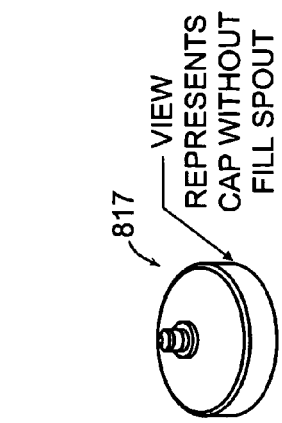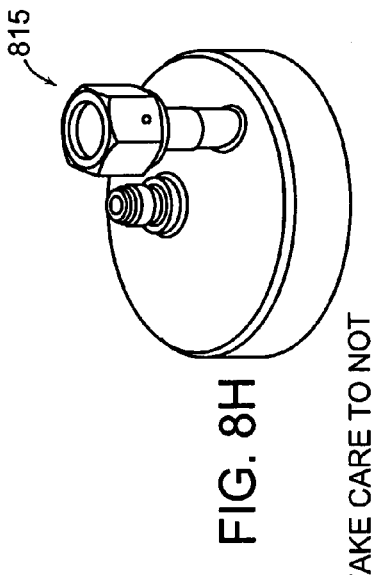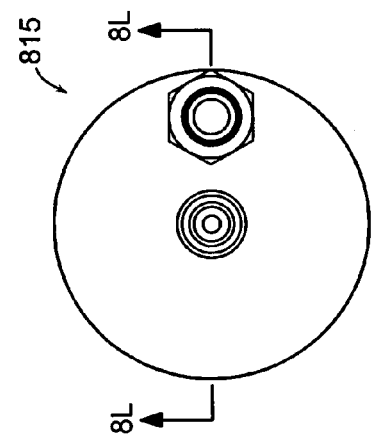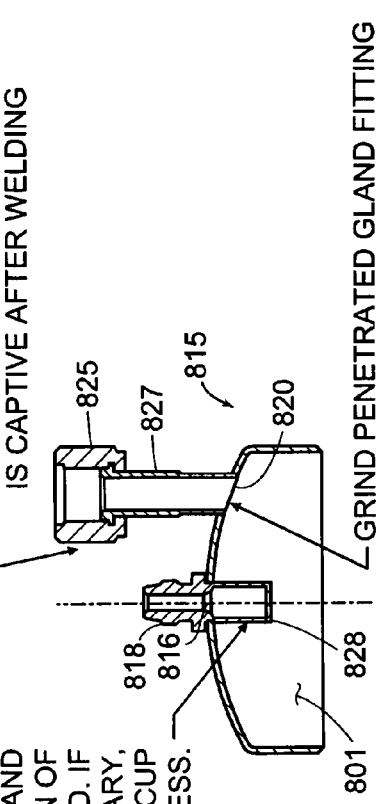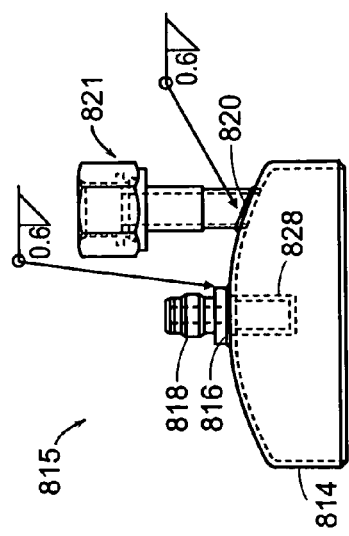

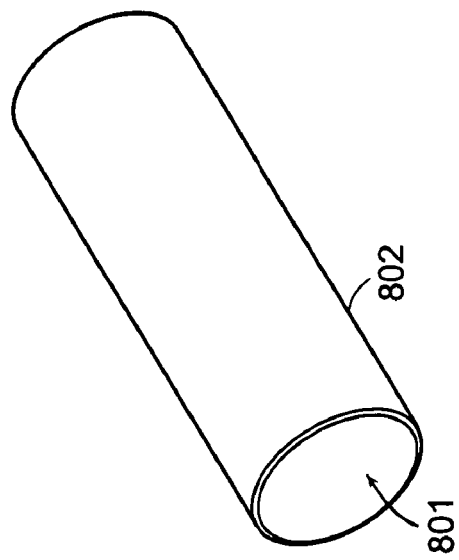
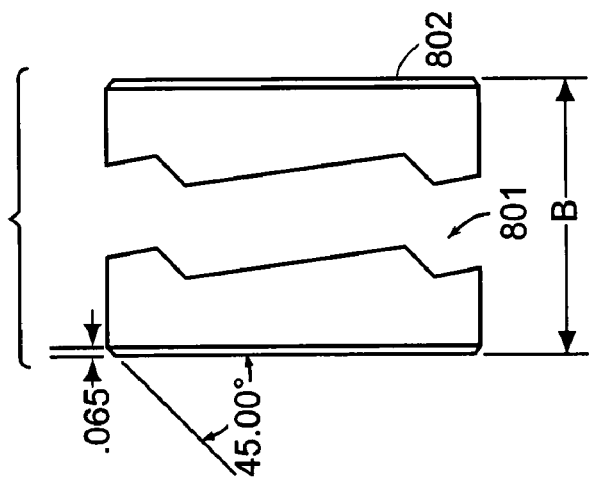
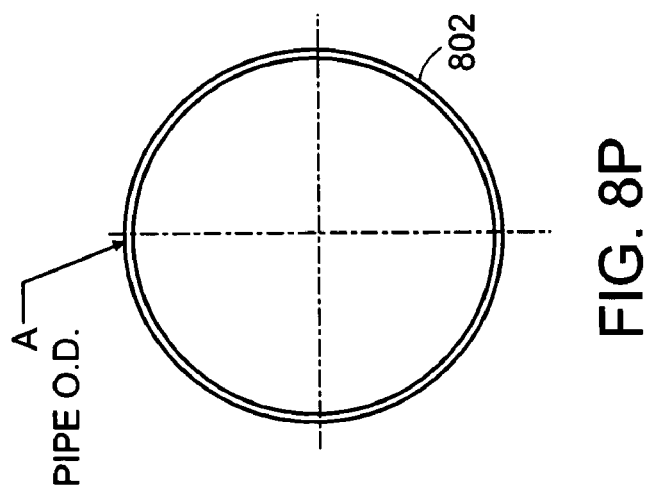

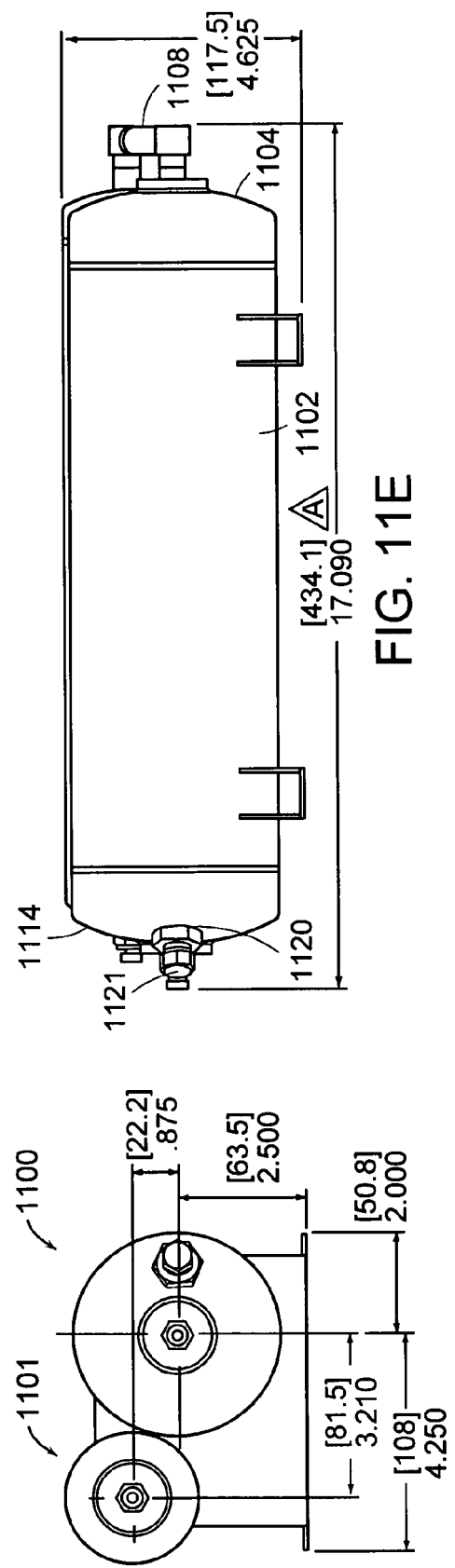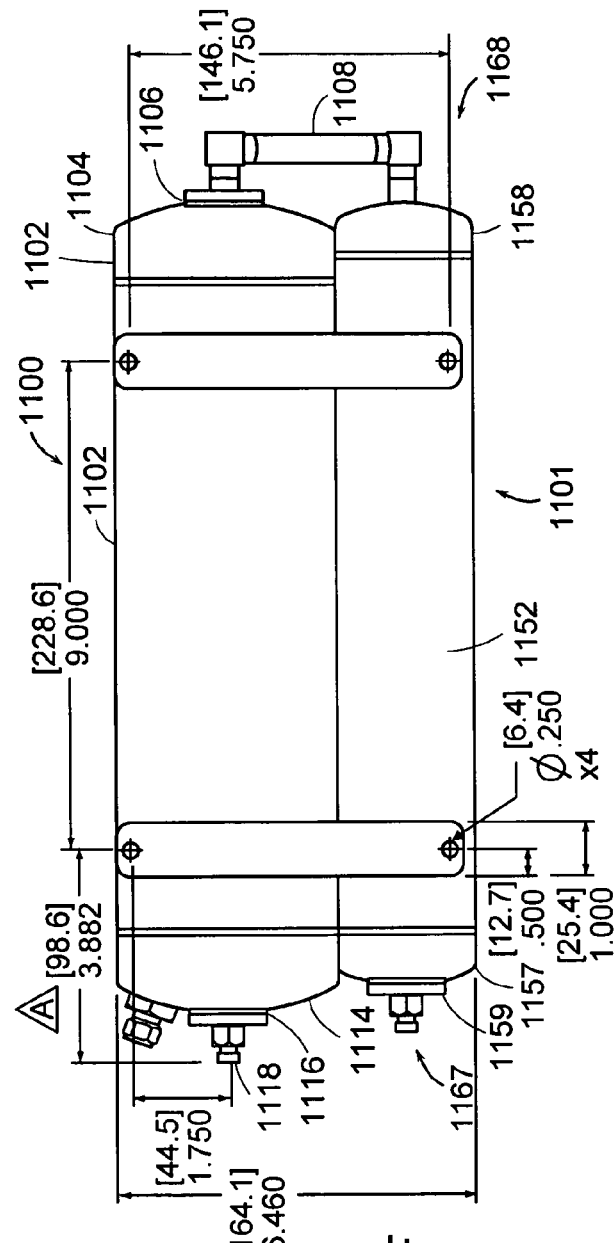
FIG. 11E
FIG. 11F
FIG. 11D

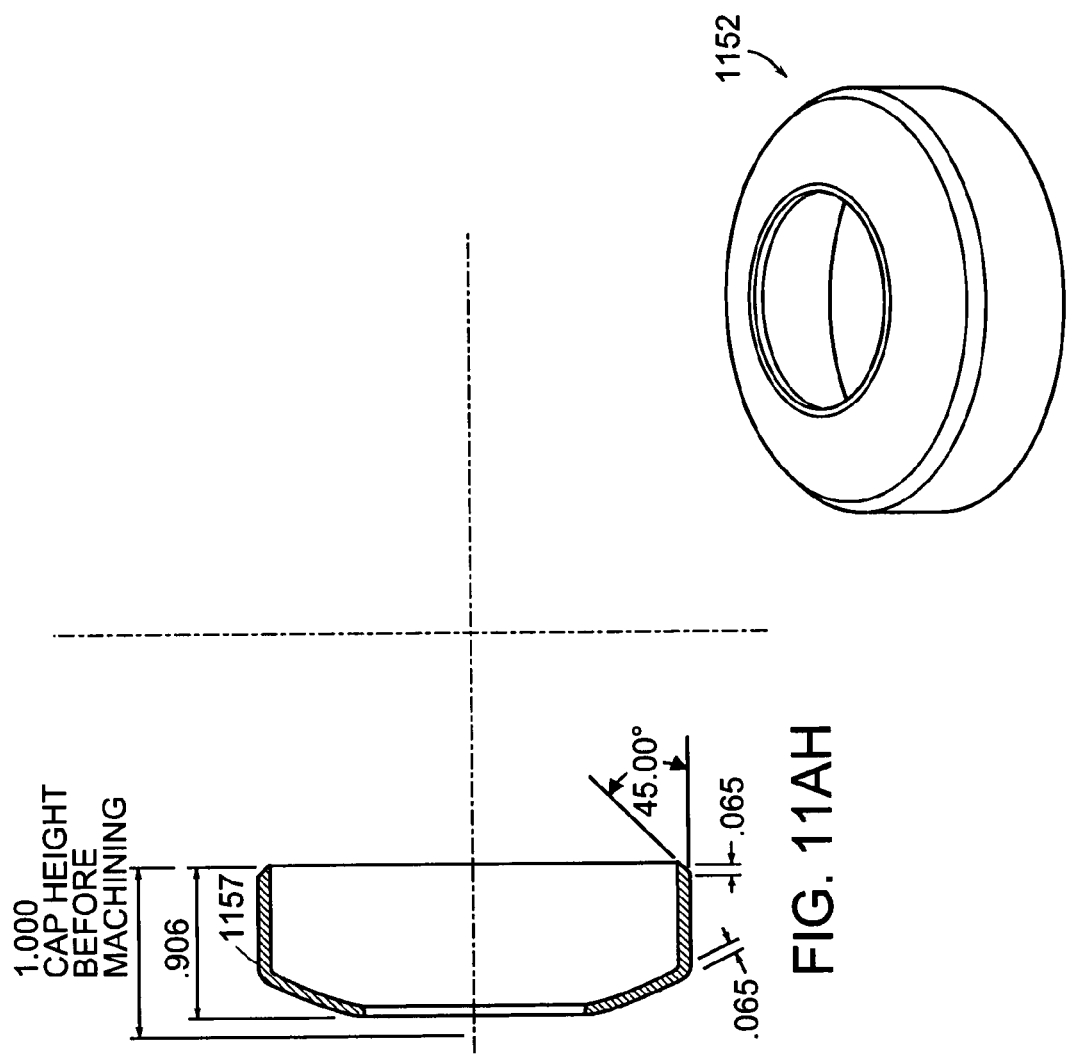
FIG. 11AE
FIG. 11AH
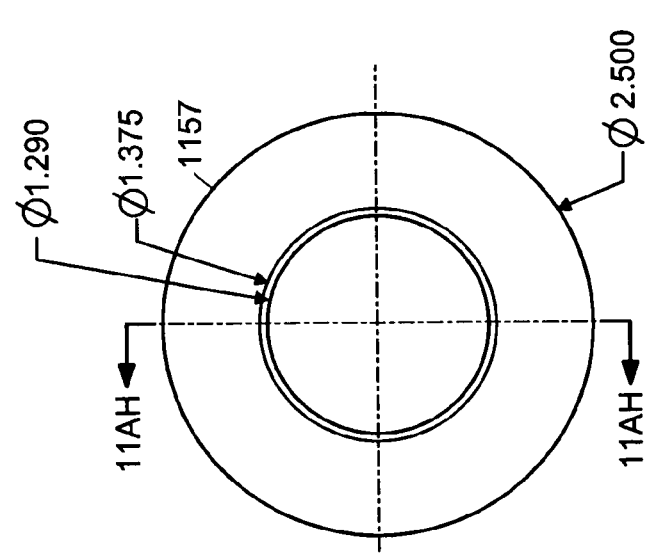
FIG. 11AG
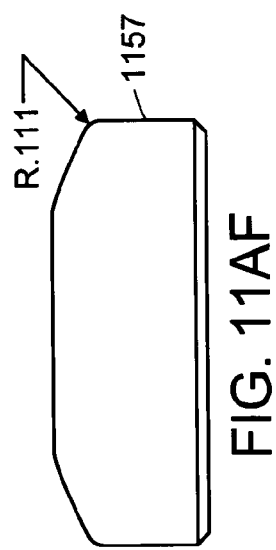
FIG. 11AF

REACTIVE GAS FILTER

BACKGROUND OF THE INVENTION

Gas filtration is critical in semiconductor manufacturing environments. Tremendous efforts are made to eliminate yield-reducing contaminants from the gases used in semiconductor processing tools. Contaminants can generally be classified as either particulate or molecular. Common particulate contaminants include dust, lint, dead skin, and manufacturing debris. Examples of yield-reducing contaminants include: acids, such as hydrobromic acid, nitric acid, sulfuric acid, phosphoric acid, hydrochloric acid; bases, such as ammonia, ammonium hydroxide, tetramethylammonium hydroxide, trimethylamine, triethylamine, hexamethyldisilazane, NMP, cyclohexylamine, diethylaminoethanol, methylamine, dimethylantine, ethanolamine, morpholine, condensables such as silicones and hydrocarbons with a boiling point greater than or equal to 150° C.; and dopants such as boron (usually as boric acid), phosphorous (usually as organophosphate), and arsenic (usually as an arsenate).

In semiconductor photolithography tools gas is supplied for generally two purposes: the actuation of tool pneumatics; and the purging of tool optics. Although purified dry air, nitrogen, or the like is generally used to drive pneumatics and purge optics, small amounts of contaminants are still liable to be present in the gas at concentrations sufficient to damage tool optics (for example, illuminator optics and projection lenses). Contaminating substances may adhere onto the optical elements to form molecular films. Molecular films on optical surfaces physically absorb and scatter incoming light. Scattered or absorbed light in photolithography optical surfaces causes distortion of the spherical quality of wavefronts. When the information contained in the spherical wavefront is distorted, the resulting image is also misformed or abberated. Image distortions, or in the case of photolithography, the inability to accurately reproduce the circuit pattern on the reticle, cause a loss of critical dimension control and process yield.

Contaminating substances may also chemically react with the optical surfaces of the photolithography tool and/or the wafers being processed in the tool. For example, sulfur dioxide may combine with water in the tool to produce sulfuric acid, which can irreversibly damage tool optics. In addition, ammonia may react with wafer surface materials, such as the resist, gate-insulating films, and the like, interfering with the photolithography processing step and reducing process yield. Thus, the purity of the gases supplied to semiconductor processing tools is of critical concern.

SUMMARY OF THE INVENTION

The invention includes a gas filter for a reactive gas used in semiconductor processing tools and processes that are sensitive to molecular contamination. Gas filters in accordance with the invention can be used, for example, to purify a gas such as the clean dry air used to run tool pneumatics or a gas used to purge the exposure area, the area between the final optical element and the wafer, commonly called the free working area, in 248 nm wavelength photolithography tools and I-line or 365 nm wavelength photolithography tools.

The gas filter can be used to purify synthetic air and clean dry air, gas streams used in photolithography equipment and in semiconductor processing tool pneumatics. It may be, however, advantageous to filter synthetic air prior to mixing, for example, filter oxygen and nitrogen separately, before mixing them together to make synthetic air.

In preferred embodiments, the gas filters of the invention remove particulates and molecular contamination, which may include acids, bases, condensables, or dopants, for example. The gas filter can include a chemically active or chemically catalytic filtering material in combination with an inert polymer (such as PTFE), activated carbon, or both. The gas filter can include a porous metal high purity particle filter, such as, for example, a porous nickel cup or porous nickel concentric tube.

Typically, filters are used to remove particulate and molecular contamination from gases supplied to semiconductor processing tools. Although purity of the supplied gas is a critical concern, it is not the only criteria for a useful gas filter. In addition to output purity, a gas filter must fit in the application for which it is intended and provide a sufficient flow of gas (with an acceptable pressure drop across the filter) for its intended purpose. Excessive pressure drop is undesirable for multiple reasons. For example, it increases fan load and power consumption, reduces airflow through a processing tool and positive pressure inside enclosures.

For example, for an optics purge gas, a gas flow rate from 150 to 250 standard liters per minute (slpm) may be required to sweep contaminants away from optical surfaces. Whereas for pneumatic actuation, a gas flow rate of 20 to 50 slpm may be required. In both situations, it is desirable to use a filter with a low pressure drop across the filter (generally the lower the better). However, factors that increase gas purity (for example, increased filter media density, volume, and/or filter size) also tend to increase the pressure drop across the gas filter.

The present invention provides a reactive gas filter with an improved pressure drop that can also supply. It is to be understood that pressure drop varies with both flow rate and input gas stream pressure. Typically, the pressure drop decreases with increasing input gas stream pressure and increase with increasing flow rate. In addition, pressure varies with filter media volume and density. For example, gas purity can be increased by increasing the total media volume, media density, or both. It is particularly problematic, however, to provide a gas filter with reduced filter media volume and reduced pressure drop that can still provide an output gas stream having concentrations of less than about 1 ppbv for both ammonia and sulfur dioxide for an input gas stream with ammonia and sulfur dioxide concentrations, respectively, of no greater than about 10 ppbv and 5 ppbv. Accordingly, in one aspect the present invention provides a gas filter with an improved pressure drop and a filter media volume of no greater than about 0.5 liters that can also supply an output gas stream having concentrations of less than about 1 ppbv for both ammonia and sulfur dioxide for an input gas stream with ammonia and sulfur dioxide concentrations, respectively, of no greater than about 10 ppbv and 5 ppbv. In another aspect, the present invention provides a gas filter with an improved pressure drop and a filter media volume of no greater than about 3 liters that can also supply an output gas stream having concentrations of less than about 1 ppbv for both ammonia and sulfur dioxide for an input gas stream with ammonia and sulfur dioxide concentrations, respectively, of no greater than about 10 ppbv and 5 ppbv.

In accordance with one aspect of the present invention, the filter media volume is no greater than about 0.5 liters. In various preferred embodiments, for an input gas stream pressure in the range from about 100 pounds per square inch gauge (psig) to about 150 psig, a gas filter in accordance with the invention can be as follows: (i) in one embodiment, the gas filter has a pressure drop of no greater than about 9 pounds per square inch (psi) for an outlet flow rate in the range from about 3 slpm to about 20 slpm; (ii) in another embodiment, the gas filter has a pressure drop of no greater than about 20 psi for an outlet flow rate in the range from about 20 slpm to about 50 slpm; (iii) in another embodiment, the gas filter has a pressure drop of no greater than about 50 psi for an outlet flow rate in the range from about 50 slpm to about 100 slpm; In various other embodiments of a gas filter having a filter media volume of no great than about 0.5 liters, for an input gas stream pressure in the range from about 70 psig to about 100 psig a gas filter in accordance with the invention can be as follows: (i) in one embodiment, the gas filter has a pressure drop of no greater than about 13 psi for an outlet flow rate in the range from about 3 slpm to about 20 slpm; (ii) in another embodiment, the gas filter has a pressure drop of no greater than about 35 psi for an outlet flow rate in the range from about 20 slpm to about 50 slpm; (iii) in another embodiment, the gas filter has a pressure drop of no greater than about 80 psi for an outlet flow rate in the range from about 50 slpm to about 100 slpm;

In various other embodiments of a gas filter having a filter media volume of no great than about 0.5 liters, for an input gas stream pressure in the range from about 30 psig to about 70 psig a gas filter in accordance with the invention can be as follows: (i) in one embodiment, the gas filter has a pressure drop of no greater than about 18 psi for an outlet flow rate in the range from about 3 slpm to about 20 slpm; (ii) in another embodiment, the gas filter has a pressure drop of no greater than about 50 psi for an outlet flow rate in the range from about 20 slpm to about 50 slpm; (iii) in another embodiment, the gas filter has a pressure drop of no greater than about 100 psi for an outlet flow rate in the range from about 50 slpm to about 100 slpm; In accordance with one aspect of the present invention, the filter media volume is no greater than about 3 liters. In various preferred embodiments, for an input gas stream pressure in the range from about 100 pounds per square inch gauge (psig) to about 150 psig, a gas filter in accordance with the invention can be as follows: (i) in one embodiment, the gas filter has a pressure drop of no greater than about 5 pounds per square inch (psi) for an outlet flow rate in the range from about 3 slpm to about 20 slpm; (ii) in another embodiment, the gas filter has a pressure drop of no greater than about 16 psi for an outlet flow rate in the range from about 20 slpm to about 50 slpm; (iii) in another embodiment, the gas filter has a pressure drop of no greater than about 47 psi for an outlet flow rate in the range from about 50 slpm to about 100 slpm; (iv) in another embodiment, the gas filter has a pressure drop of no greater than about 93 psi for an outlet flow rate in the range from about 100 slpm to about 150 slpm; and (v) in another embodiment, the gas filter has a pressure drop of no greater than about 230 psi for an outlet flow rate in the range from about 150 slpm to about 250 slpm.

In various other embodiments of a gas filter having a filter media volume of no great than about 3 liters, for an input gas stream pressure in the range from about 70 psig to about 100 psig a gas filter in accordance with the invention can be as follows: (i) in one embodiment, the gas filter has a pressure drop of no greater than about 6.5 psi for an outlet flow rate in the range from about 3 slpm to about 20 slpm; (ii) in another embodiment, the gas filter has a pressure drop of no greater than about 25 psi for an outlet flow rate in the range from about 20 slpm to about 50 slpm; (iii) in another embodiment, the gas filter has a pressure drop of no greater than about 80 psi for an outlet flow rate in the range from about 50 slpm to about 100 slpm; (iv) in another embodiment, the gas filter has a pressure drop of no greater than about 165 psi for an outlet flow rate in the range from about 100 slpm to about 150 slpm; and (v) in another embodiment, the gas filter has a pressure drop of no greater than about 420 psi for an outlet flow rate in the range from about 150 slpm to about 250 slpm.

In various other embodiments of a gas filter having a filter media volume of no great than about 3 liters, for an input gas stream pressure in the range from about 30 psig to about 70 psig a gas filter in accordance with the invention can be as follows: (i) in one embodiment, the gas filter has a pressure drop of no greater than about 12 psi for an outlet flow rate in the range from about 3 slpm to about 20 slpm; (ii) in another embodiment, the gas filter has a pressure drop of no greater than about 30 psi for an outlet flow rate in the range from about 20 slpm to about 50 slpm; (iii) in another embodiment, the gas filter has a pressure drop of no greater than about 60 psi for an outlet flow rate in the range from about 50 slpm to about 100 slpm; (iv) in another embodiment, the gas filter has a pressure drop of no greater than about 90 psi for an outlet flow rate in the range from about 100 slpm to about 150 slpm; and (v) in another embodiment, the gas filter has a pressure drop of no greater than about 150 psi for an outlet flow rate in the range from about 150 slpm to about 250 slpm.

In preferred embodiments, the gas filter of the present invention comprises a container having a substantially cylindrical tube portion, which has an inlet end with an inlet port, an outlet end with an outlet port, and an internal chamber. The inlet port has an inlet particle filter that extends into the internal chamber and the outlet port has an outlet particle filter that extends into the internal chamber. A filter media fills the internal chamber.

The filter media can be bedded, graded, mixed or a combination of both. For example, a granulated activated charcoal (GAC), material can be bedded to form a first bed and an acid treated GAC and base treated GAC mixed and bedded to form a second bed. In another example, the base treated GAC is bedded to form a first bed and the acid treated GAC may be graded in the GAC to form a second bed where the concentration of acid treated GAC varies across the second bed.

In preferred embodiments, the filter media includes porous adsorptive materials such as zeolites, activated carbons, molecular sieves, etc. In one embodiment, the filter media incorporates treated GAC materials which are designed to remove ammonia and sulfur dioxide. In another embodiment, the filter media incorporates zeolites and/or highly acidic porous materials which are designed to remove ammonia and amines, to which chemically amplified deep ultraviolet (DUV) photoresists are sensitive.

The filter media can incorporate materials which are designed to remove condensable organic compounds, for example, organic molecules with a molecular weight of greater than about 90 g/mol. and a boiling point greater than about 150° C. Typically, condensable organics include organic compounds including carbon atoms within the range of approximately six to thirty carbon atoms ($C_6$–$C_{30}$) and high molecular weight organics with an inorganic component which is not volatilized through combination with oxygen, such as, for example, $C_6$ silanes, $C_6$ siloxanes and $C_6$ iodates.

In a preferred embodiment, the present invention provides a gas filter with improved pressure drop that can also supply an output gas stream having a total condensable organic concentration of less than about 10 ppbv for an input gas stream with a total condensable organic concentration of no greater than about 100 ppbv. In accordance with another preferred embodiment, the present invention provides a gas filter with improved pressure drop that can also supply an output gas stream where about 99% or greater of the condensable organic contaminants have been removed from an input gas stream with a total condensable organic concentration of no greater than about 100 ppbv.

In preferred embodiments, the filter media is selected to purify compressed dry air. In one embodiment of a compressed dry air filter, filter media comprises granulated activated charcoal (GAC), an acid treated GAC for removal of ammonia, and a base treated GAC for removal of sulfur dioxide. The filter media can also include inorganic adsorbents (such as, for example, zeolites and molecular sieves, such as, for example, $SiO_2/Al_2O_3$) and inorganic adsorbents treated with a chemically active or chemically catalytic filtering material.

In preferred embodiments, the gas filter of the present inventions incorporates particle filters for removal of particulates from the input and output gas streams. The particulate filters are disposed in the internal chamber, although more difficult to construct, it is believed that such placement facilitates improved flow distribution. In preferred embodiments, the gas filter includes porous nickel particle filters that can effectively remove particulates with an average size of about 0.003 microns and greater. In one preferred embodiment, the particle filter is a porous nickel concentric tube high purity particle filter such as supplied by Mott Corporation (84 Spring Lane, Farmington, Conn., 06032-3159) under part number 2390804. In another preferred embodiment, the particle filter is a porous nickel cup high purity particle filter such as supplied by Mott Corporation under part number 1204380. In preferred embodiments, the particle filter removes 99.9999999% or greater of all particles down to about 0.003 microns.

In other embodiments, a gas filter in accordance with the invention can be cooled using a thermoelectric cooling device. Organics can be condensed and collected using such a low temperature embodiment. The low temperature embodiment can include heat sinks to dissipate the heat energy generated.

A controlled humidification source can be coupled to the gas filter to provide a humidity controlled gas supply. The controlled humidification source can comprise an ultrapure deionized (DI) water source to add water to the gas and a dryer to remove water from the gas stream. The controlled humidification source can further comprise a sensor system to sense gas stream humidity (inlet, outlet or both) and feedforward and/or feedback a signal to the controlled humidification source. Preferably, a gas filter of the present invention is brought into equilibrium with a desired humidity level before it is incorporated into a reactive gas supply line.

The foregoing and other objects, features and advantages of the invention will be more fully understood from the following descriptions of various embodiments of the invention and the accompanying drawings. In the drawings like reference characters generally refer to the same parts throughout the different views. The drawings are not necessarily to scale, emphasis instead being placed upon illustrating the principles of the invention.

BRIEF DESCRIPTION OF THE DRAWINGS

Preferred embodiments of the present invention are described with reference to the following drawings, wherein:

FIGS. 3A–3D illustrate various detailed views of a preferred embodiment of a reactive gas filter of FIGS. 2A–2W where square bracket dimensions are in millimeters and unbracketed dimensions in inches;

FIGS. 5B–5D illustrate various detailed views to scale of a preferred embodiment of a reactive gas filter in accordance with the present invention, where the unbracketed dimensions in inches;

FIGS. 8A–8V illustrate various detailed views of a preferred embodiment of a reactive gas filter in accordance with the present invention, where the various parts in FIGS. 8B–8G, 8J–8L, 8O–8P, and 8R–8T are to scale, and FIGS. 8A, 8H–8I, 8M–8N, 8Q and 8U–8V are various isometric views not necessarily drawn to scale;

DETAILED DESCRIPTION OF THE INVENTION

Figure 1:
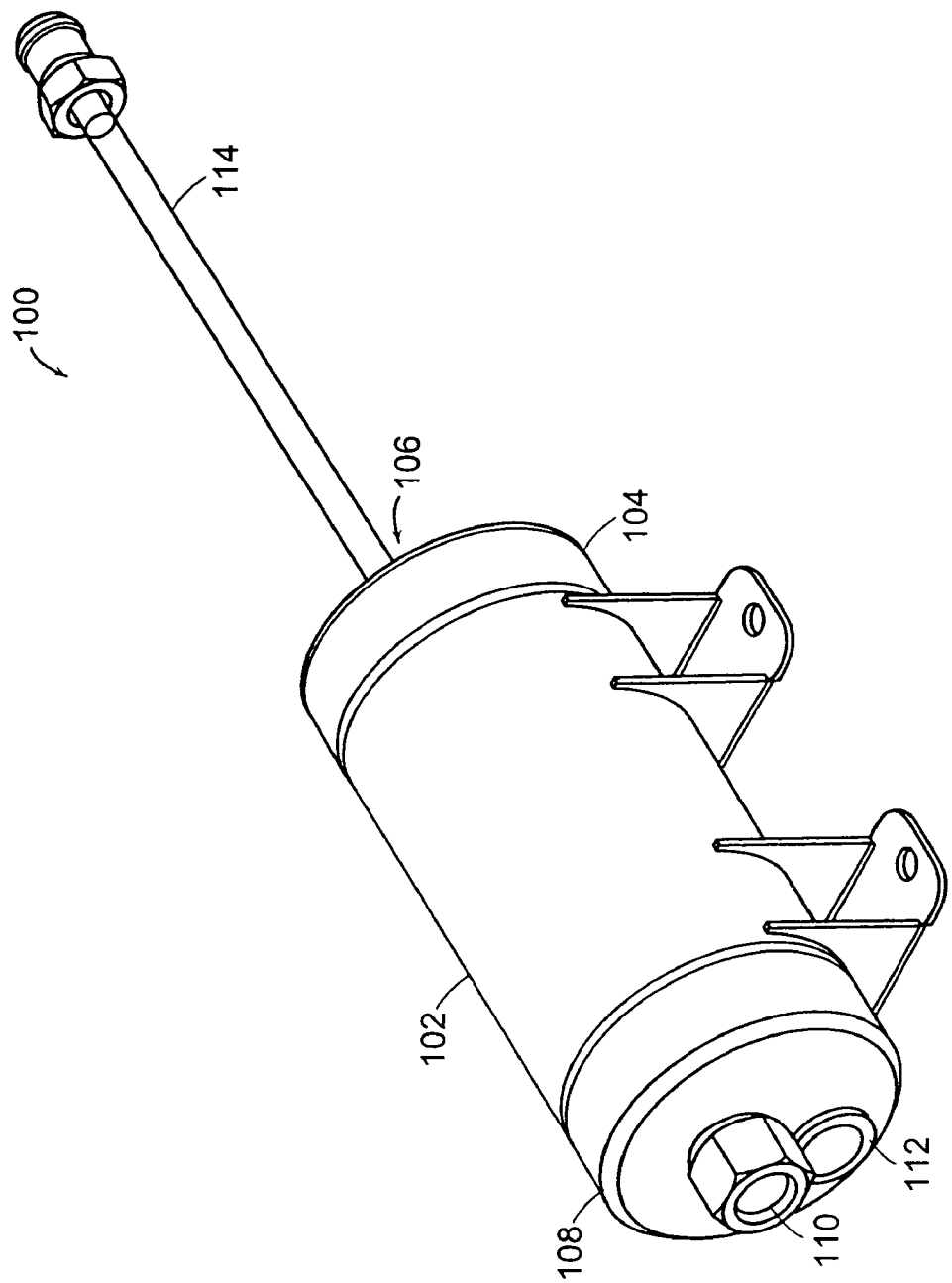
FIG. 1 is an isometric illustration of a preferred embodiment of a reactive gas filter in accordance with the present invention.

The present invention is directed to a gas filter for a reactive gas used in semiconductor processing tools and processes that are sensitive to molecular contamination. Contaminants in a gas can come from many sources including the cleanroom environment itself. Table 1 illustrates various species in a cleanroom environment, such as, for example, a fabrication environment using photolithography systems. The low molecular weight species, such as acetone, isopropyl alcohol and low molecular weight siloxanes are the most prevalent in manufacturing environments. In addition, even so called clean gases, such as clean dry air, can contain contaminants at concentrations sufficient to negatively impact semiconductor processing and reduce yield.

Compounds that are most likely to reduce the performance of optics are compounds having a high contamination coefficient or a high molecular weight; examples can include, but are not limited to, methoxytrimethyl silane, trimethyl, silane and trimethyl silanol. These compounds appear in italics in Table 1 and have a higher molecular weight, higher contamination coefficient and an inorganic component. Compounds that negatively impact optical systems can also include refractory compounds such as silanes, siloxanes and iodates, in particular hexamethyldisiloxane (HMDSO or $C_6$-siloxane). Refractory materials are compounds containing atoms forming nonvolatile or reactive oxides, for example, but not limited to, phorphorous (P), silicon (Si), sulfur (S), boron (B), tin (SN), aluminum (Al). These contaminants may be exposed to deep ultraviolet (DUV) light and may form refractory compounds resistant to active oxygen treatment.

TABLE 1

| Compound (in cleanrooms) | Typical concentration, ppbv |
| --- | --- |
| Isopropyl Alcohol | 610.0 |
| Acetone | 330.0 |
| Ethanol | 134.0 |
| Silane, Methoxytrimethyl- | 35.0 |
| Heptane, Hexadecafluoro- | 28.0 |
| 2-Pentanone | 17.0 |
| 2-Butanone(MEK) | 9.8 |
| Hexane, Tetradecafluoro- | 8.9 |
| Butanoic Acid, Heptafluoro- | 5.2 |
| Tetrahydrofuran | 3.3 |
| 3-Buten-2-one | 2.5 |
| 4-Methyl-2-pentanone(MIBK) | 1.9 |
| Silane, Trimethyl(1-Methylethoxy)- | 1.7 |
| n-Pentane | 1.4 |
| Silanol, Trimethyl- | 1.4 |

Photochemical decomposition reactions occur when high-energy photons interact with organic vapors. These reactions form extremely reactive free radicals from otherwise neutral and relatively inert organic molecules. Irrespective of where radical formation occurs, in the gas phase or on the surface of optical elements, the resulting free radicals may react to form much larger organic compounds, which can contaminate optical elements. In severe cases, a polymer layer may be formed on the optical surface. The relationship between the chemical nature of the organic species and wavelength of light it absorbs can affect the nature and severity of optics contamination. For example, I-line or 365 nm wavelength light is energetic enough to break down only a few iodated components, which are not commonly found in clean room air. 248 nm wavelength light, typically used in deep ultraviolet (DUV) lithography for fabricating 250 to 150 nm linewidth devices, is more efficient and reacts with most halogenated organics and may even interact with some common hydrocarbons. 193 nm light, required for less than 130 nm geometries, reacts very efficiently with a wide range of airborne or gaseous molecular organic contaminants.

As the wavelength of light used in the lithography exposure tool decreases, the energy per unit photon increases. These progressively higher energy photons stand a better chance of breaking the bonds of a number of commonly present molecular species, ultimately rendering them into reactive species that stick to optical surfaces. 157 nm optical elements are even more sensitive to environmental conditions than 193 nm optics because this wavelength of light is efficiently absorbed or interacts with nearly all organic species plus oxygen and atmospheric moisture, requiring the exposure area, the area between the final optical element and the wafer, commonly called the free working area, to be purged with an inert, clean, dry, oxygen-free gas.

In accordance with a preferred embodiment of the present invention, the gas filter includes a substantially cylindrical housing having an internal chamber filled with a filter media. FIG. 1 is an exterior isometric view of a gas filter 100 in accordance with a preferred embodiment of the invention. The housing comprises a substantially cylindrical potion 102, an outlet end 104 having an outlet port 106, and an inlet end 108 having an inlet port 110. The housing can also have a fill port 112 for loading the internal chamber with the filter media. The gas filter can also include, for example, an inlet assembly, outlet assembly 114, or both that facilitate connecting the gas filter to a reactive gas source, reactive gas line, manifold, or tool.

Preferably, the housing and any assemblies are constructed of a low sulfur metal such as 316 stainless steel and 304 stainless steel, which are suitable for use in the present invention. It is to be understood that the housing and any assemblies are to be free of lubricants, grease, dirt, etc. Accordingly, it is preferred that the components be degreased, and cleaned with, for example, a 20% aqueous alcohol solution, preferably in an ultrasonic cleaner. Such cleaning methods are known to the art. In addition, it is preferred that all welds that may communicate with the interior of gas filter are performed in an inert gas environment, such as, for example argon, and preferably all welds are performed in an inert gas environment to facilitate producing gas free welds. Preferably, all "welds" are gas, tungsten arc welds with welds on curved surfaces made with an orbital welder. Prior to use, it is also preferred that the gas filters of the present invention purged, for example, by a flow of an inert gas, such as, nitrogen, at elevated temperatures (for example, 100° C.) for 24 to 72 hours. It is also preferred that prior to use that the gas filters of the present invention are brought into equilibrium with the humidity of the gas to be filtered.

The filter media in the internal chamber can include an inert polymer, carbon, activated carbon, and inorganic material in the form of, for example, pellets or granules. Preferably, the pellets or granules have an average mesh size in the range from about 16 U.S. mesh to about 50 U.S. mesh. These pellets or granules may be untreated or treated with a chemically active or chemically catalytic filtering material to facilitate adsorption of one of more types of organic and inorganic compounds, including, for example, acids, such as hydrobromic acid, nitric acid, sulfuric acid, phosphoric acid, hydrochloric acid; bases, such as ammonia, ammonium hydroxide, tetramethylammonium hydroxide, trimethylamine, triethylamine, hexamethyldisilazane, NMP, cyclohexylamine, diethylaminoethanol, methylamine, dimethylamine, ethanolamine, morpholine, condensables such as silicones and hydrocarbons with a boiling point greater than or equal to 150° C.; and dopants such as boron (usually as boric acid), phorphorous (usually as organophosphate), and arsenic (usually such as arsenate).

A wide variety chemically active or chemically catalytic filtering material can be used to pellet or granule to form a filter media. Example of materials for adsorption of basic amines include, but are not limited to, phosphoric acid ($H_3PO_4$), sulfonated styrene divinyl benzene. Example of materials for adsorption of acids (such as, for example sulfuric acids) include, but are not limited to, potassium carbonate ($K_2CO_3$), quaternary amines. In addition to acids and bases, certain compounds are of particular concern in photolithography systems, such as HMDSO. Examples of materials for adsorption of HMDSO include, but are not limited to, untreated granulated activated carbon (GAC), zeolites.

In accordance with a preferred embodiment, the filter media includes a GAC with a minimum surface area per gram of about 1200 $m^2/g$ and a density in the range from about 0.45 to about 0.50 g/ml, a phosphoric acid treated GAC with a minimum surface area per gram of about 1000$m^2/g$ and a density in the range from about 0.66 to about 0.69 g/ml, and a potassium carbonate treated GAC with a minimum surface area per gram of about 1000 $m^2/g$ and a density in the range from about 0.7 to about 0.9 g/ml.

Additional chemically active or chemically catalytic filtering materials for contamination control are described in U.S. application Ser. No. 10/205,703, filed on Jul. 26, 2002 entitled "Filters Employing Porous Strongly Acidic Polymers and Physical Adsorption Media", U.S. application Ser. No. 09/969,116, filed on Oct. 1, 2001 entitled "Protection of Semiconductor Fabrication and Similar Sensitive Processes", and U.S. application Ser. No. 09/783,232, filed on Feb. 14, 2001 entitled "Detection of Base Contaminants In Gas Samples", the entire teachings of the above referenced applications are being incorporated herein by reference in their entirety.

Figure 2F:
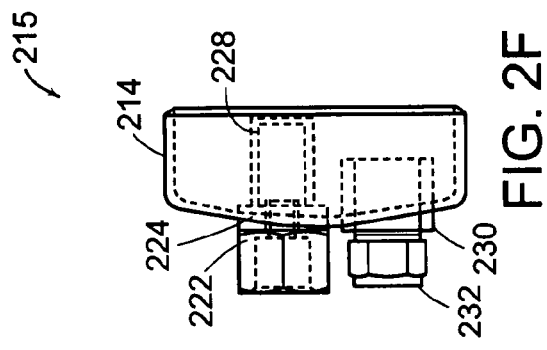
FIGS. 2A–2W illustrate various detailed views of a preferred embodiment of a reactive gas filter in accordance with the present invention, where the various parts in FIGS. 2A–2I, 2K–2O, 2R–2S, and 2U–2W are to scale.
FIGS. 2J, 2P–2Q, and 2T are various isometric views not necessarily drawn to scale.
Figure 2G:
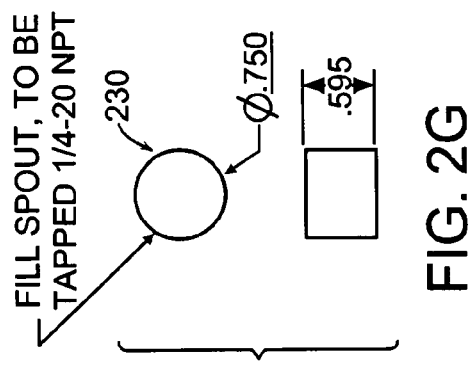
Figure 2D:
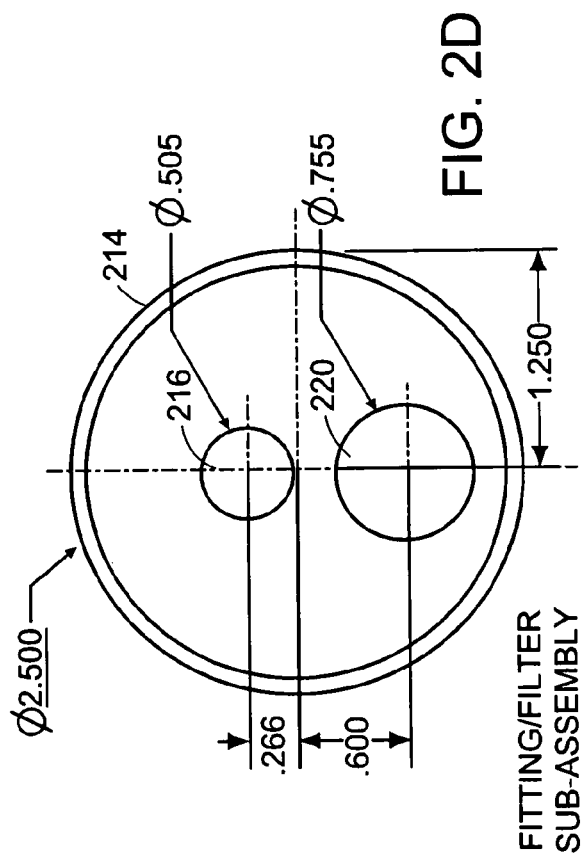
Figure 2E:
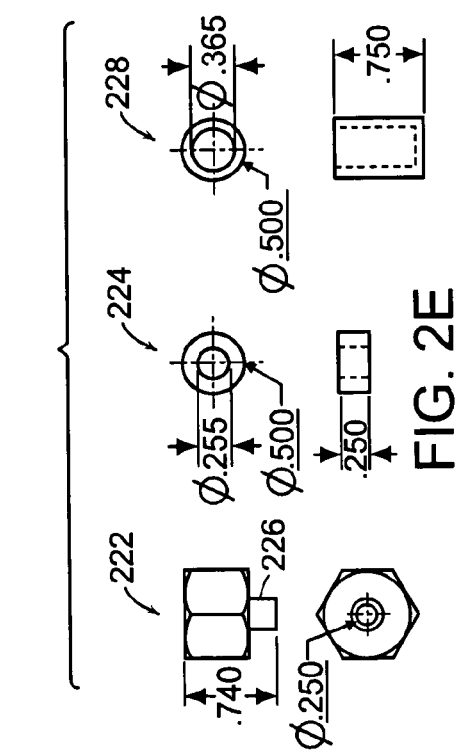
Figure 2Q:
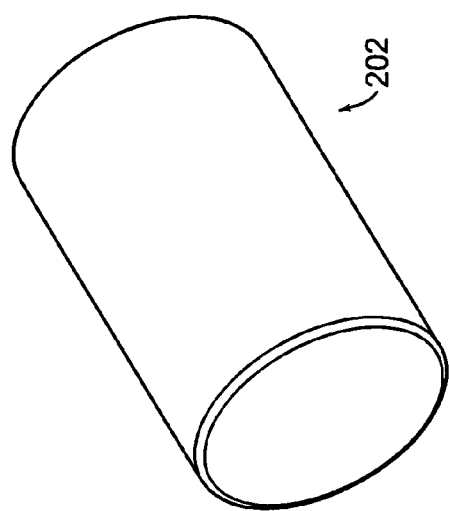
Figure 2S:
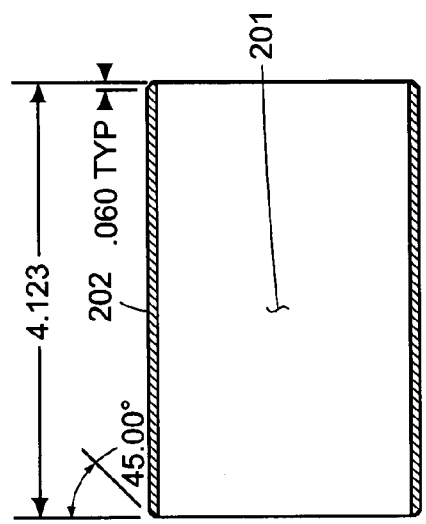
Figure 2R:
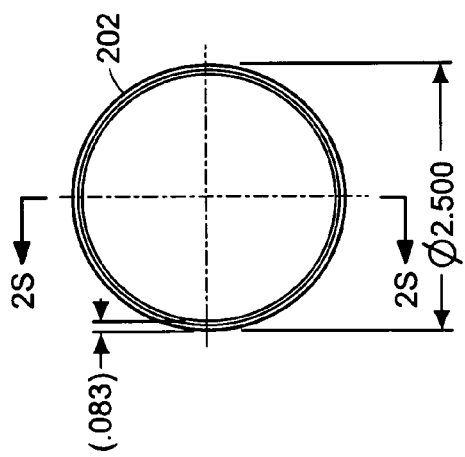
Figure 2T:
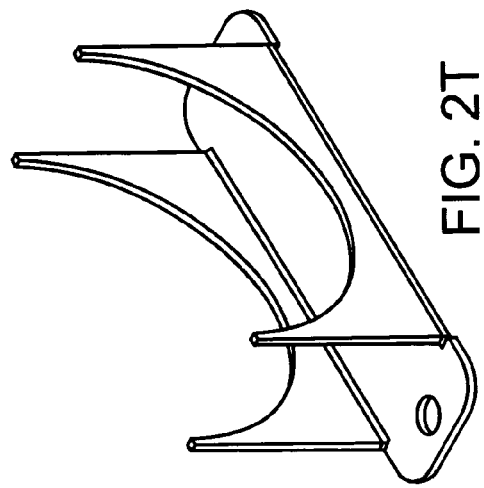
Figure 2W:
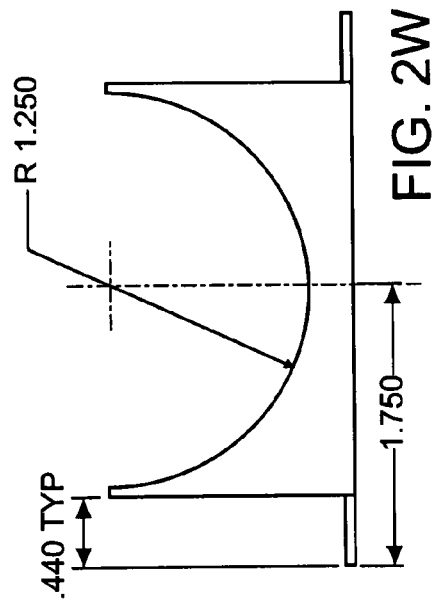

FIGS. 2A–2W present detailed views of a preferred embodiment of a gas filter in accordance with the present invention for use with a reactive gas such as clean dry air (CDA). FIGS. 2A–2C show external scale views of the gas filter 200, having a substantially cylindrical central portion 202. The outlet end 204 is shown end on in FIG. 2C and has an outlet port 206. The outlet end 204 can also include an outlet interface assembly 208, 210, 212, to facilitate connection to a gas line, manifold etc. The inlet end 214 is shown end on in FIG. 2B and includes an inlet port 216 and can also include a fill port 220. The inlet end 216 can include an inlet interface assembly 218, to facilitate connection to a gas line, manifold etc., and the central portion 202 can include mounting brackets 219.

FIGS. 2D–2F show scale views of the inlet end 214 with interface assemblies, where the unbracketed dimensions shown are for a preferred embodiment and are in inches. FIG. 2D shows an end view of the inlet end 214 with the inlet port 216 and a fill port 220. FIG. 2E shows the components of an inlet interface assembly 222, 224, 226, and a porous nickel cup particle filter 228 that in a preferred embodiment is welded to sub-assembly 224. FIG. 2F is a hidden-line side view of an inlet end 214 with an interface assembly and a fill port assembly 230 with plug 232. FIG. 2H shows an end view of the inlet end with assemblies 215 and FIG. 2L shows a cross-section along BB of FIG. 2H. The unbracketed dimensions in FIG. 2L are in inches and the square bracketed dimensions in millimeters (mm). The cross sectional view also shows a portion of the internal chamber 201 into which the inlet particle filter 228 extends. While FIG. 2J shows an exploded assembly drawing (not necessarily to scale) of the inlet end with assemblies 215.

FIGS. 2K–2M show scale views of the outlet end 202 with interface assembly 208, 210, 212, where the unbracketed dimensions shown are for a preferred embodiment and are in inches. FIG. 2K shows an end view of the outlet end 204 with the outlet port 206. FIGS. 2M and 2L shows the components of an outlet interface assembly 208, 210, 212, and 234, and a porous nickel cup particle filter 236 that in a preferred embodiment is welded to sub-assembly 234. FIG. 2L is a hidden-line side view of the outlet end 204 with an outlet interface assembly having a tube 208, an interface fitting 212 with plug 210. FIG. 2N shows a cross-section along GG of end view FIG. 2O and FIG. 2O shows an end view of the outlet end with outlet interface assembly 233. The unbracketed dimensions in FIG. 2N are in inches. The cross sectional view FIG. 2N also shows another portion of the internal chamber 201 into which the outlet particle filter 236 extends. While FIG. 2P shows an isometric view (not necessarily to scale) of the outlet end with interface assembly 233.

FIGS. 2Q–2S show details of the substantially cylindrical portion 202 where all unbracketed dimensions are given in inches. FIG. 2Q shows an isometric view (not necessarily to scale) of the substantially cylindrical portion. FIGS. 2R and 2S are to scale, showing respectively an end view and a cross section along line HH. The cross sectional view FIG. 2S, shows the remaining portion of the internal chamber 201.

Figure 2U:
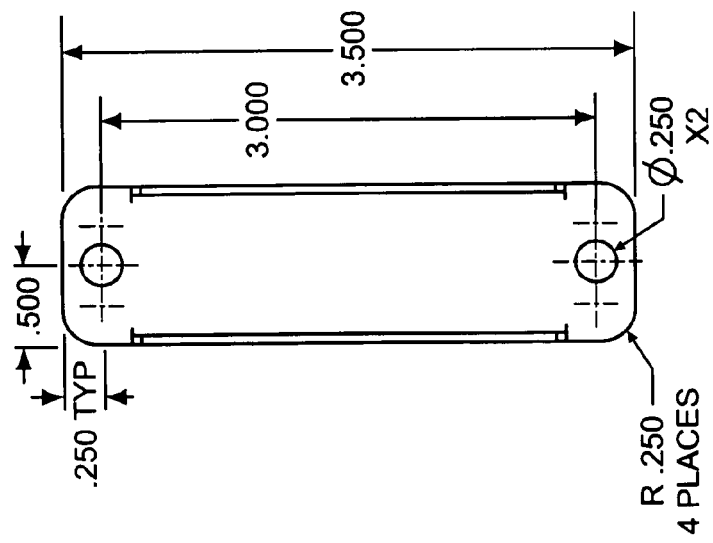
Figure 2V:
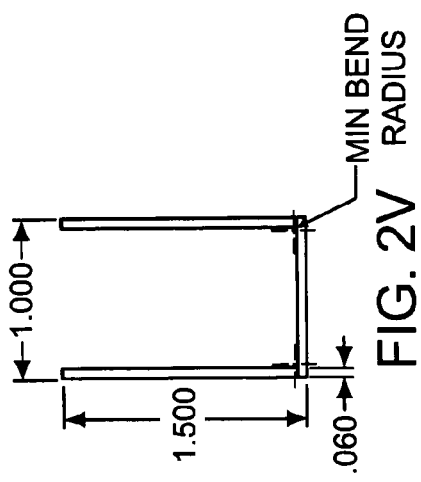

FIGS. 2T–2W show details of a mounting bracket 219, where FIG. 2T is an isometric view not necessarily to scale, and FIGS. 2U–2W are plan views to scale where unbracketed dimensions are in inches.

In one preferred embodiment, the components, materials and hardware of FIGS. 2A–2W are as follows:

0.083", 2.5" outside diameter (OD) Stainless Steel (SS) Tubing, 202;
2.5" SS Pipe Cap (Swagelok B16W-CAP-37-101), 204;
1.4" Inch OD SS Tubing, 208;
4" VCR Short Tube Weld Gland (Swagelok 6LV-4-VCT-3S-4TB3), 210;
1.4"VCR Male Gland Nut (Swagelok SS-4-VCR-4), 212;
BSP Fitting (Swagelok-4TA-7-4RT), 218;
0.06–304 SS Wall Weld Bracket, 219;
BSP Fitting-4-TA-7-4RT (Swagelok), 222;
Nickel (Ni) High Purity Particle Filter Cup, Mott Corp. (part no. 1204380), 228;
Fill Spout Constructed out of Round Stock, Tapped ¼–20, 230;
Machined Washer, Used as Transition, 224;
2.5" SS Pipe Cap with Fill Spout (Swagelok B16W-CAP-37-101), 214;
BSP Fitting-4-TA-7-4RT (Swagelok), 222;
¼" 20 SS Pipe Plug (Swagelok), 232;
Ni High Purity Particle Filter Cup, Mott Corp. (part no 1204380), 236;
¼" OD SS Tubing, Machined to Length, 238;
4" VCR Short Tube Weld Gland (Swagelok 6LV-4VCT-3S-4TB3), 242;
¼" VCR Male Gland Nut (Swagelok SS-4-VCR-4), 240; and
Machine Washer, Used as Transition, 234.

FIGS. 3A–3D illustrate various detailed views of a preferred embodiment of the reactive gas filter 200 of FIGS. 2A–2W including an inlet with inlet assembly 215 and an outlet with outlet assembly 233. In FIGS. 3A–3D, square bracket dimensions are in millimeters and unbracketed dimensions are in inches. In a preferred embodiment 300, the gas filter 200 fits within the three-dimensional footprint 302 illustrated as a shadow-box about the filter.

Figure 4A:
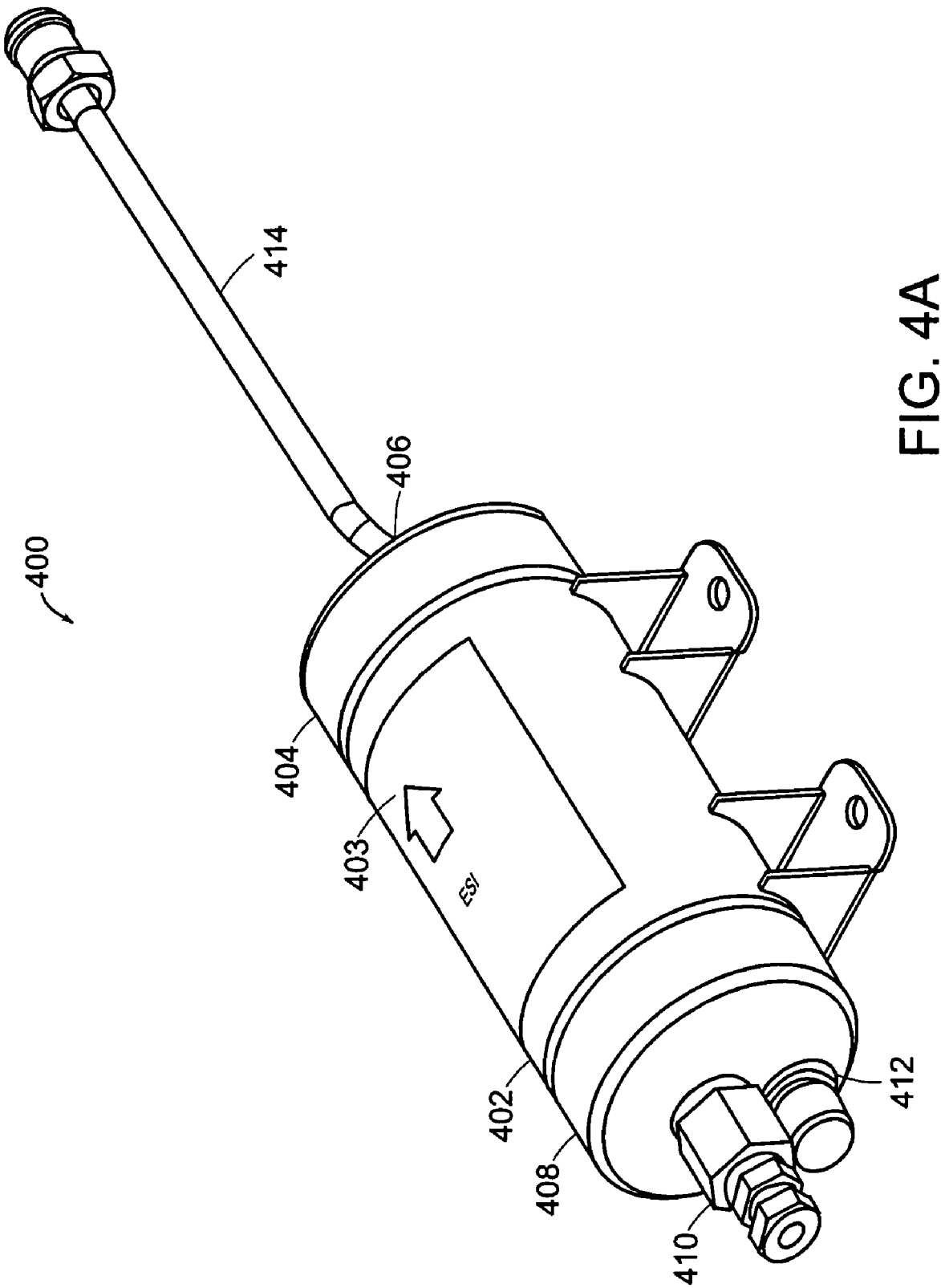
FIG. 4A is an isometric illustration of another preferred embodiment of a reactive gas filter in accordance with the present invention.
Figure 4B:
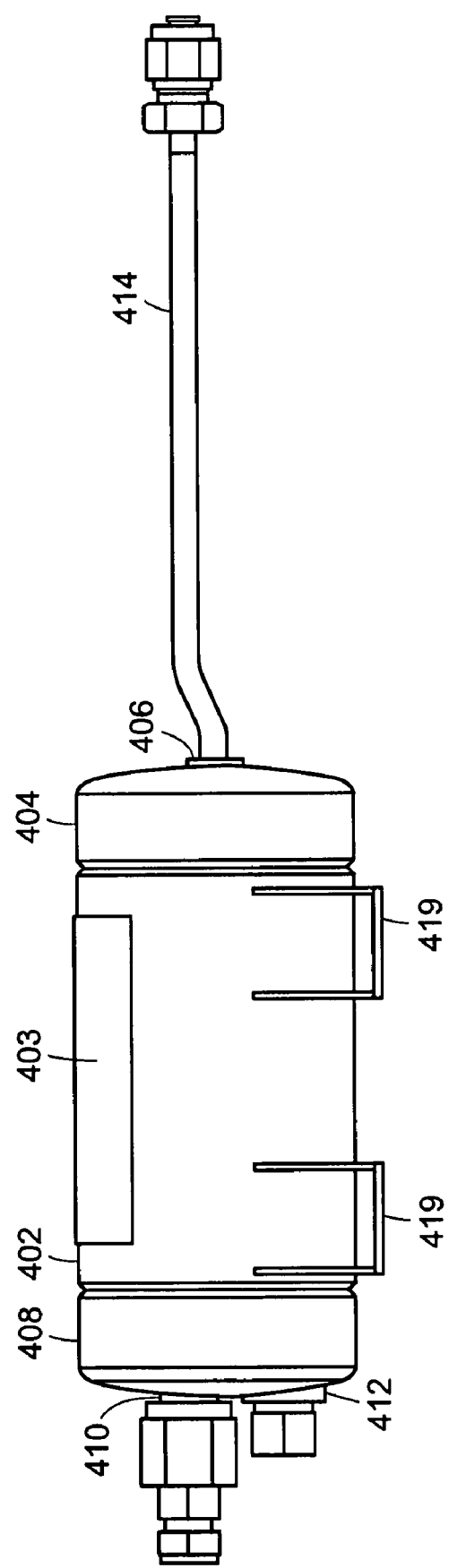
FIG. 4B is a side view of the gas filter of FIG. 4A.

In accordance with another preferred embodiment, the gas filter of the present invention is substantially as shown in FIGS. 4A–4B and 5A–5D. FIGS. 4A–4B present shaded exterior views while FIGS. 5A–5D provide more detailed views. In accordance with a preferred embodiment of the present invention, the gas filter 400 includes substantially cylindrical housing having an internal chamber filled with a filter media. The housing comprises a substantially cylindrical portion 402, an outlet end 404 having an outlet port 406, bracket 419 and an inlet end 408 having an inlet port 410. The inlet port 410 and outlet port 406 do not share a common axis, as the inlet port 410 is placed off of the axis of the substantially cylindrical portion 402 while the outlet port 406 is placed on the axis of the substantially cylindrical portion 402. The housing can also have a fill port 412 for loading the internal chamber with the filter media. The gas filter can also include, for example, an inlet assembly, outlet assembly 414, or both that facilitate connecting the gas filter to a reactive gas source, reactive gas line, manifold, or tool. Also illustrated is a concept for a product label 403 on which is an arrow indicating the recommended direction of gas flow through the gas filter.

Figure 5A:
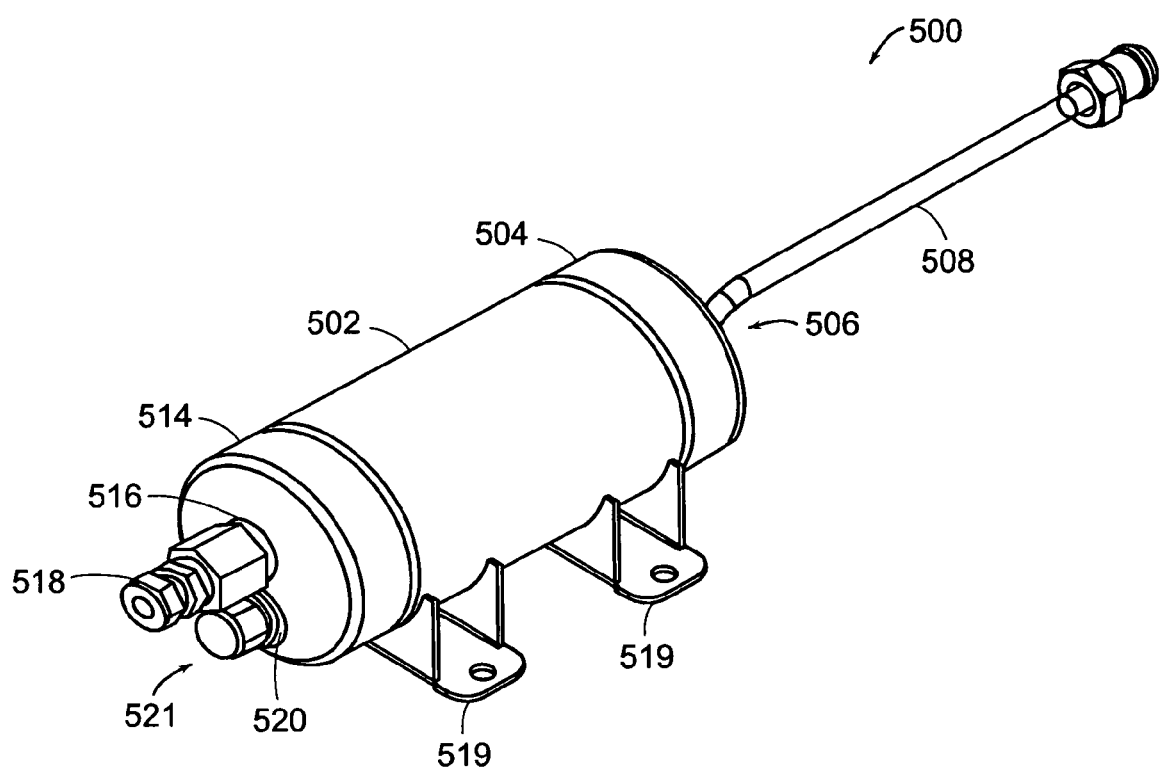
FIG. 5A is an isometric illustration of another preferred embodiment of a reactive gas filter in accordance with the present invention.
Figure 6:
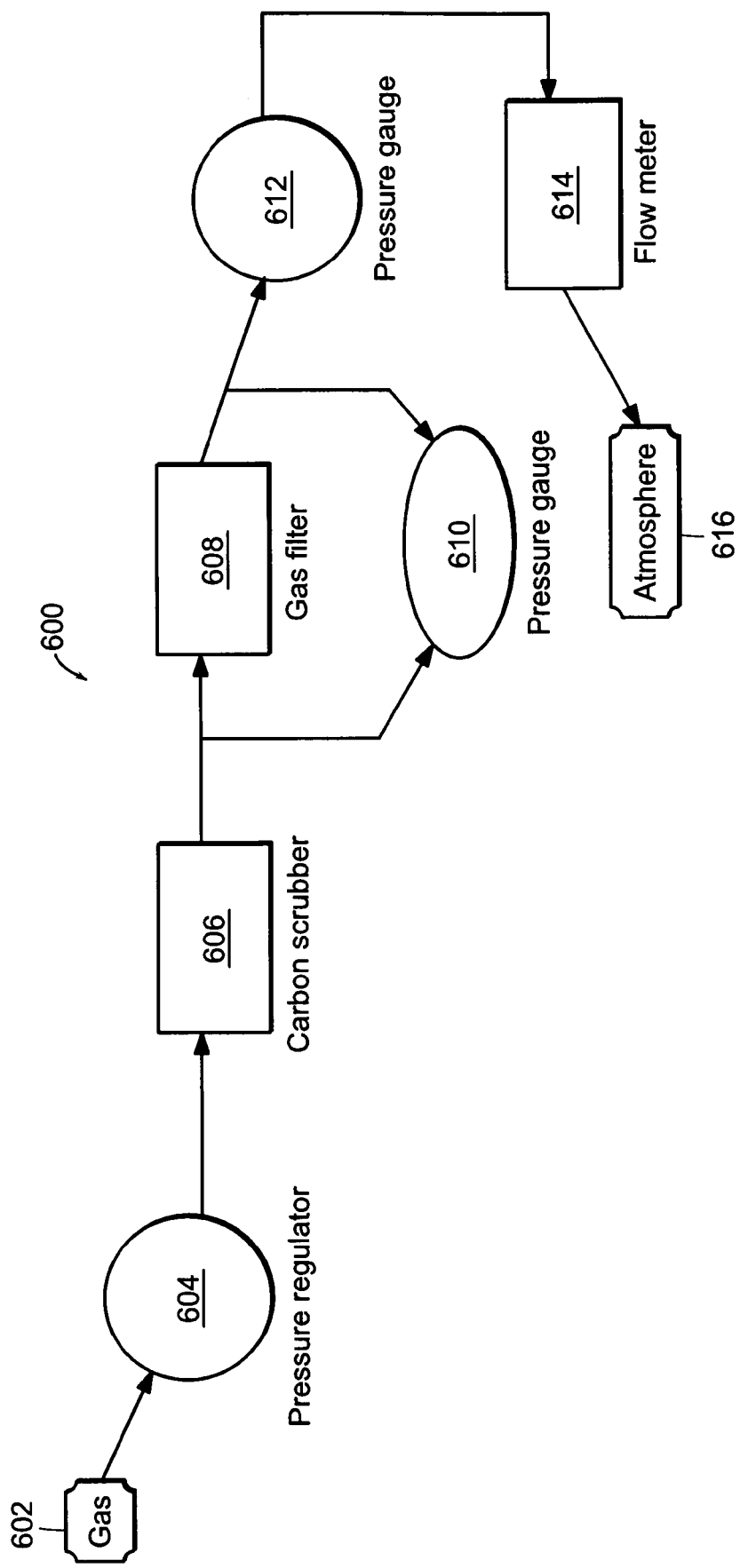
FIG. 6 illustrates a schematic diagram of a system for determining the pressure drop of a gas filter in accordance with the present invention.

FIG. 5A is an exterior isometric view of a gas filter 500 in accordance with a preferred embodiment of the invention. The housing comprises a substantially cylindrical portion 502, an outlet end 504 having and outlet port 506, and an inlet end 514 about 10% phosphoric acid treated GAC with an average mesh size in the range from about 20 U.S. mesh to about 50 U.S. mesh.

Figure 7A:
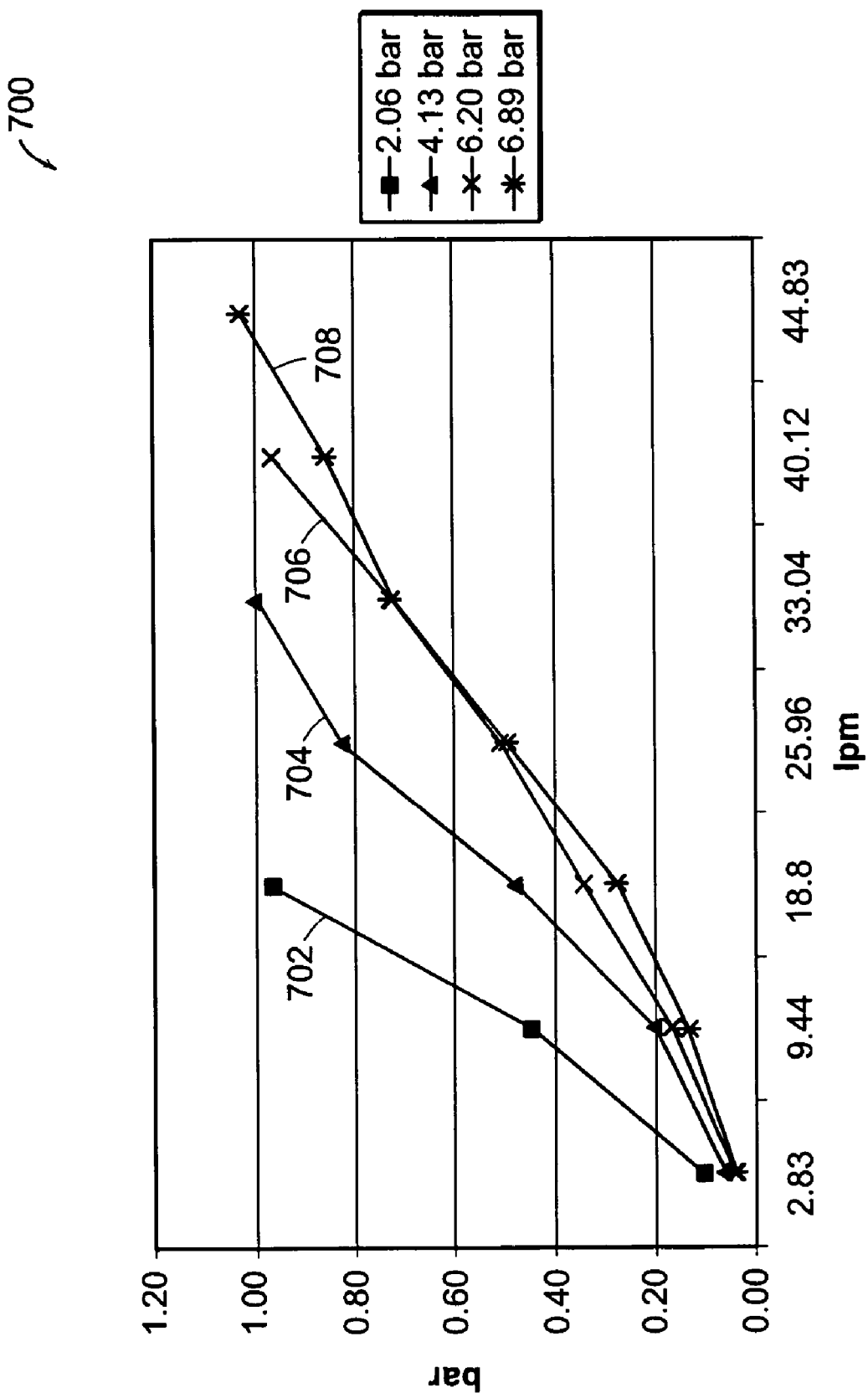
FIGS. 7A–7C are plots of pressure drop versus flow rate at various inlet gas stream pressures for gas filters substantially similar to those illustrated in FIGS. 1–5D, the plots were determined using a system substantially similar to that illustrated in FIG. 6.
Figure 7B:
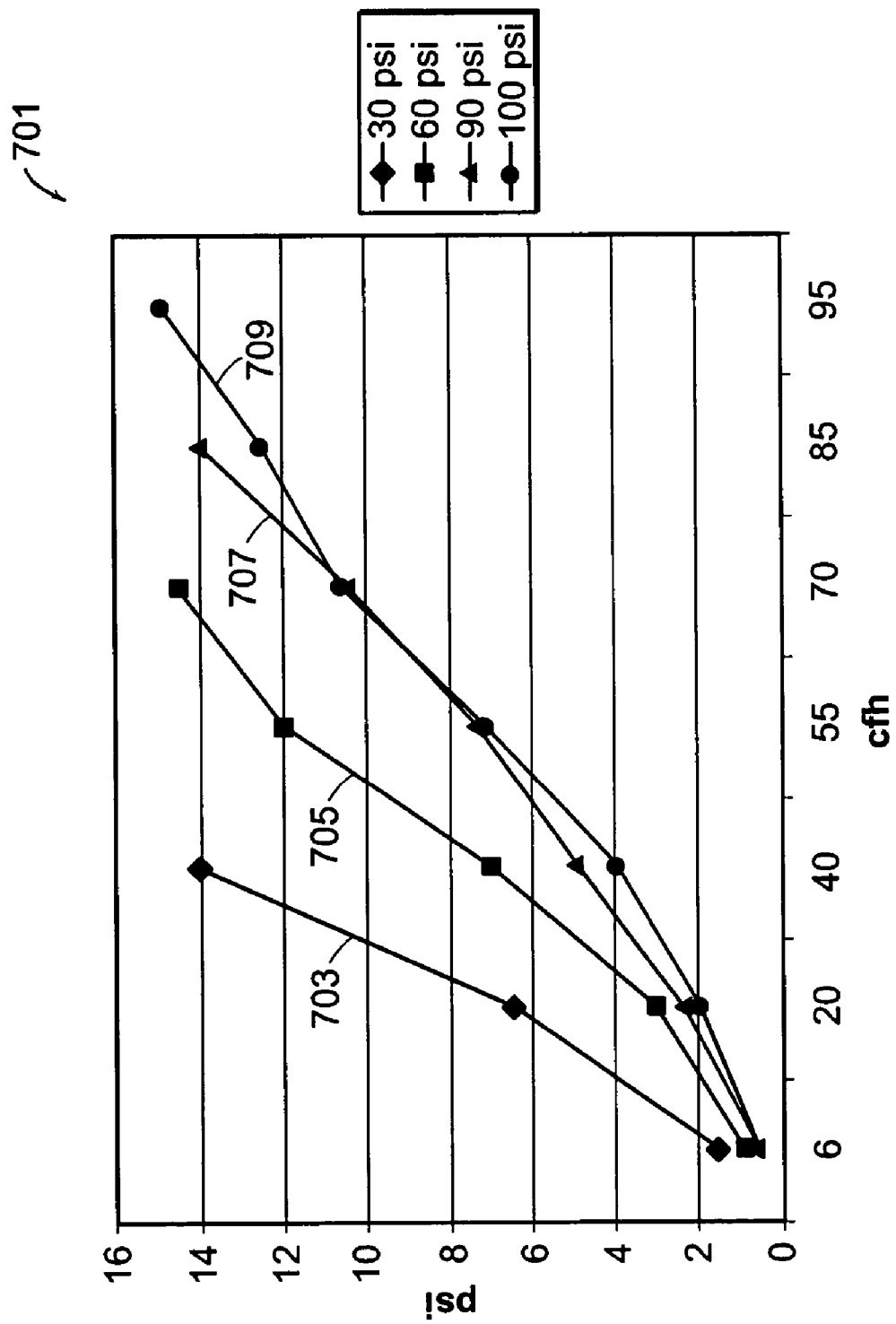

Referring to FIGS. 7A and 7B, FIG. 7A is a plot 700 pressure drop (in bars) versus outlet flow rate (in slpm) at various inlet gas stream pressures, whereas FIG. 7B is a plot 701 pressure drop (in psi) versus outlet flow rate (in standard cubic feet per hour "cfh") at various inlet gas stream pressures. The data shown in FIGS. 7A and 7B is tabulated in Table 2. Both FIGS. 7A and 7B show the variation in pressure drop with inlet gas pressure at about 30 psi (2.06 bar) 702, 703; at about 60 psi (4.13 bar) 704, 705; at about 90 psi 6.20 bar) 706, 707; and at about 100 psi (6.89 bar) 708, 709, and the performance of the gas filter at these inlet pressures over a range of outlet flow rates.

a range of outlet flow rates. The plot 710 also shows polynomial fits 722, 724, 726, 728 and 730 to the 2.06 bar data 722, the 4.13 bar data 724, the 6.20 bar data 726, the 6.89 bar data 728 and the 7.5 bar data 730.

TABLE 3

| 1 pm | 2.06 bar | 4.13 bar | 6.20 bar | 6.89 bar | 7.5 bar |
|---|---|---|---|---|---|
| 2.8 | 0.1 | 0.1 | 0.0 | 0.0 | 0.1 |
| 9.4 | 0.4 | 0.2 | 0.2 | 0.1 | 0.1 |
| 18.9 | 0.7 | 0.5 | 0.3 | 0.3 | 0.3 |
| 26.0 | 1.0 | 0.8 | 0.5 | 0.5 | 0.4 |
| 29.5 | 1.4 | | | | |
| 33.0 | | 4.0 | 0.7 | 0.7 | 0.6 |
| 40.1 | | 1.4 | 1.0 | 0.9 | 0.8 |
| 44.8 | | 1.8 | 1.1 | 1.0 | 1.0 |
| 47.2 | | 1.9 | | | |
| 56.6 | | | 1.7 | 1.5 | 1.4 |
| 62.5 | | | 2.3 | | |
| 68.4 | | | | 2.5 | |
| 70.8 | | | | | 2.6 |

Figure 8M:
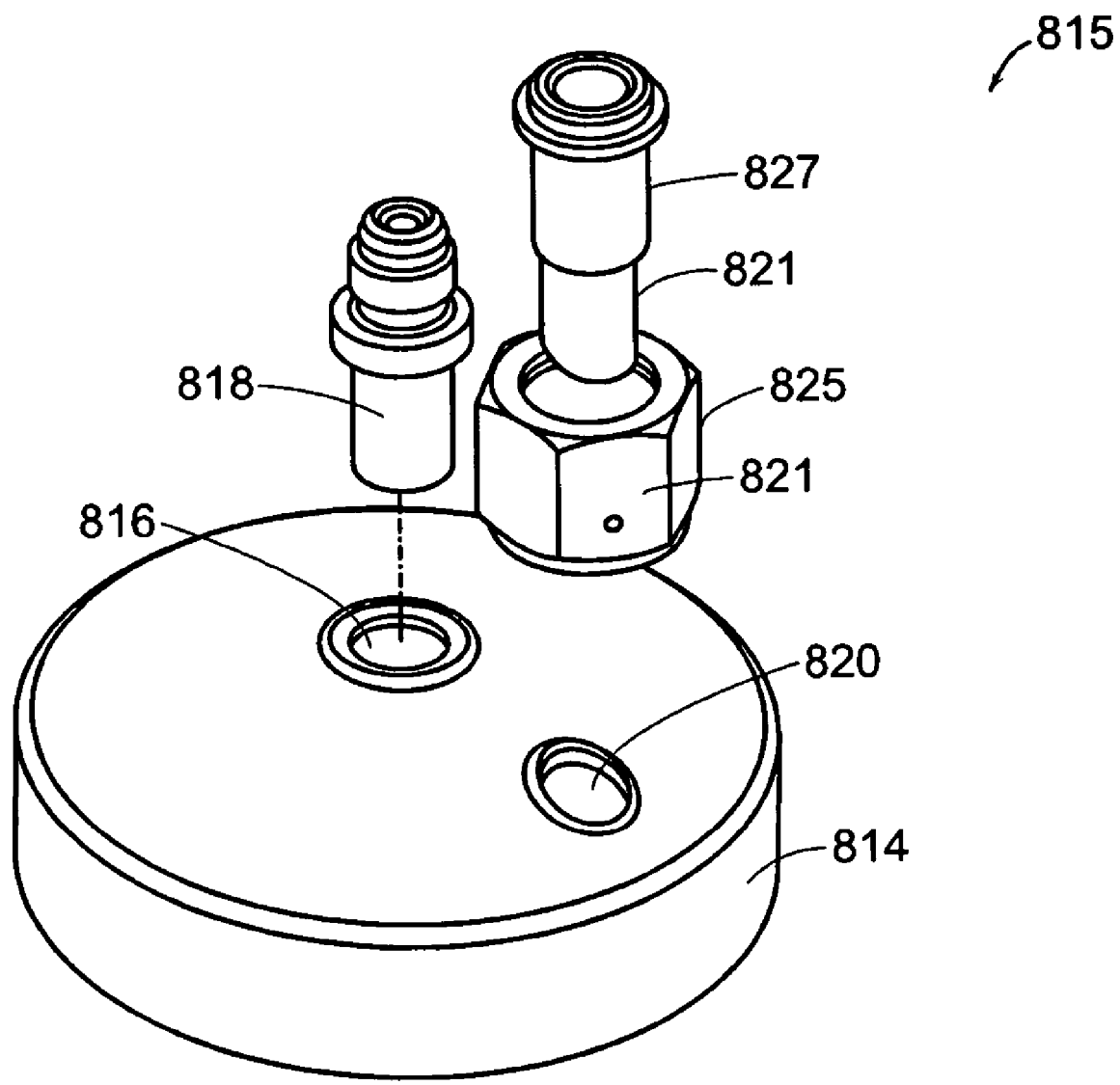
Figure 8Q:
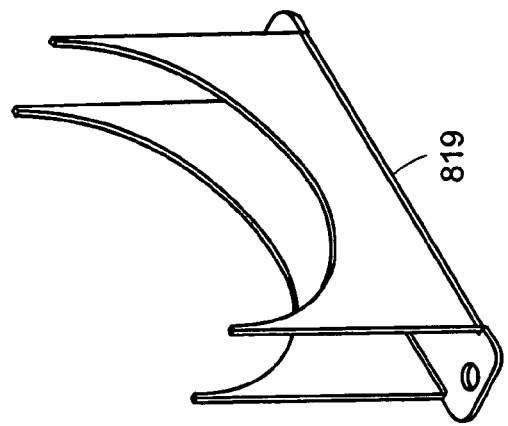
Figure 8T:
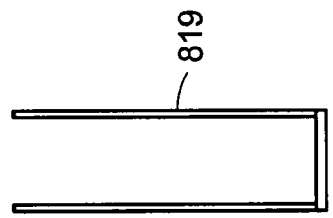
Figure 8R:
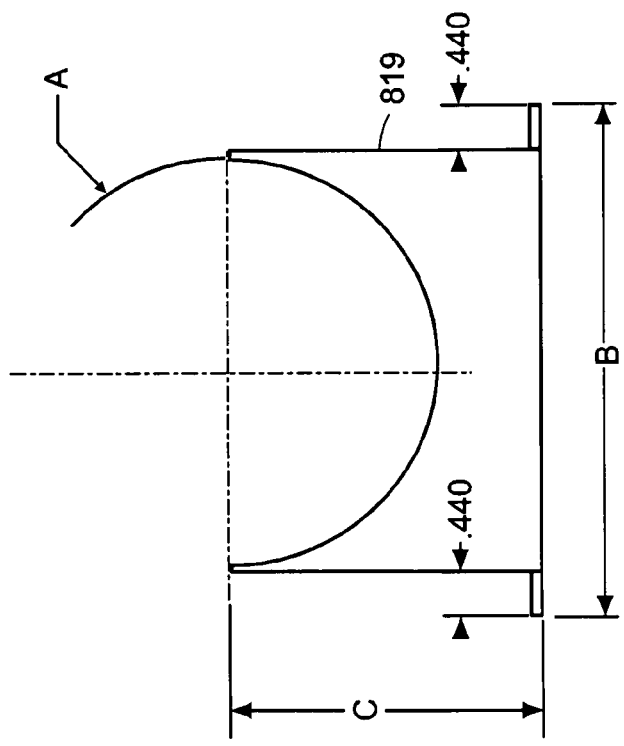
Figure 8S:
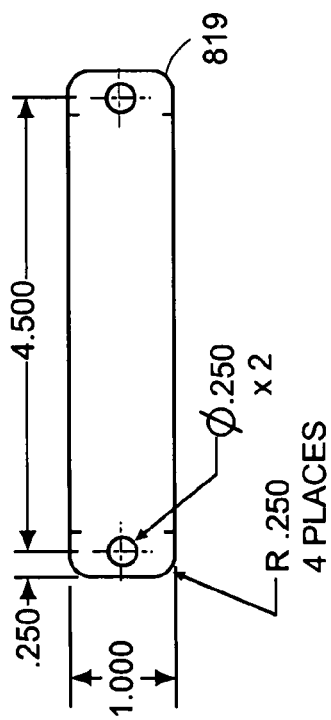
Figure 8U:
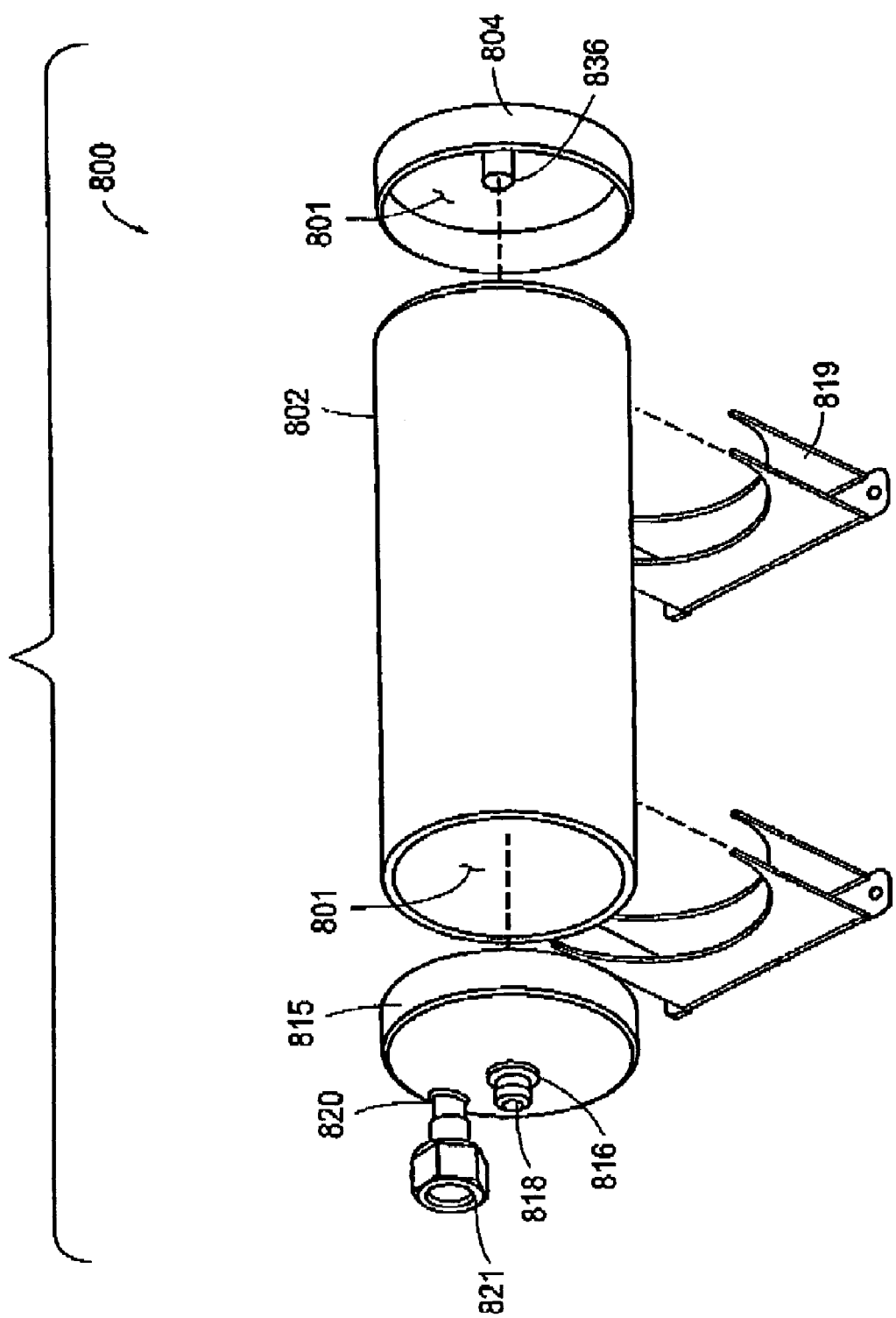
Figure 8V:
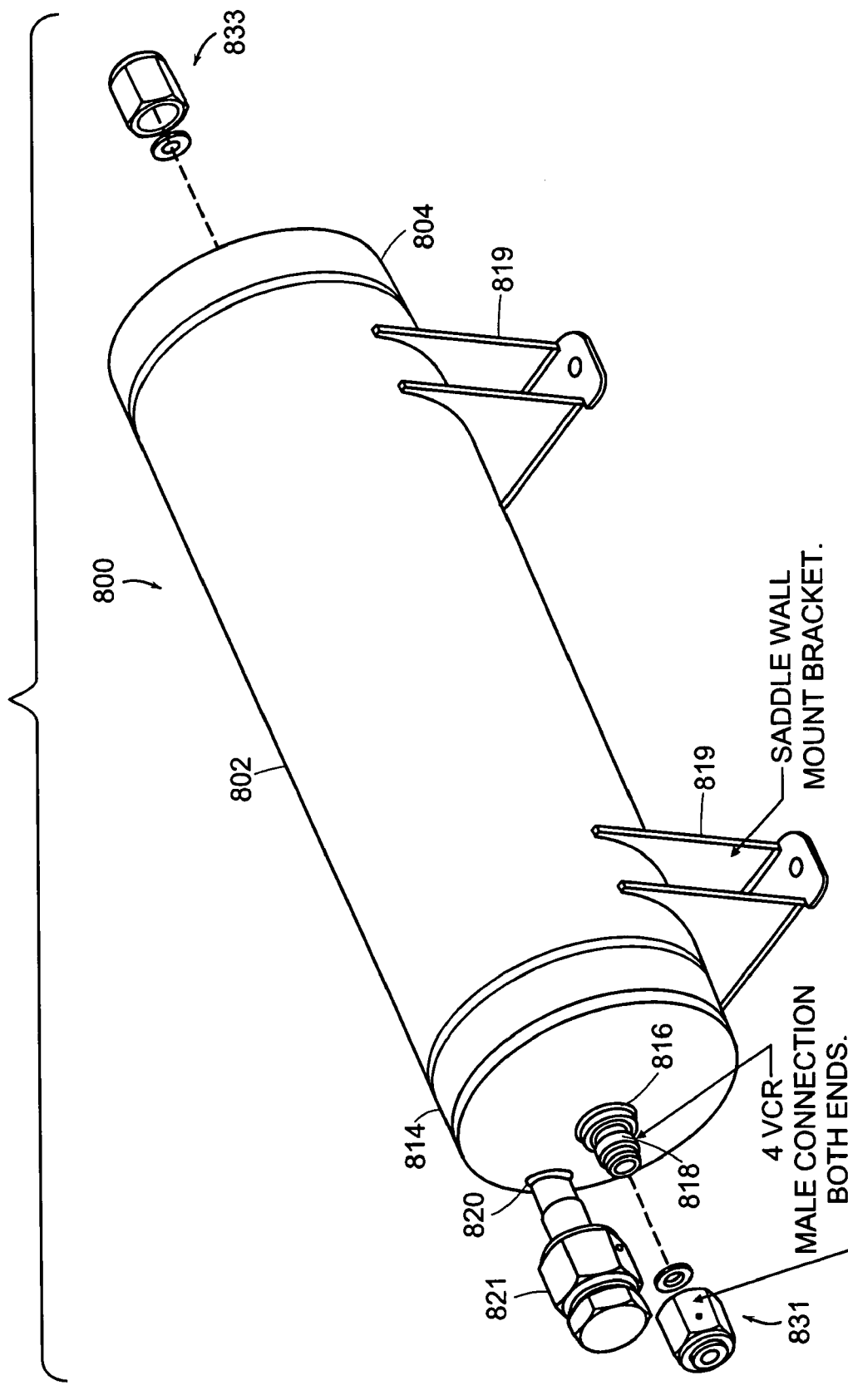

FIGS. 8A–8V present detailed views of another preferred embodiment of a gas filter in accordance with the present invention for use with a reactive gas such as clean dry air (CDA). FIG. 8A shows an isometric view not necessarily to scale of the gas filter 800, while FIGS. 8B–8G show external scale views where unbracketed dimensions are in inches and square bracketed dimensions are in mm. The gas filter 800 comprises a substantially cylindrical central portion 802 an outlet end 804 having an outlet port 806, that can further include an outlet interface assembly 808 to facilitate connection to a gas line, manifold etc. The inlet end 814 is shown end-on in FIGS. 8D and 8G and includes an inlet port 816 and can also include a fill port 820. The inlet end 814 can include an inlet interface assembly 818, to facilitate connection to a gas line, manifold etc., the central portion 802 can include mounting brackets 819, and the fill port 820 can include a fill port assembly 821 to facilitate adding the filter media and readily sealing the fill port.

FIG. 8H shows an isometric view, not necessarily to scale, of the inlet end with assemblies 815 of the gas filter 800, and FIG. 8I shows an isometric view 817, not necessarily to scale, of an inlet end without a fill port which is substantially identical to the outlet end with an outlet interface assembly. FIGS. 8J–8L show scale views of the inlet end with interface assemblies 815. FIG. 8J is a hidden-line side view of an inlet

TABLE 2

| cfh | cfm | 1 pm | 30 psi | 2.06 bar | 60 psi | 4.13 bar | 90 psi | 6.20 bar | 100 psi | 6.89 bar |
|---|---|---|---|---|---|---|---|---|---|---|
| 6 | 0.10 | 2.83 | 1.50 | 0.10 | 0.90 | 0.06 | 0.60 | 0.04 | 0.70 | 0.05 |
| 20 | 0.33 | 9.44 | 6.50 | 0.45 | 3.00 | 0.21 | 2.40 | 0.17 | 2.00 | 0.14 |
| 40 | 0.67 | 18.88 | 14.00 | 0.97 | 7.00 | 0.48 | 5.00 | 0.34 | 4.00 | 0.28 |
| 55 | 0.92 | 25.96 | | | 12.00 | 0.83 | 7.40 | 0.51 | 7.20 | 0.50 |
| 70 | 1.17 | 33.04 | | | 14.50 | 1.00 | 10.50 | 0.72 | 10.60 | 0.73 |
| 85 | 1.42 | 40.12 | | | | | 14.00 | 0.97 | 12.50 | 0.86 |
| 95 | 1.58 | 44.83 | | | | | | | 14.90 | 1.03 |

Figure 7C:
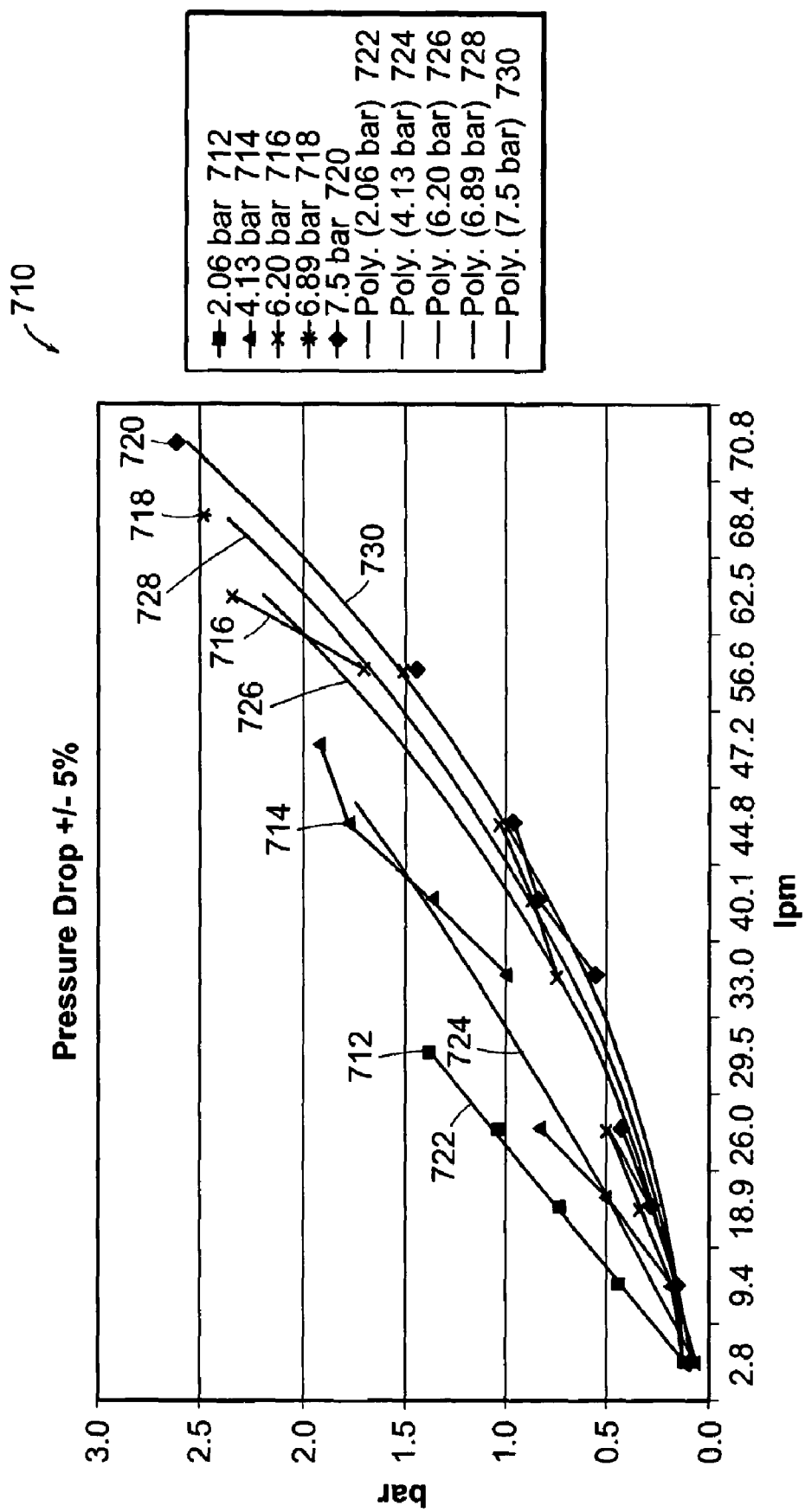

FIG. 7C is a plot 710 pressure drop (in bars) versus outlet flow rate (in slpm) at various inlet gas stream pressures. The data shown in FIG. 7C is tabulated in Table 3 and the error on each measurement is estimated to be ±5%. FIG. 7C shows the variation in pressure drop with inlet gas pressure at about 2.06 bar 712; at about 4.13 bar 714; at about 6.20 bar 716,; at about 6.89 bar 718, and at about 7.5 bar 720, and the performance of the gas filter at these inlet pressures over end 814 with an inlet interface assembly 818 and a fill port assembly 821; also shown is the a porous nickel cup inlet particle filter 828. FIG. 8K shows an end view of the inlet end with assemblies 815 and FIG. 8L shows a cross-section along 8L—8L of FIG. 8L. FIG. 8K also shoes a portion of the internal chanter 801 into which the inlet particle filter 828 extends. FIG. 8M shows an exploded assembly drawing (not necessarily to scale) of the inlet end with assemblies 815. FIG. 8M illustrates the assembly of the inlet interface assembly 818 into the inlet port 816 of the inlet end 814, and components 827, 825 of the fill port assembly 812 in relation to the fill port 820.

The outlet end 804 and outlet interface assembly 808 are substantially identical to, respectively, the inlet end and inlet interface assembly as, for example, illustrated in FIG. 8I.

FIGS. 8N–8P show details of the substantially cylindrical portion 802 where all unbracketed dimensions are given in inches. FIG. 8N shows an isometric view (not necessarily to scale) of the substantially cylindrical portion 802. FIGS. 8O and 8P are to scale, showing respectively an end view and a cut-away side view. The cut away view of FIG. 8O, shows a portion of the internal chamber 801.

FIGS. 8Q–8T show details of a mounting bracket 819, where FIG. 8Q is an isometric view not necessarily to scale, and FIGS. 8R–8T are plan views to scale where unbracketed dimensions are in inches.

FIGS. 8U and 8V show further isometric assembly drawings of the gas filter 800, neither of which are necessarily to scale. FIG. 8U shows an exploded assembly drawing which illustrates the portion of the internal chamber 801 in the substantially cylindrical portion 802 and the outlet end 804. In addition, FIG. 8U provides a view of the outlet particle filter 836. FIG. 8V shows an isometric view of a preferred embodiment of a gas filter in accordance with the invention 800 and an exploded assembly view of an inlet interface assembly 816 with plug 831 and an outlet interface assembly (hidden in view) with plug 833.

Figure 9:
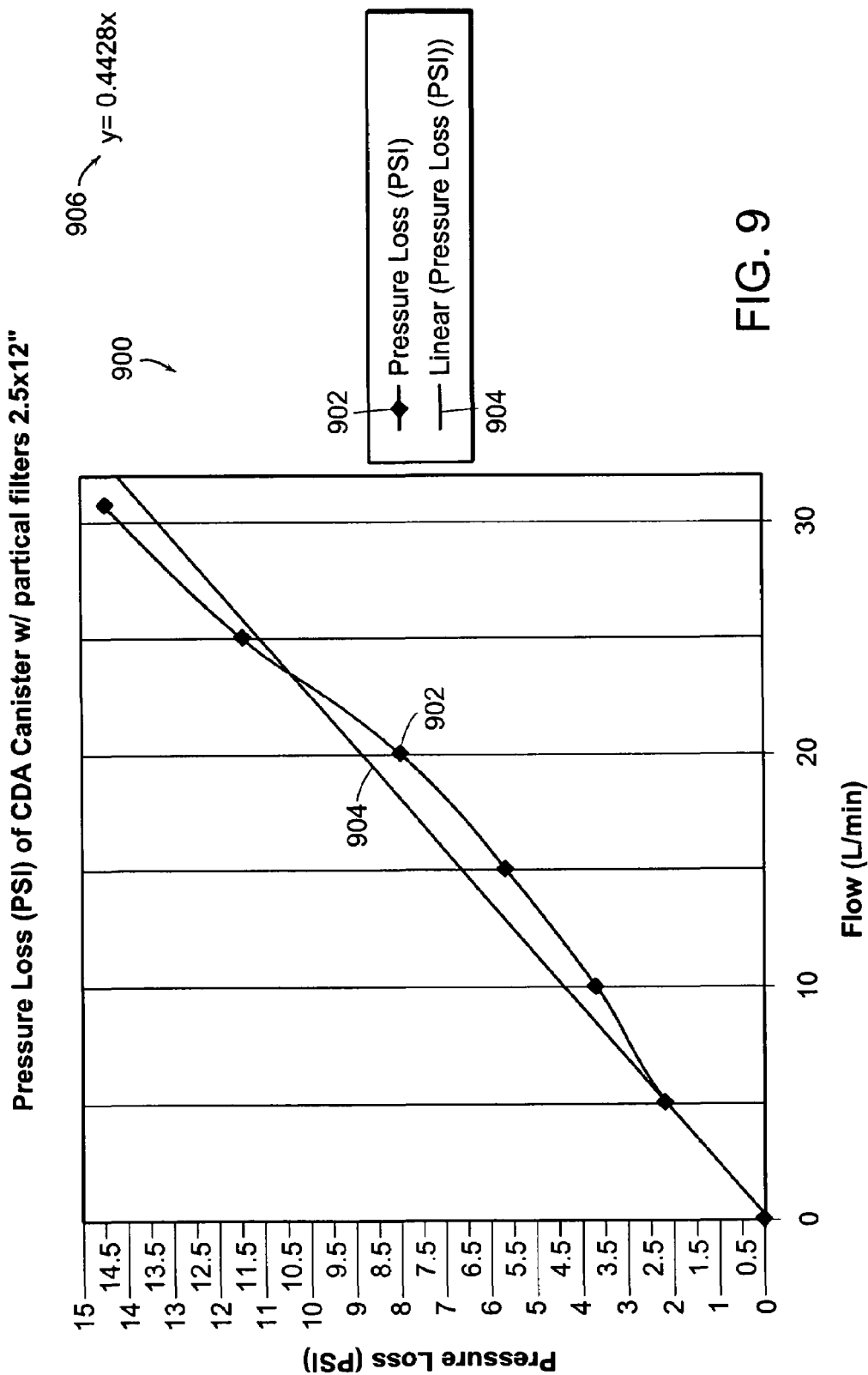
FIG. 9 is a plot of pressure drop versus flow rate at various inlet gas stream pressures for a prior art clean dry air filter.

In one preferred embodiment, the components, materials and hardware of FIGS. 8A–8V are as follows:

0.083" wall, 4" OD 304 Stainless Steal (SS) Pipe, 802;
4" OD Pipe Cap SS, 804;
0.06–304 SS Wall Weld Bracket, 819;
4" OD Pipe Cap SS with and without Fill Spout Hole, 814;
High Purity Particle Filter, Mott Corporation (part no.), 828;
Swagelok 8-VCR Gland Fitting SS, 827; and
Swagelok 8-VCR Female Nut SS, 825.
High Purity Particle Filter, Mott Corporation (part no.), 836;

FIG. 9, shows, for comparison, plots of pressure drop (in psi) versus outlet flow rate (in slpm) at various inlet gas stream pressures for a gas filter (CDA canister) not in accordance with the present invention. FIG. 9 shows a plot 900 for an inlet gas pressure of about 90 psig and the CDA canister (2.5 inches wide by 12 inches long) with 0.003 micron particle filters external to the canister, where the diamonds 902 are actual data points and the line 904 is a linear fit of the data (the formula for the fitted line 906 is given at the top of the plot).

Figure 10:
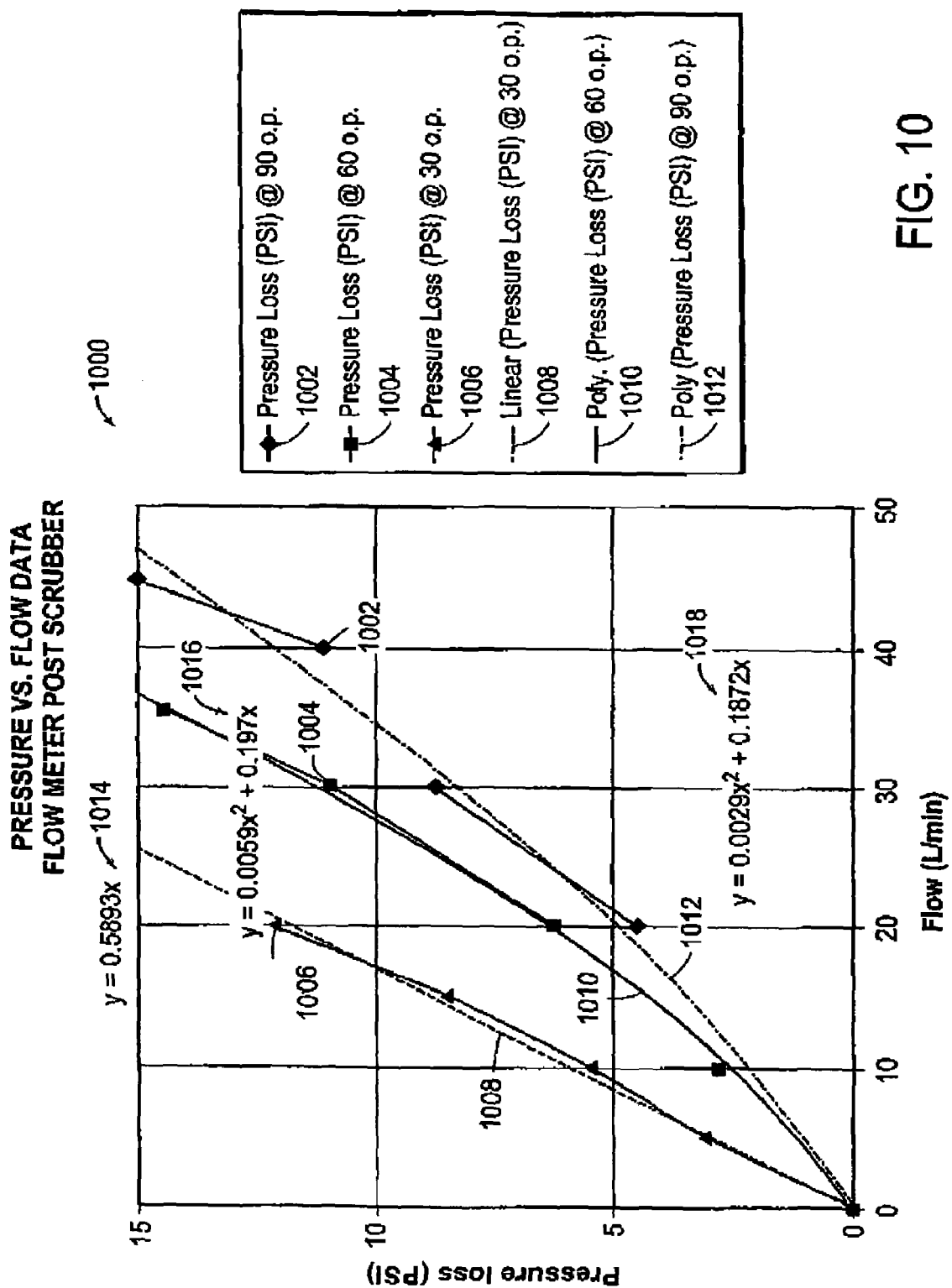
FIG. 10 is a plot of pressure drop versus flow rate at various inlet gas stream pressures for gas filters substantially similar to those illustrated in FIGS. 8A–8V.

FIG. 10 shows pressure drop test results for a gas filter in accordance with the invention that is substantially similar to the preferred embodiment of FIGS. 8A–8V. FIG. 10 plot pressure drop (in psi) versus flow rate (in slpm) at various inlet gas stream pressures, the data shown in FIG. 10 is tabulated in Table 4. The test results shown in FIG. 10 is for a gas filter with a gas flow meter positioned after the gas filter. The volume of filter media in the test of FIG. 10 was about 2.6 liters and comprised about 80% GAC with an average mesh size in the range from about 20 U.S. mesh to about 50 U.S. mesh, about 10% potassium carbonate treated GAC with an average mesh size in the range from about 20 U.S. mesh to about 50 U.S. mesh, and about 10% phosphoric acid treated GAC with an average mesh size in the range from about 20 U.S. mesh to about 50 U.S. mesh.

FIG. 10 shows a plot 1000 of pressure loss for inlet gas pressures of 30 psig, 60 psig and 90 psig. The diamonds 1002 are actual data points for 90 psig, the squares 1004 for 60 psig, and the triangles 1006 for 30psig inlet gas pressures. Also shown are fits to the data and the formulas for the fitted equations noted on and about the plot. The plot 1000 shows: a linear fit to the 30 psig data 1008 and fitted function 1014; a polynomial fit to the 60 psig data 1010 and fitted function 1016; and a polynomial fit to the 90 psig data 1012 and fitted function 1018.

TABLE 4

| Flow (L/min) | Flow (SCFH) | Pressure Loss (PSI) @90 o.p. | Pressure Loss (PSI) @60 o.p. | Pressure Loss (PSI) @30 o.p. |
| --- | --- | --- | --- | --- |
| 0 | 0 | 0 | 0 | 0 |
| 5.0 | 10.6 | | | 3.1 |
| 10.0 | 21.2 | 2.75 | 2.8 | 5.5 |
| 15.0 | 31.8 | | | 8.5 |
| 20.0 | 42.4 | 4.5 | 6.2 | 12.2 |
| 30.0 | 63.5 | 8.75 | 11 | |
| 35.4 | 75.0 | | 14.5 | |
| 40.0 | 84.7 | 11.1 | | |
| 44.8 | 94.9 | 15 | | |

Figure 11A:
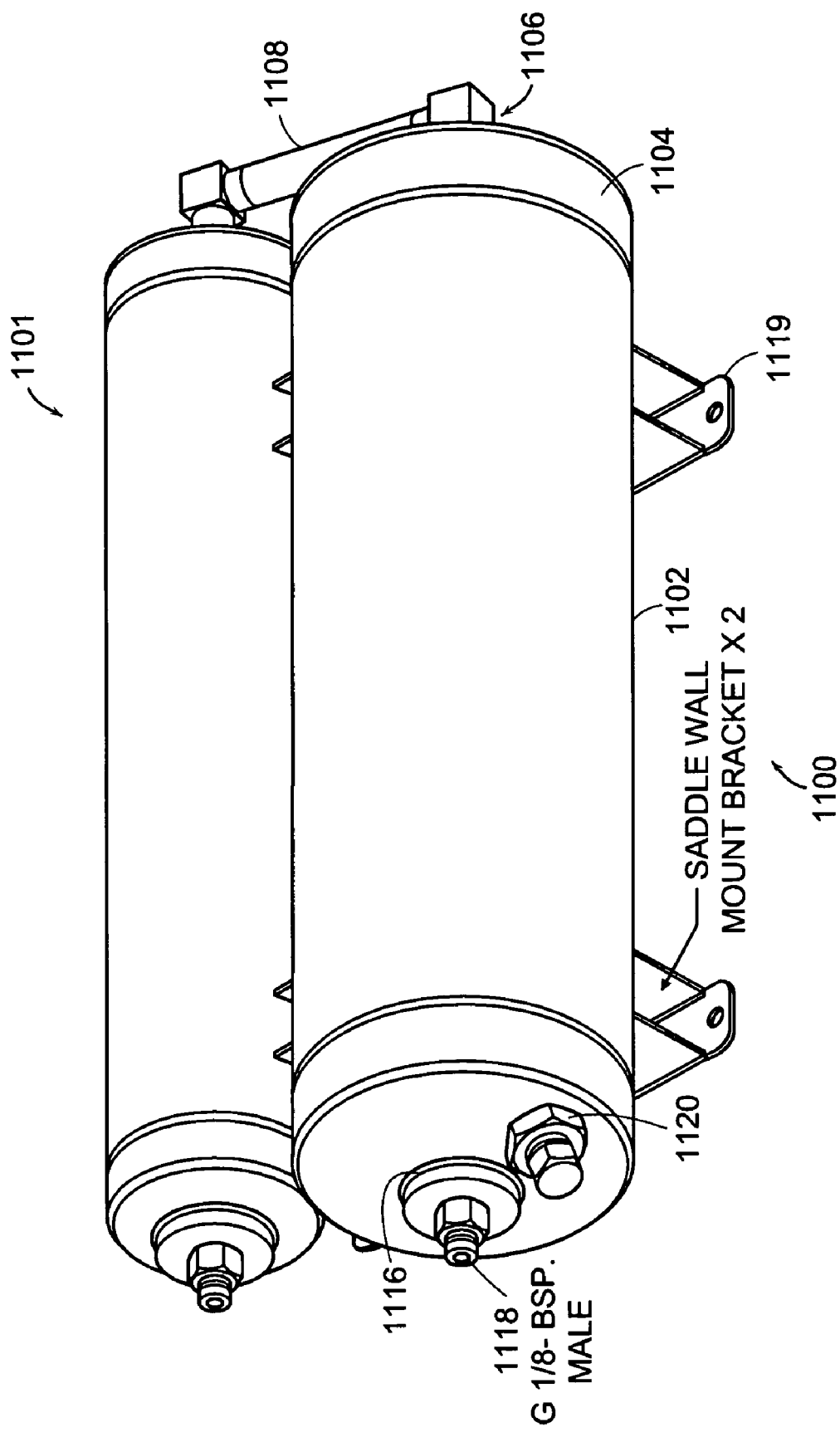
FIGS. 11A–11Z, 11AA–11AZ, and 11BA–11BJ illustrate various detailed views of a preferred embodiment of a reactive gas filter in accordance with the present invention, where the various parts in FIGS. 11B–11F, 11H–11J, 11L–11N, 11P–11R, 11T–11V, 11X–11Z, 11AB–11AD, 11AF–11AG, 11AJ–11AL, 11AN–11AP, 11AR–11AT, 11AV–11AX, 11AZ, 11BB, 11BD, 11BF, 11BH, and 11BJ are to scale, and FIGS. 11A, 11G, 11K, 11O, 11S, 11W, 11AA, 11AE, 11AI, 11AM, 11AQ, 11AU, 11AY, 11BA, 11BC 11BE, 11BG, and 11BI are various isometric views and non-isometric views not necessarily drawn to scale.
Figures 11B, 11C:
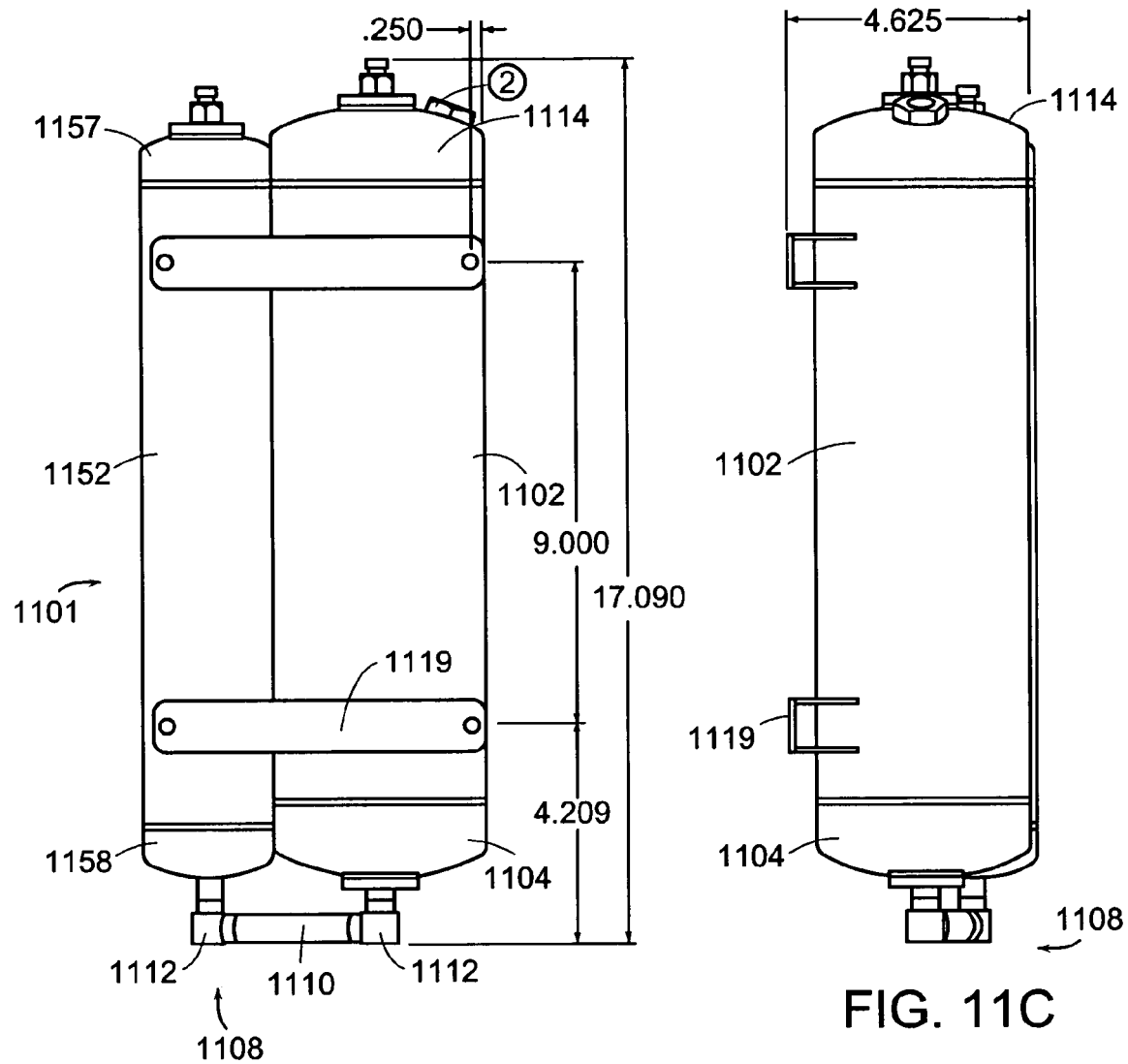

FIGS. 11A–11BJ present detailed views of another preferred embodiment of a gas filter in accordance with the present invention, for use with a reactive gas such as clean dry air (CDA). FIG. 11A shows an isometric view, not necessarily to scale, of a gas filter 1100 in accordance with a preferred embodiment of the invention and a gravity compensator 1101. FIGS. 11B–11F show external scale views where unbracketed dimensions are in inches and square bracketed dimensions are in mm. The gas filter 1100 comprises a substantially cylindrical portion 1102 an outlet end 1104 having an outlet port 1106, that can further include an outlet interface assembly 1108, in this case to facilitate connection to a gravity compensator 1101. The inlet end 1114 is shown end-on in FIG. 11D and includes an inlet port 1116 and can also include a fill port 1120. The inlet end 1114 can include an inlet interface assembly 1118, to facilitate connection to a gas line, manifold etc., the central portion 1102 can include mounting brackets 1119, and the fill port 1120 can include a fill port assembly 1121 to facilitate adding the filter media and readily sealing the fill port 1120.

Figure 11G:
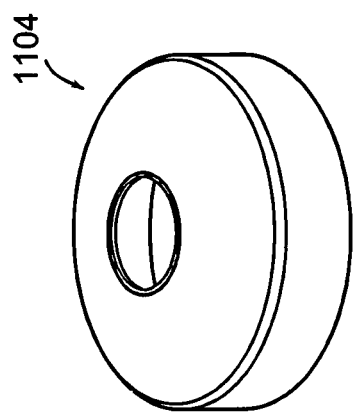
Figure 11J:
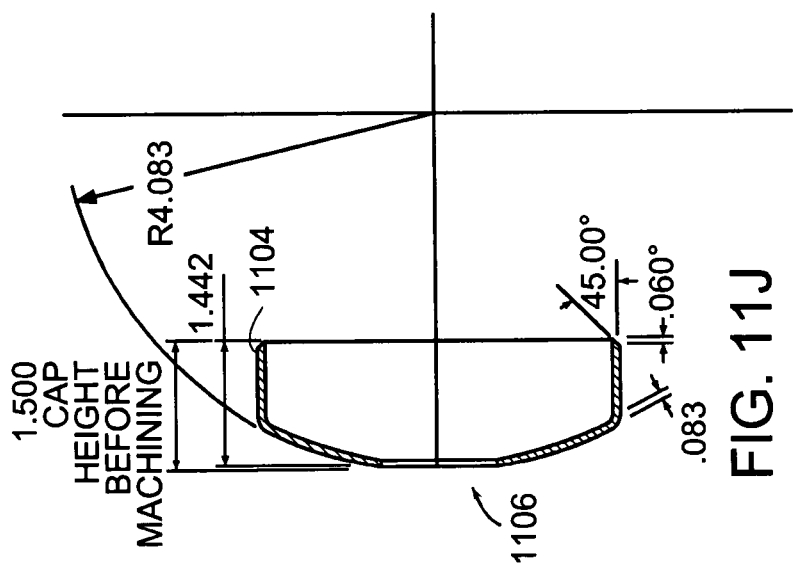
Figure 11H:
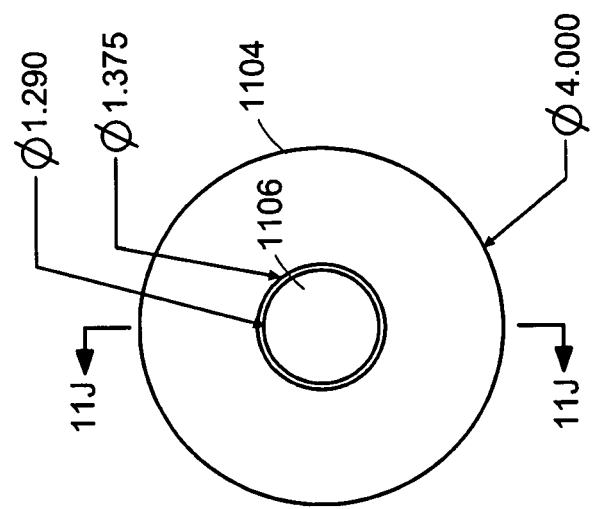
Figure 11I:
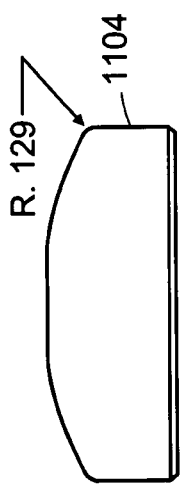
Figure 11K:
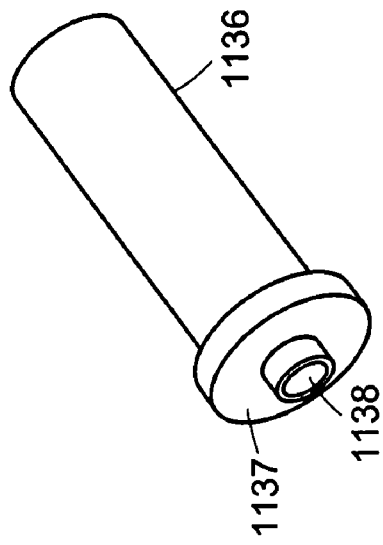
Figure 11L:
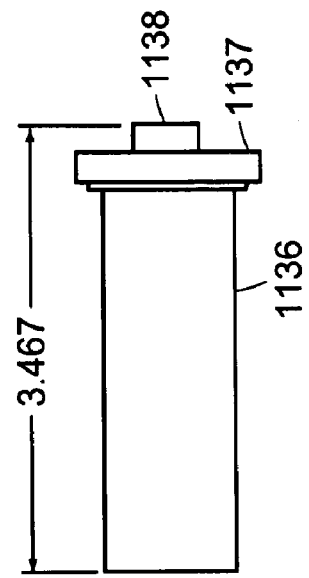
Figure 11M:
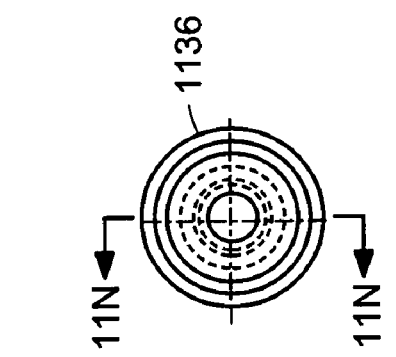
Figure 11N:
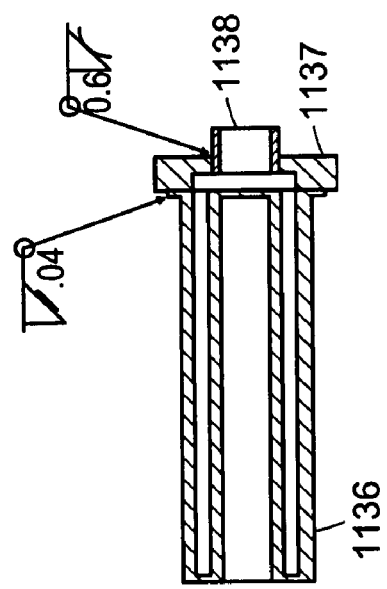
Figure 11O:
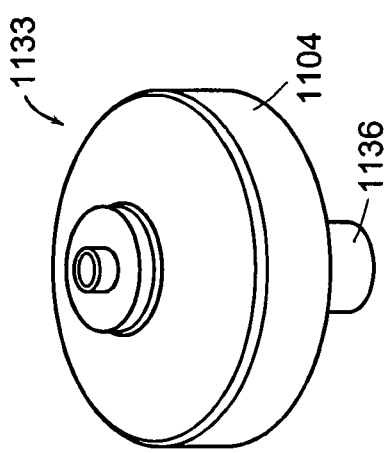
Figure 11R:
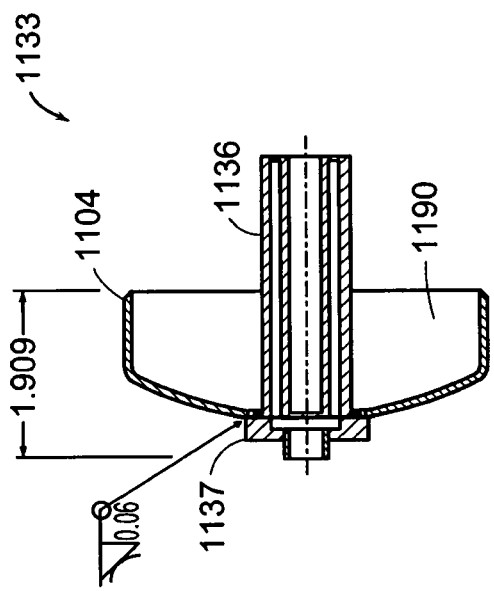
Figure 11Q:
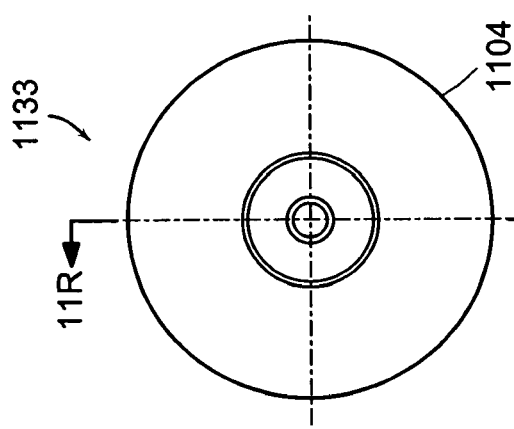
Figure 11P:
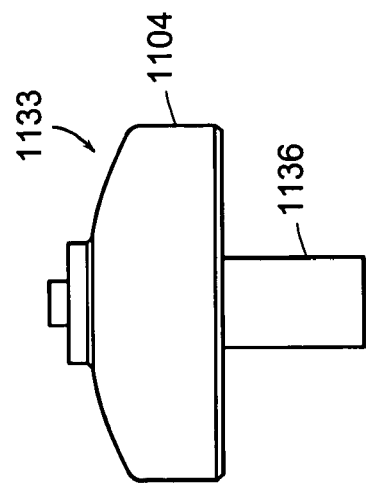

FIG. 11G shows an isometric view, not necessarily to scale, of the outlet end 1104, while FIGS. 11H–11J show views to scale where indicated dimensions are in inches. FIGS. 11H and 11I present, respectively, end and side views showing the outlet port 1106 in the outlet end 1104, and FIG. 11J shows a cross-sectional view along line 11J—11J in FIG. 11H FIGS. 11K–11N show details of an outlet particle filter 1136 and an outlet interface assembly 1137, 1138. FIG. 11K shows an isometric view, not necessarily to scale, while FIGS. 11L–11N show views to scale where indicated dimensions are in inches. FIG. 11L shows a side view and FIG. 11N shows a cross-sectional view along line 11N—11N in FIG. 11M. FIG. 11O shows an isometric view, not necessarily to scale, of the outlet end with outlet interface assembly 1133 and a portion of the outlet particle filter 1136, while FIGS. 11P–11R show views to scale where indicated dimensions are in inches. FIGS. 11P and 11Q present, respectively, side and end views of the outlet end with outlet interface assembly 1133, and FIG. 11R shows a cross sectional view along line 11R—11R in FIG. 11Q. In addition, FIG. 11R shows a portion of the internal chamber 1190 of the gas filter 1100.

Figure 11S:
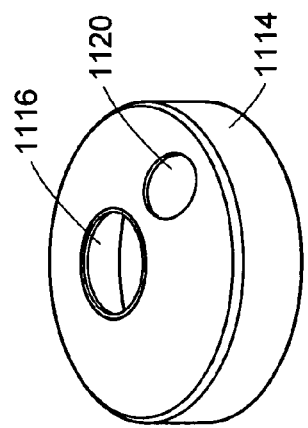
Figure 11V:
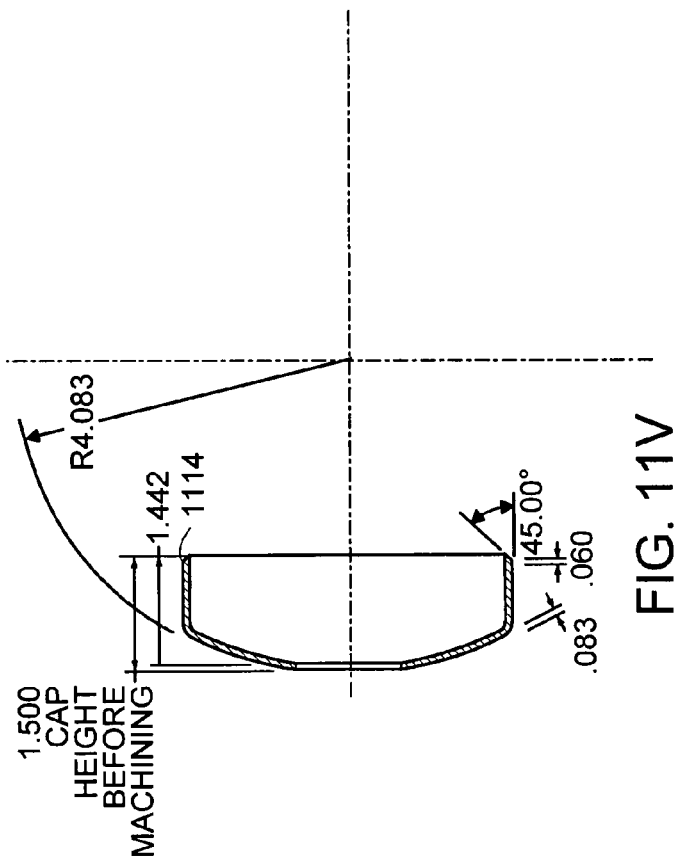
Figure 11T:
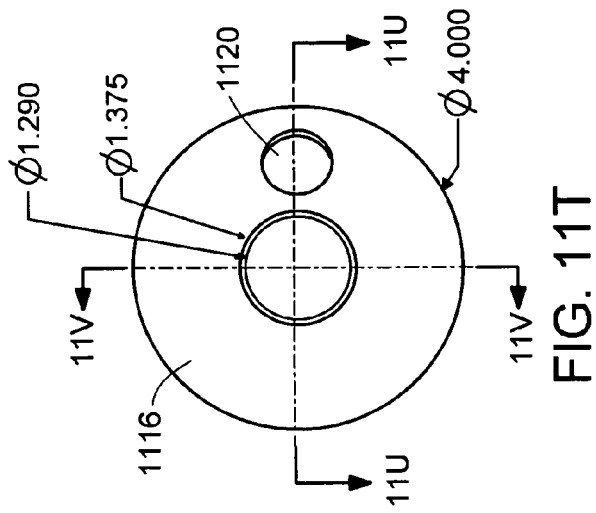
Figure 11U:
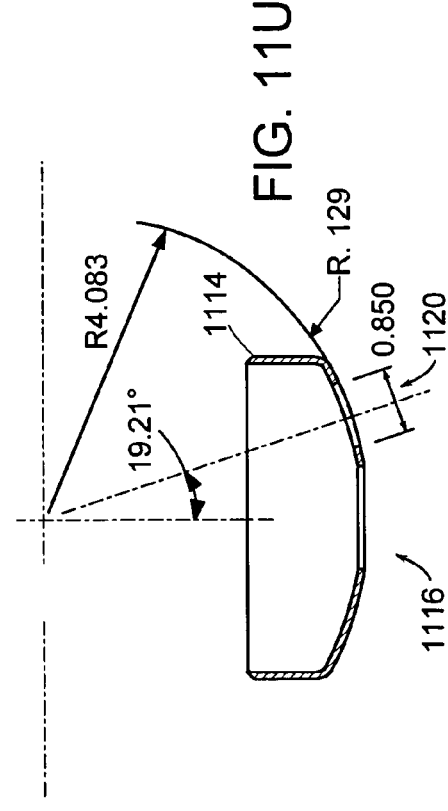
Figure 11W:
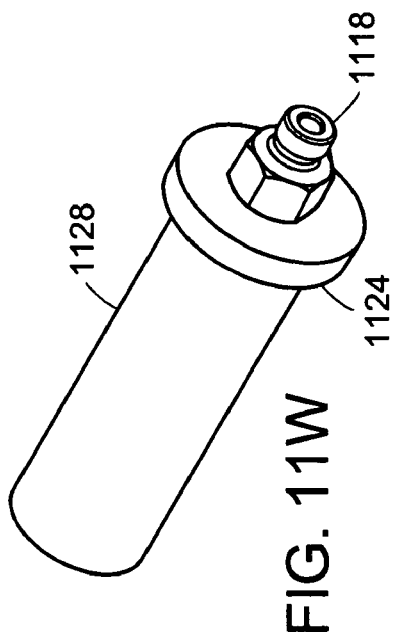
Figure 11Z:
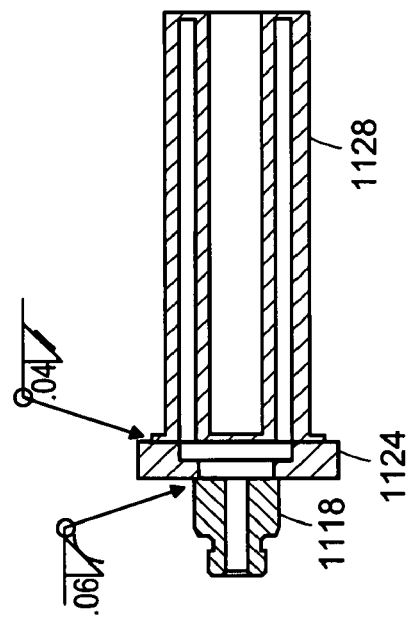
Figure 11Y:
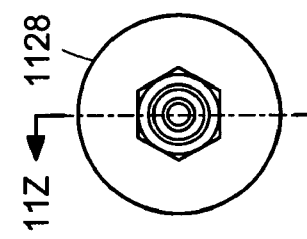
Figure 11X:
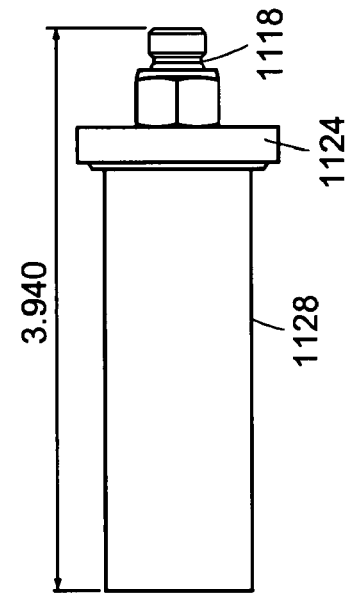
Figure 11A:
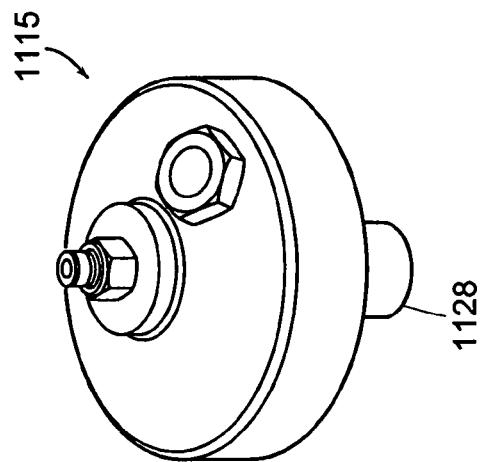
Figure 11A:
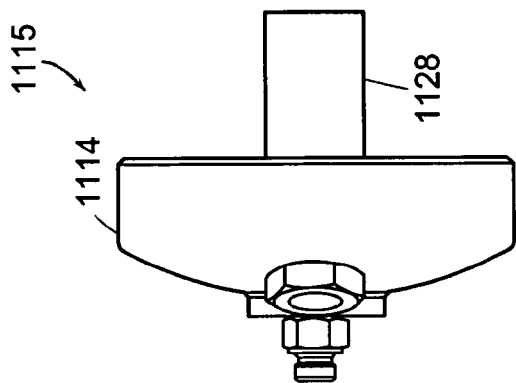
Figure 11A:
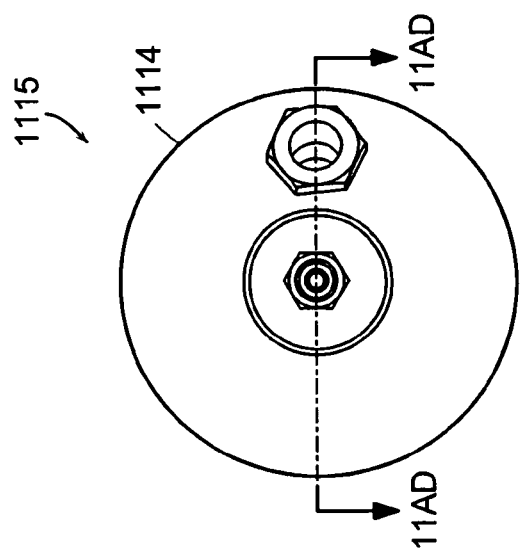
Figure 11A:
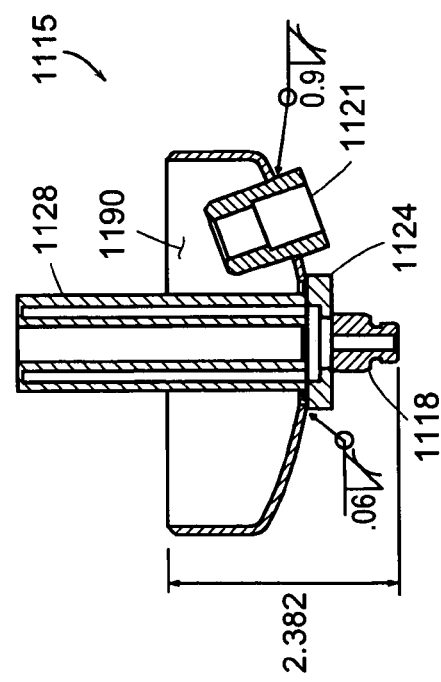
Figure 11A:
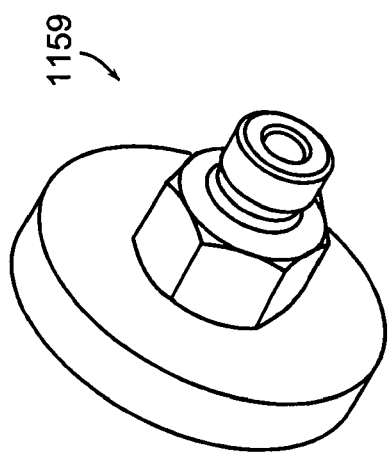
Figure 11A:
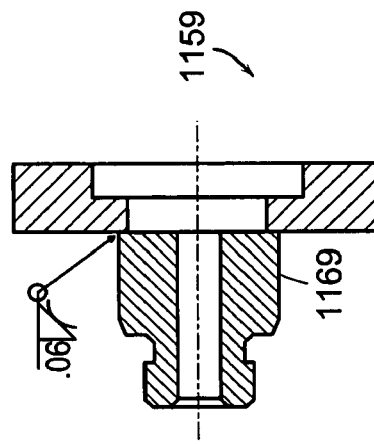
Figure 11A:
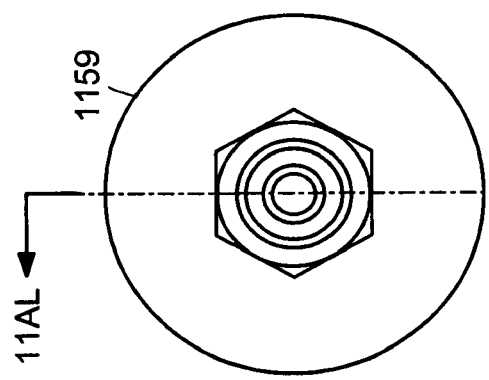
Figure 11A:
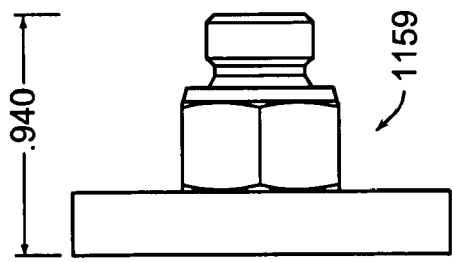
Figure 11A:
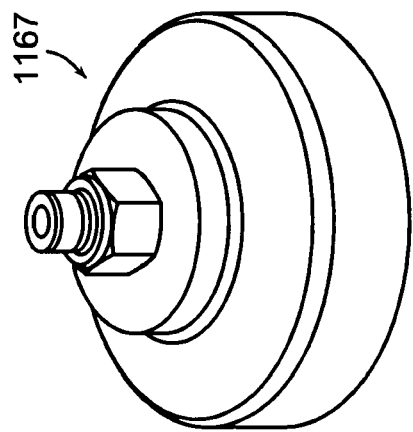
Figure 11A:
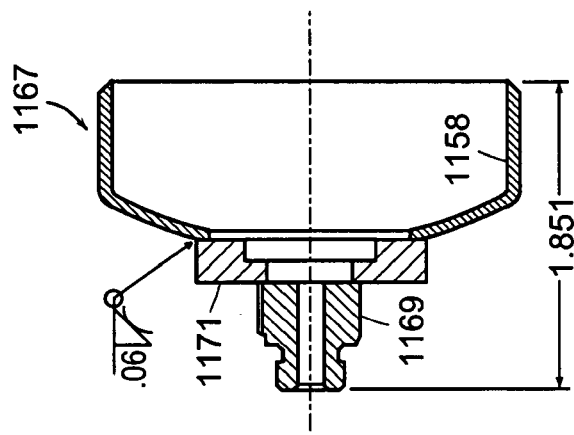
Figure 11A:
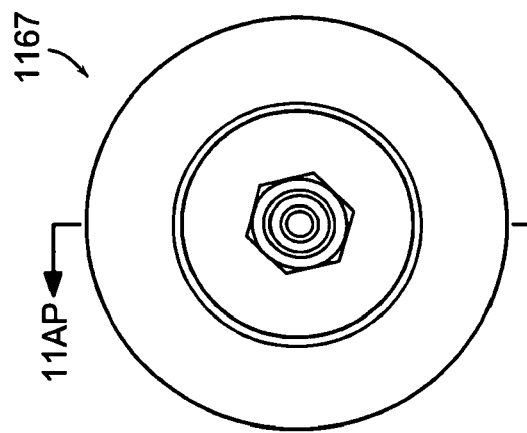
Figure 11A:
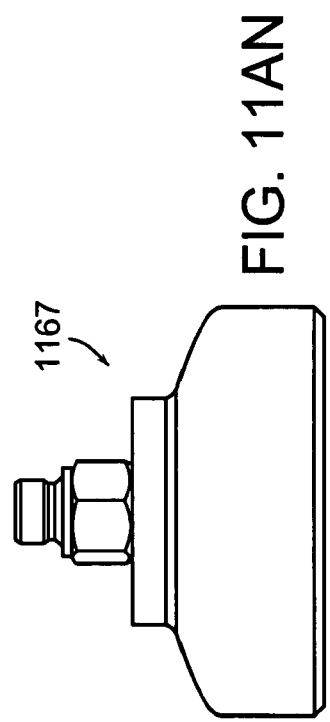
Figure 11A:
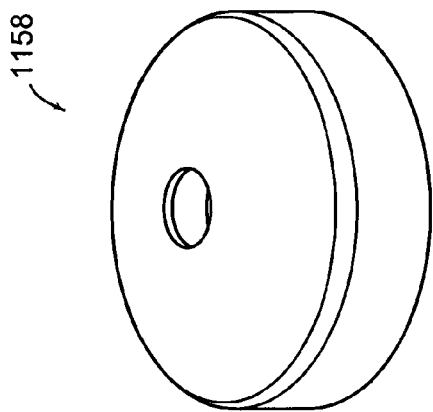
Figure 11A:
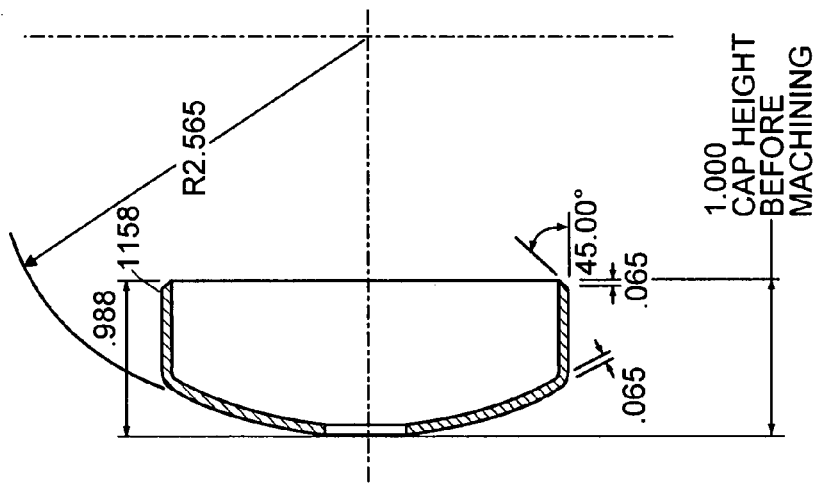
Figure 11A:
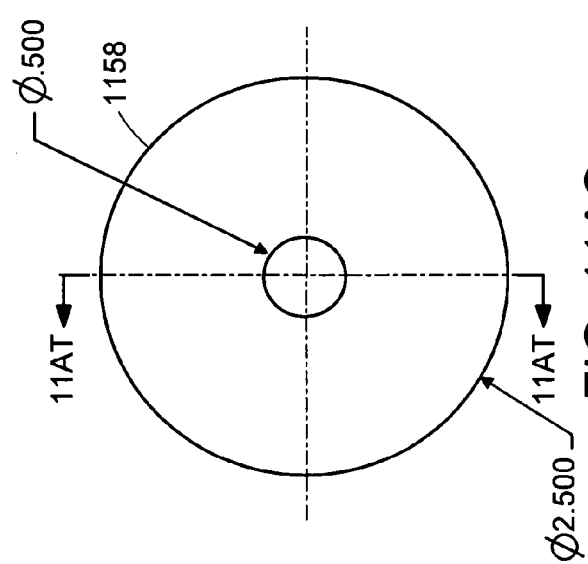
Figure 11A:
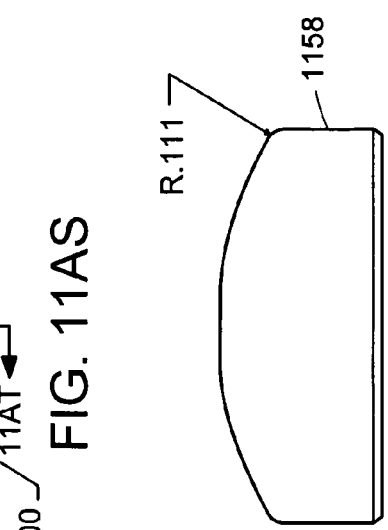
Figure 11A:
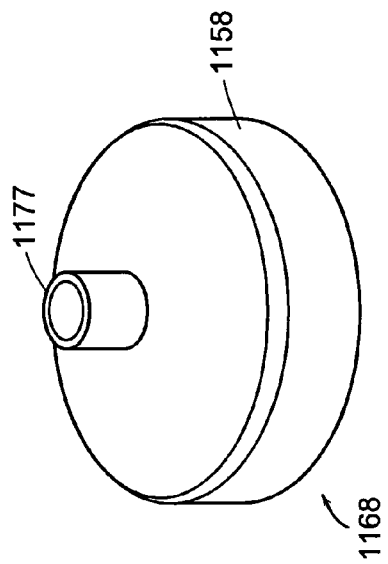
Figure 11A:
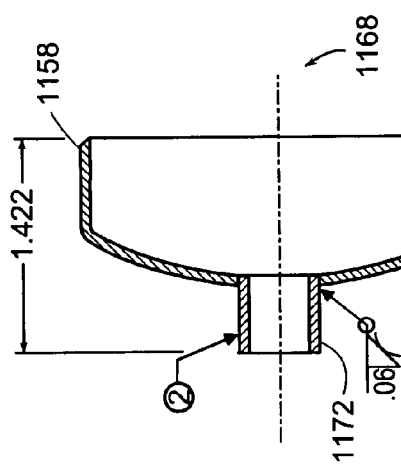
Figure 11A:
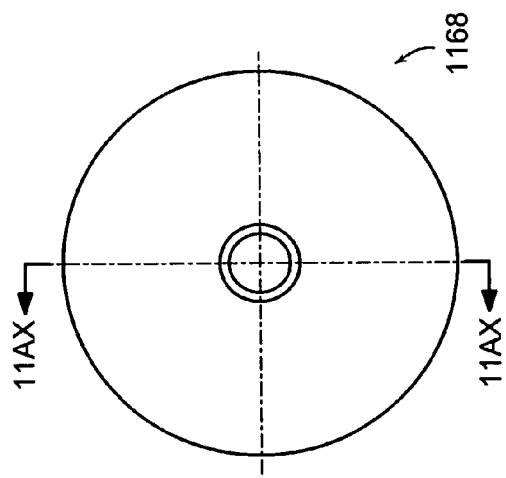
Figure 11A:
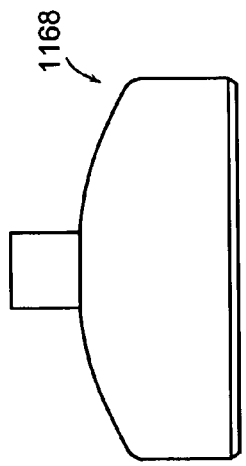
Figure 11A:
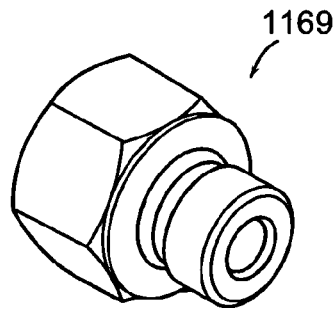
Figure 11A:
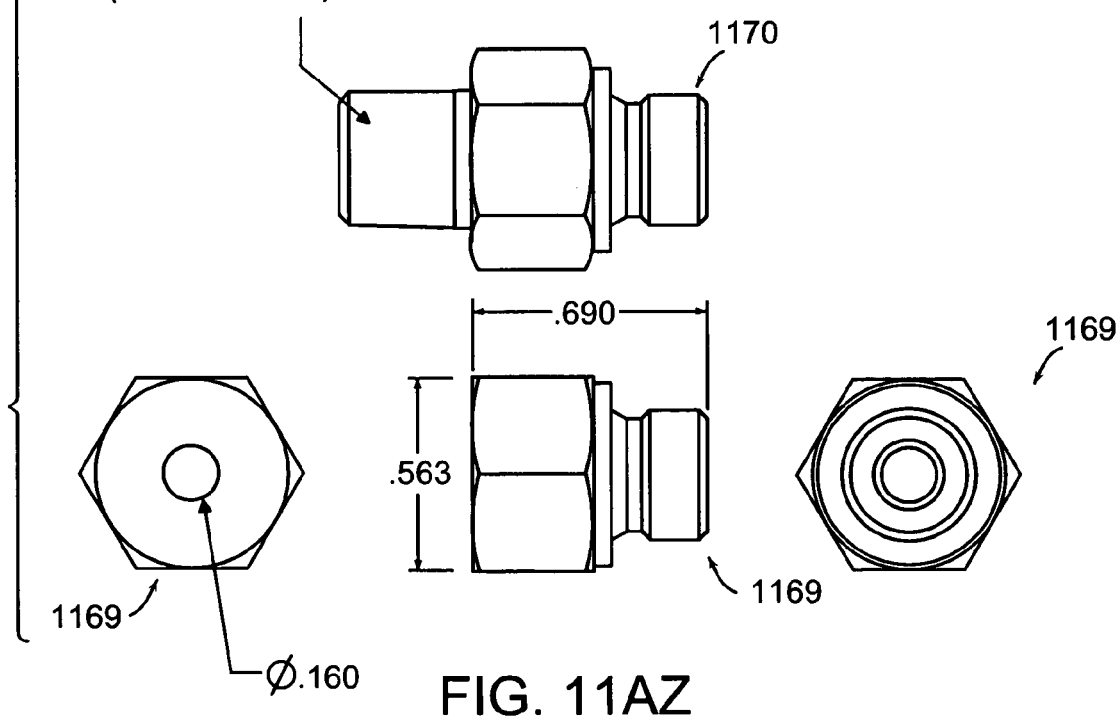
Figure 11B:
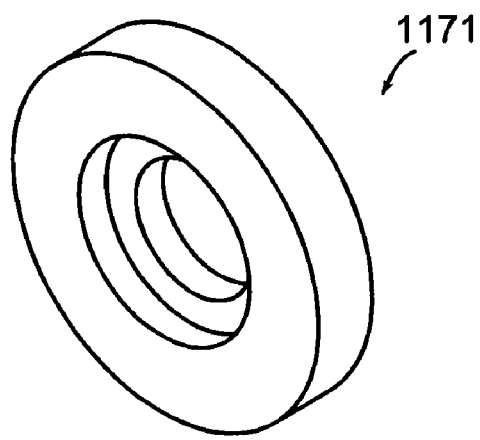
Figure 11B:
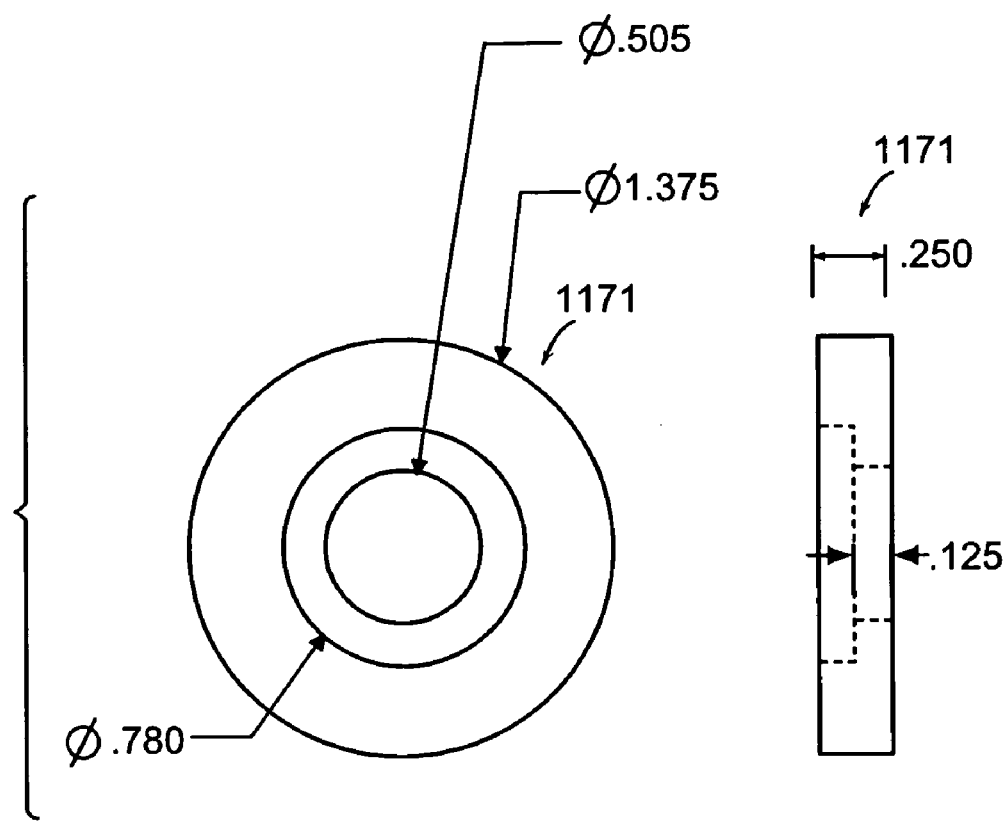
Figure 11B:
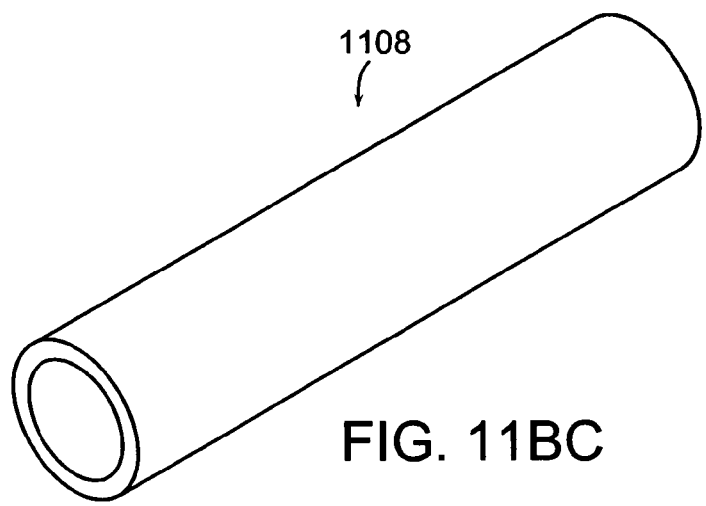
Figure 11B:
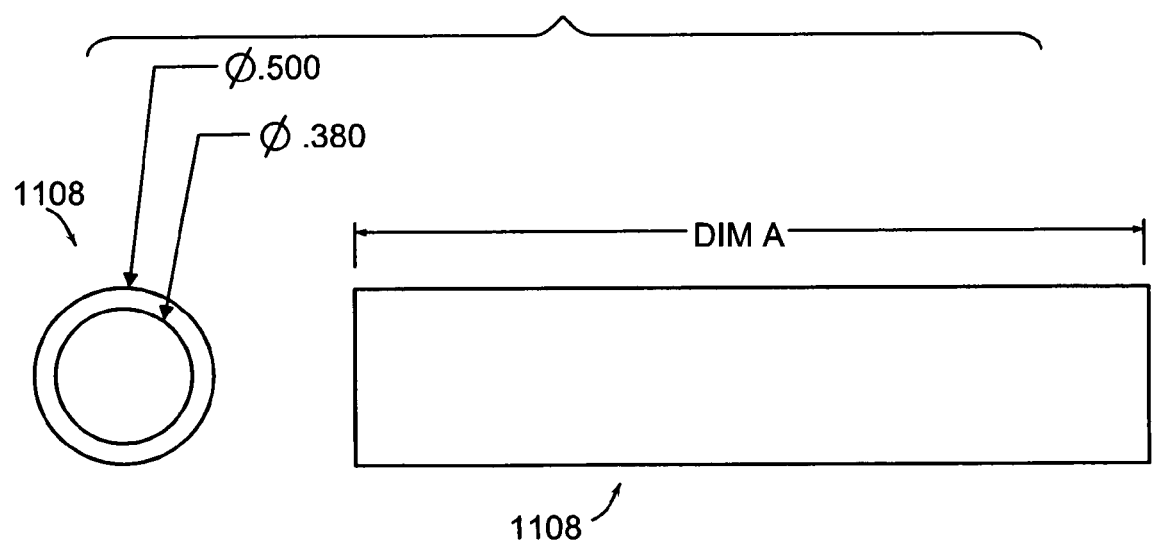
Figure 11B:
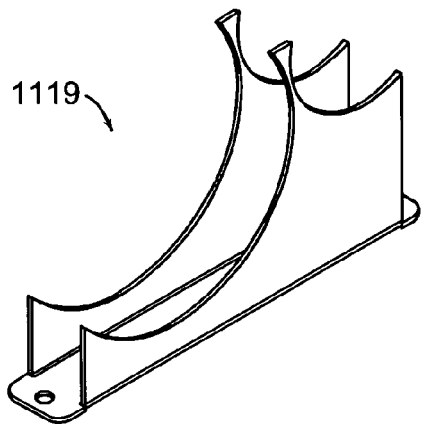
Figure 11B:
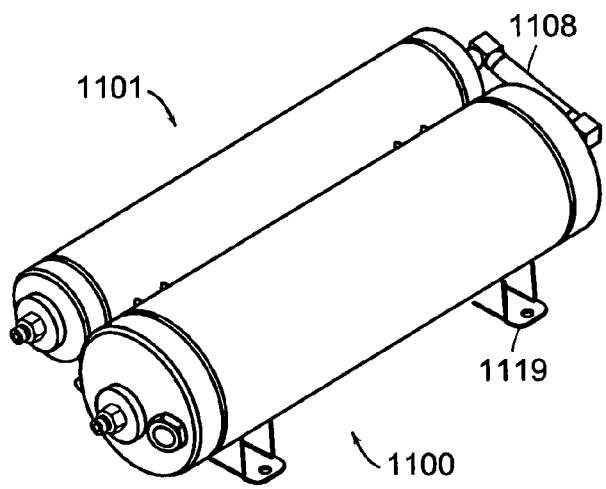
Figure 11B:
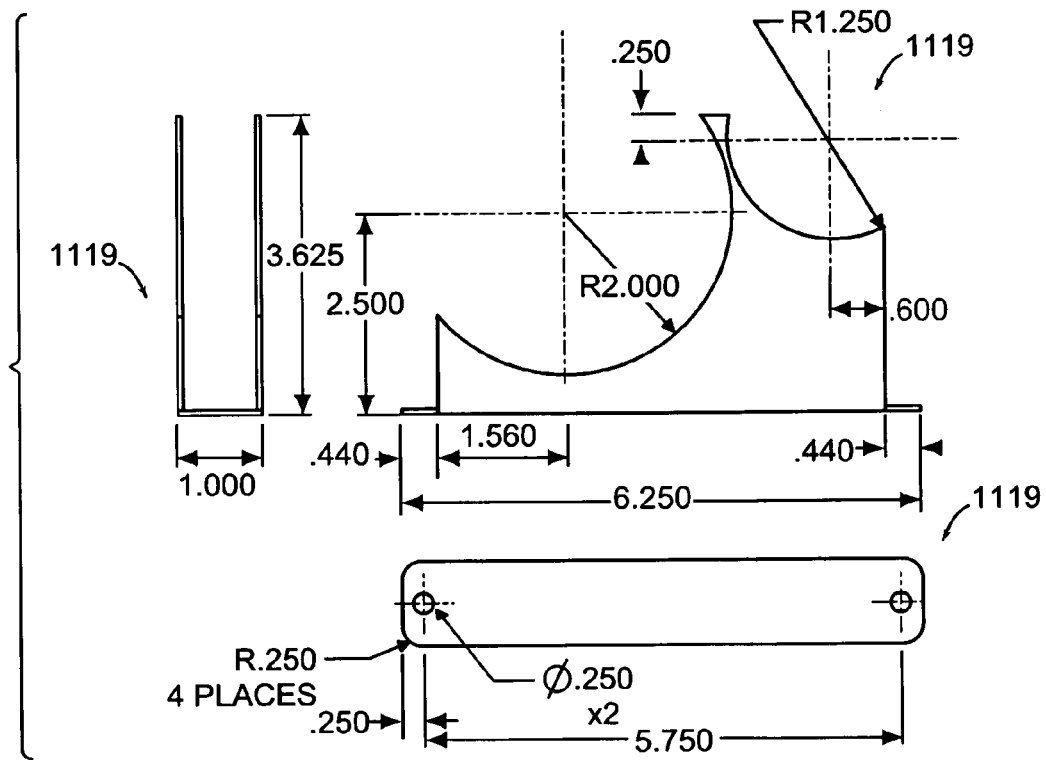
Figure 11B:
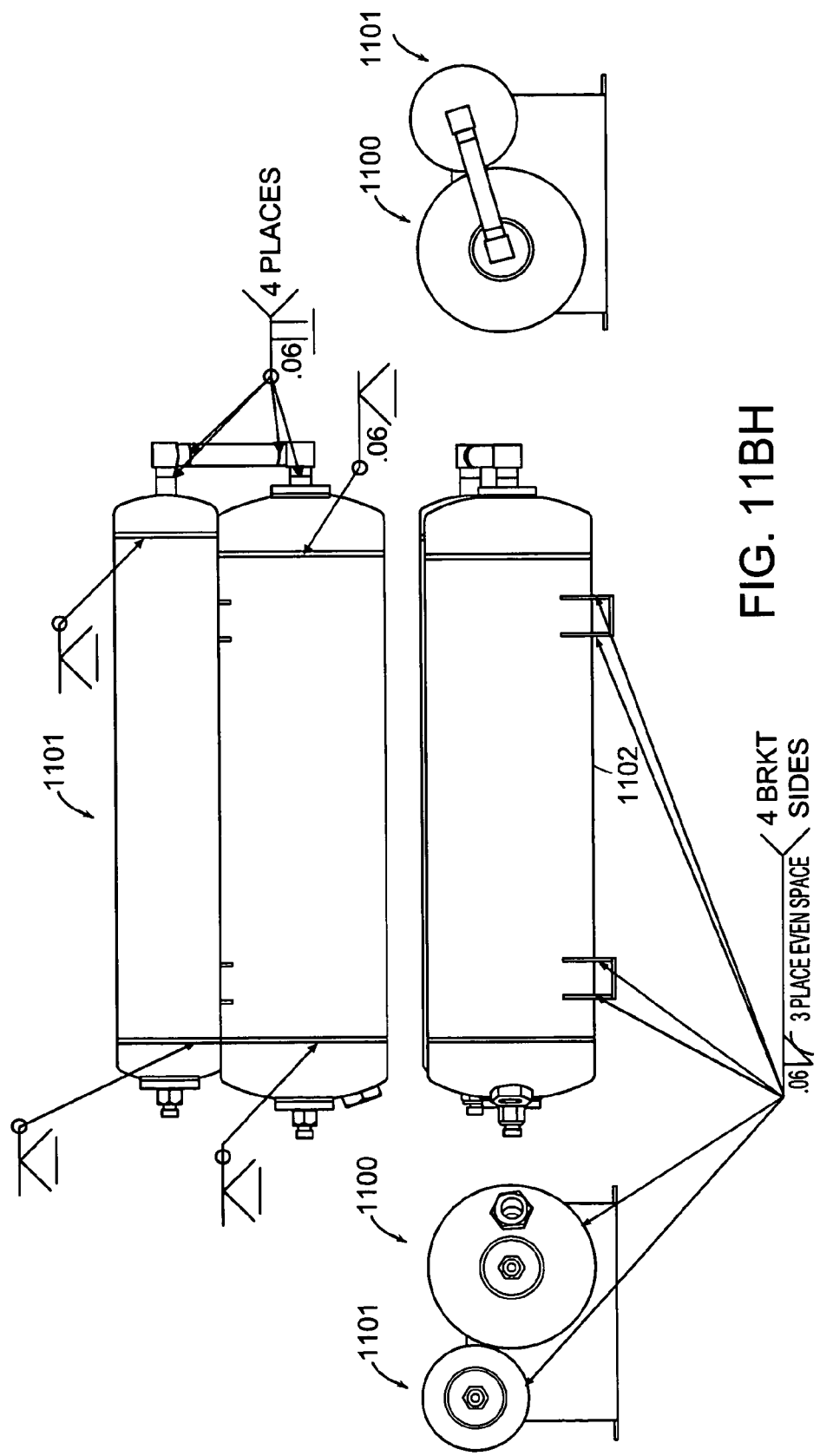
Figure 11B:
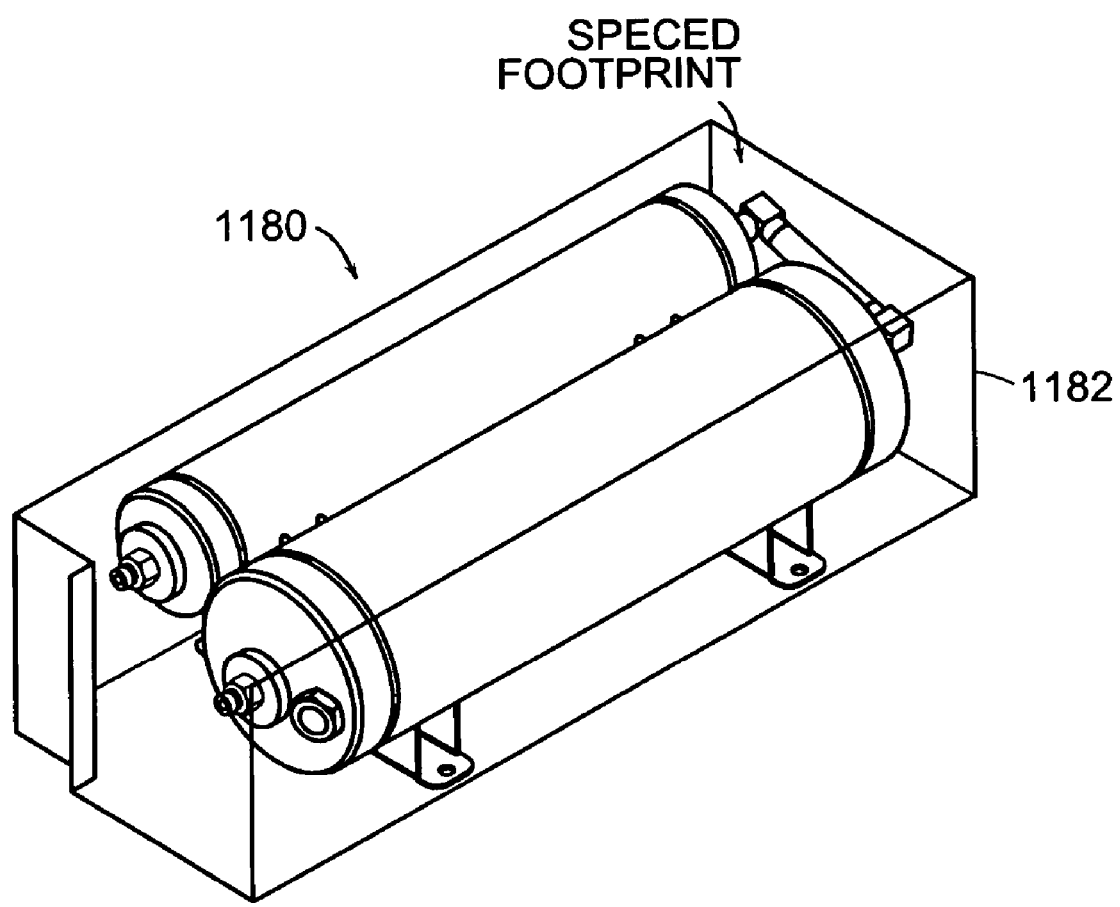
Figure 11B:
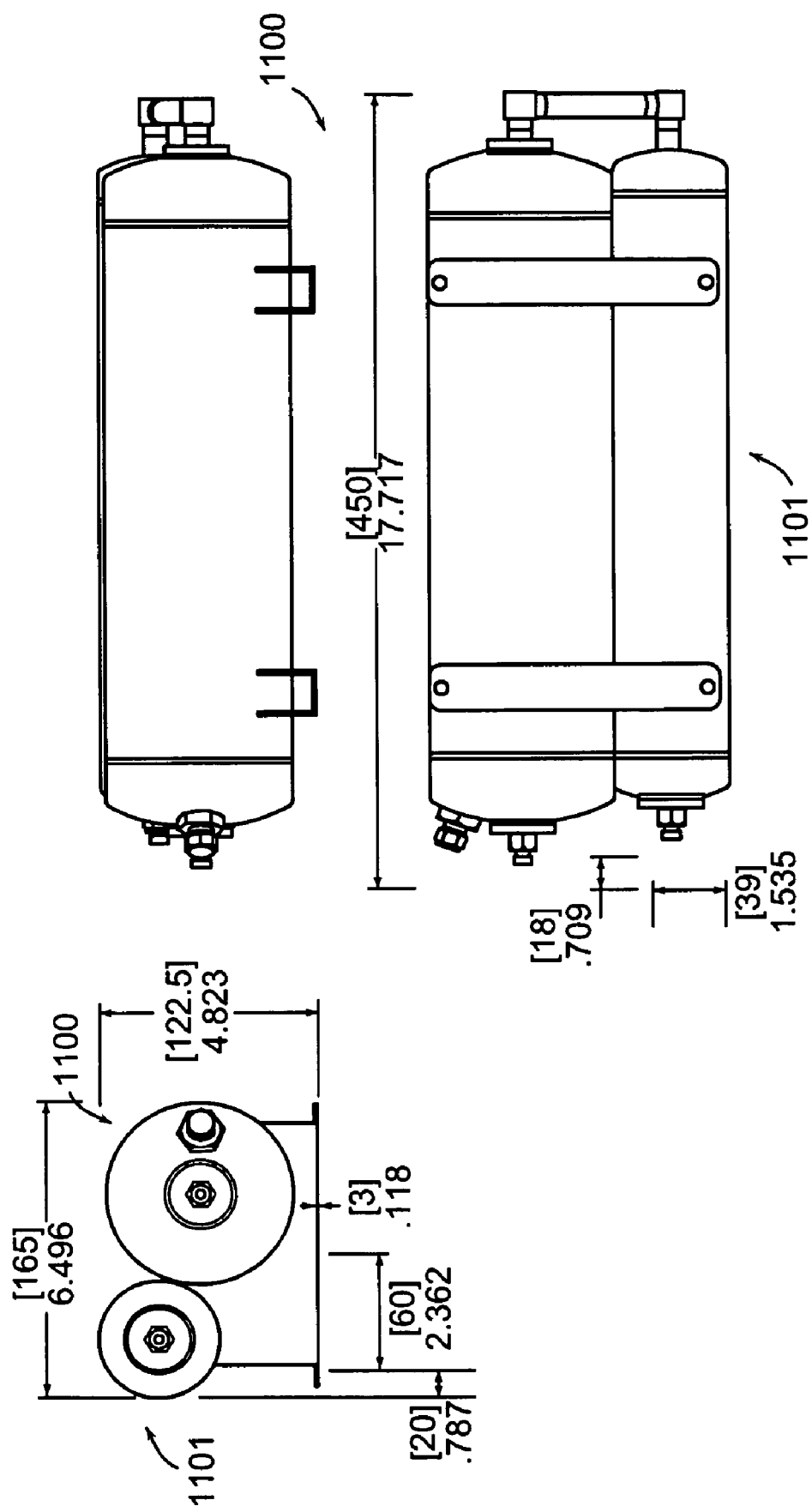

FIG. 11S shows an isometric view, not necessarily to scale, of the inlet end 1114 with an inlet port 1116 and a fill port 1120, while FIGS. 11T–11V show views to scale where indicated dimensions are in inches. FIGS. 11T and 11U present, respectively, end and side views showing the inlet port 1116 and fill port 1120 in the inlet end 1114, and FIG. 11V shows a cross-sectional view along line BB in FIG. 11T. FIGS. 11W–11Z show details of an inlet particle filter 1128 and an inlet interface assembly 1118, 1124. FIG. 11W shows an isometric view, not necessarily to scale, while FIGS. 11X–11Z show views to scale where indicated dimensions are in inches. FIG. 11X shows a side view and FIG. 11Z shows a cross-sectional view along line AA in FIG. 11Y. FIG. 11AA shows an isometric view, not necessarily to scale, of the inlet end with inlet interface assembly 1115 and a portion of the inlet particle filter 1128, while FIGS. 11AB–11AD show views to scale where indicated dimensions are in inches. FIGS. 11AB and 11AC present, respectively, side and end views of the inlet end with inlet interface assembly 1115, and FIG. 11AD shows a cross-sectional view along line AA in FIG. 11AC. In addition, FIG. 11AD shows a fill port assembly 1121 and a portion of the internal chamber 1190 of the gas filter 1100.

FIGS. 11AE–11BB show details of the end caps of the gravity compensator 1101. FIGS. 11AE–11AH show details of the outlet cap 1157, where FIG. 11AE shows an isometric view, not necessarily to scale, and FIGS. 11AF–11AH show views to scale where indicated dimensions are in inches. FIG. 11AH shows a cross-sectional view along line AA in FIG. 11AG FIGS. 11IA–11AL show details of the outlet cap interface assembly 1159 and components thereof 1169, 1171, where FIG. 11AI shows an isometric view, not necessarily to scale, and FIGS. 11AJ–11AL show views to scale where indicated dimensions are in inches. FIG. 11AL shows a cross-sectional view along line AA in FIG. 11AK. FIGS. 11AM–11AP show details of the outlet cap with interface assembly 1167 and components thereof 1169, 1171, where FIG. 11AM shows an isometric view, not necessarily to scale, and FIGS. 11AN–11AP show views to scale where indicated dimensions are in inches. FIG. 11AP shows a cross-sectional view along line AA in FIG. 11AO.

FIGS. 11AQ–11AT show details of the inlet cap 1158, where FIG. 11AQ shows an isometric view, not necessarily to scale, and FIGS. 11AR–11AT show views to scale where indicated dimensions are in inches. FIG. 11AT shows a cross-sectional view along line 11AJ—11AJ in FIG. 11AS. FIGS. 11AU–11AX show details of the inlet cap with interface assembly 1168 and components thereof 1172, where FIG. 11AU shows an isometric view, not necessarily to scale, and FIGS. 11AV–11AX show views to scale where indicated dimensions are in inches. FIG. 11AX shows a cross-sectional view along line 11AX—11AX in FIG. 11AW.

FIGS. 11AY–11BB show further details of the components 1169, 1171 of the outlet cap interface assembly. FIGS. 11AY and 11BA show isometric views, not necessarily to scale, and FIGS. 11AZ and 11AB show views to scale where indicated dimensions are in inches. In addition, FIG. AZ shows a base component 1170 prior to modification to produce one of the components 1169 of the interface assembly.

FIGS. 11BC and 11BD show a portion of the outlet interface assembly 1108, where FIG. 11BC is an isometric view, not necessarily to scale, and FIG. 11BD is to scale where indicated dimensions are in inches. FIGS. 11BE and 11BF show details of a mounting bracket 1119, where FIG. 11BE is an isometric view, not necessarily to scale, and FIG. 11BF shows plan views to scale where indicated dimensions are in inches. FIGS. 11BG and 11BH illustrate various weld placements, these figures are not necessarily to scale.

FIGS. 11BI and 11BJ illustrate various detailed views of a preferred embodiment of the reactive gas filter 1100 with gravity compensator 1101 of FIGS. 11A–11BH. In FIGS. 11BI and 11BJ, square bracketed dimensions are in millimeters and unbracketed dimensions in inches. In a preferred embodiment 1180, a the gas filter 1100 and compensator 1101 fit within the three-dimensional footprint 1182 illustrated as a shadow-box about the filter and compensator.

In one preferred embodiment, the components, materials and hardware of FIGS. 11A–11BJ are as follows:

0.083" wall, 4" OD 304 SS Pipe, 1102;
Swagelok ¼"×½" Pipe Bushing SS, 1121;
4" OD Pipe Cap Cherry-Burrel (37-103) SS without Fill Spout Hole, 1104;
4" OD Pipe Cap Cherry-Burrel (37-103) SS with Fill Spout Hole, 1114;
½" Tube to Fitting Flange, 1137;
304 SS Flange Weld Assembly, 1171;
304 SS Flange Weld Assembly, 1124;
304 SS Flange Weld Assembly, 1137;
2.5" OD Pipe Cap Cherry Burrell (37-101) SS, 1158;
2.5" OD Pipe Cap Cherry Burrell (37-101) SS, 1157;
Machined ⅛" BSP to ⅛" NPT Swagelok SS Interface, 1118;
Mott Corp., GasShield ™ brand Concentric Tube Particle Filter, (part no. 2390804), 1128;
0.06 Wall SS Tube, 1138;
Mott Corp., GasShield™ brand Concentric Tube Particle Filter, (part no. 2390804), 1136;
Machined ⅛" BSP to ⅛" NPT Swagelok SS, 1169;
0.065 wall, 2.5" OD SS pipe, 1152; and
½", 90 degree union elbow swagelok with weld fitting, 1112.

Figure 12A:
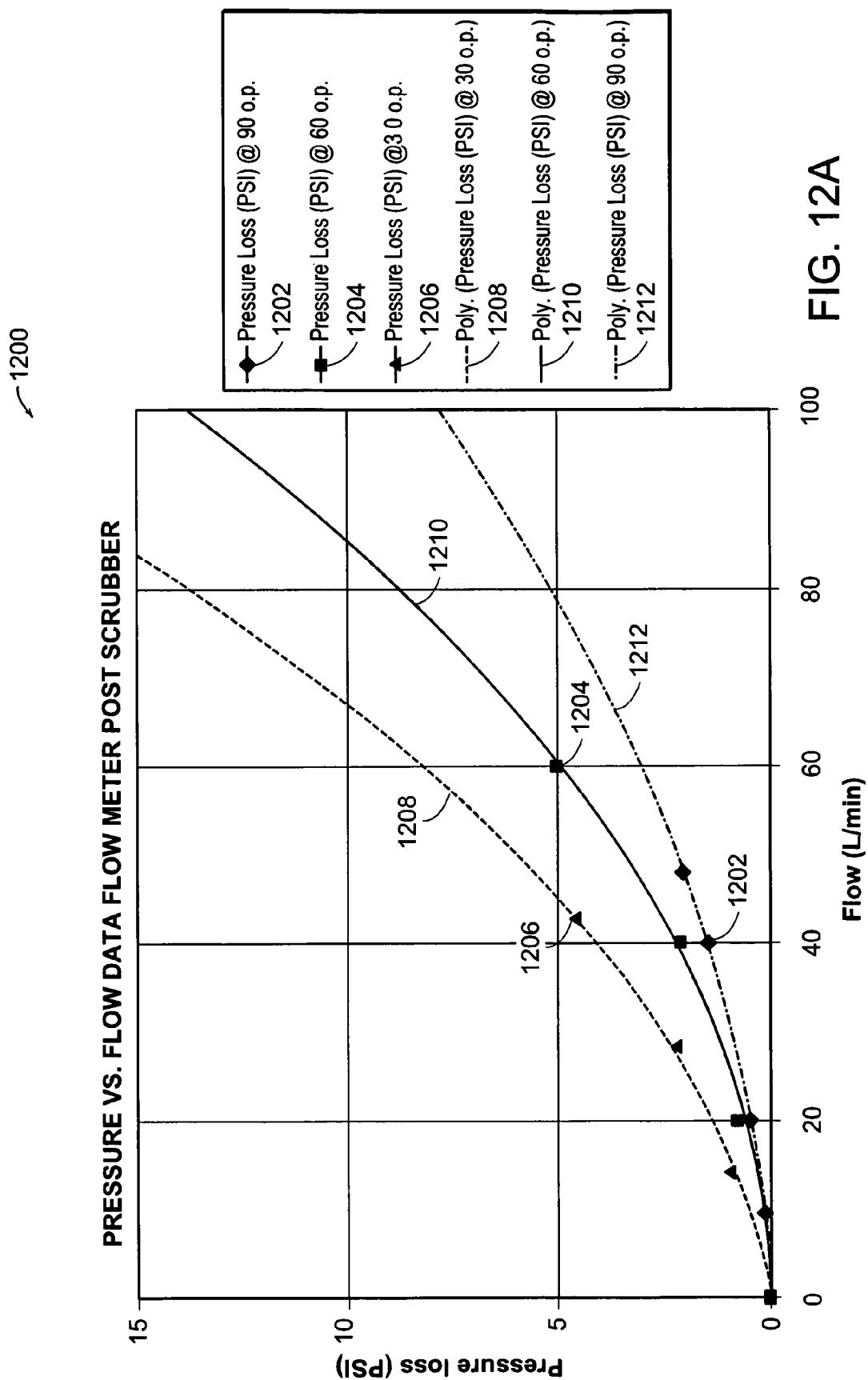
FIGS. 12A–12B are plots of pressure drop versus flow rate at various inlet gas stream pressures for gas filters substantially similar to those illustrated in FIGS. 11A–11Z, 11AA–11AZ, and 11BA–11BJ.
Figure 12B:
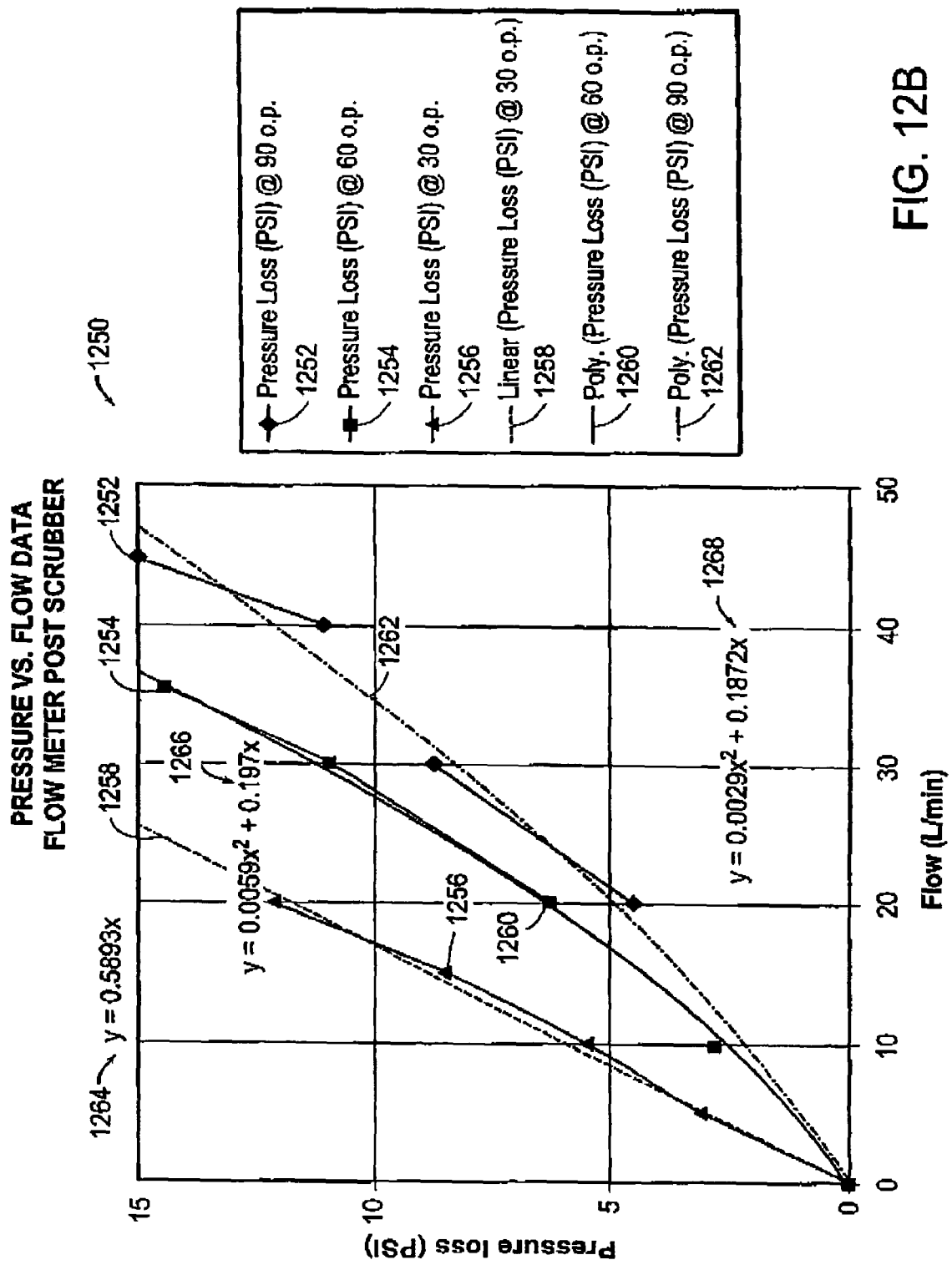

FIGS. 12A and 12B show pressure drop test results for a gas filter in accordance with the invention that is substantially similar to the preferred embodiment of FIGS. 11A–11BJ. Pressure drop measurements are for the pressure drop across the gas filter 1100 and the gravity compensator 1101. The gravity compensator 1101 was empty and did not include any filter media. FIGS. 12A and 12B plot pressure drop (in psi) versus flow rate (in slpm) at various inlet gas stream pressures. The test results shown in FIG. 12A are for a gas filter without filter media and the test results shown in 12B are for a gas filter with a filter media. In both FIGS. 12A and 12B the test was conducted with the gas flow meter positioned after the gas filter/gravity compensator combination. The volume of filter media in the test of FIG. 12B was about 2.6 liters and comprised about 80% GAC with an average mesh size in the range from about 20 U.S. mesh to about 50 U.S. mesh, about 10% potassium carbonate treated GAC with an average mesh size in the range from about 20 U.S. mesh to about 50 U.S. mesh, and about 10% phosphoric acid treated GAC with an average mesh size in the range from about 20 U.S. mesh to about 50 U.S. mesh.

FIG. 12A shows a plot 1200 for of pressure loss for inlet gas pressures of 30 psig, 60 psig and 90 psig. The diamonds 1202 are actual data points for 90 psig, the squares 1204 for 60 psig, and the triangles 1206 for 30 psig inlet gas pressures. Also shown are polynomial fits to the data. The plot shows: a polynomial fit to the 30 psig data 1208; a polynomial fit to the 60 psig data 1210; and a polynomial fit to the 90 psig data 1212.

Figure 13A:
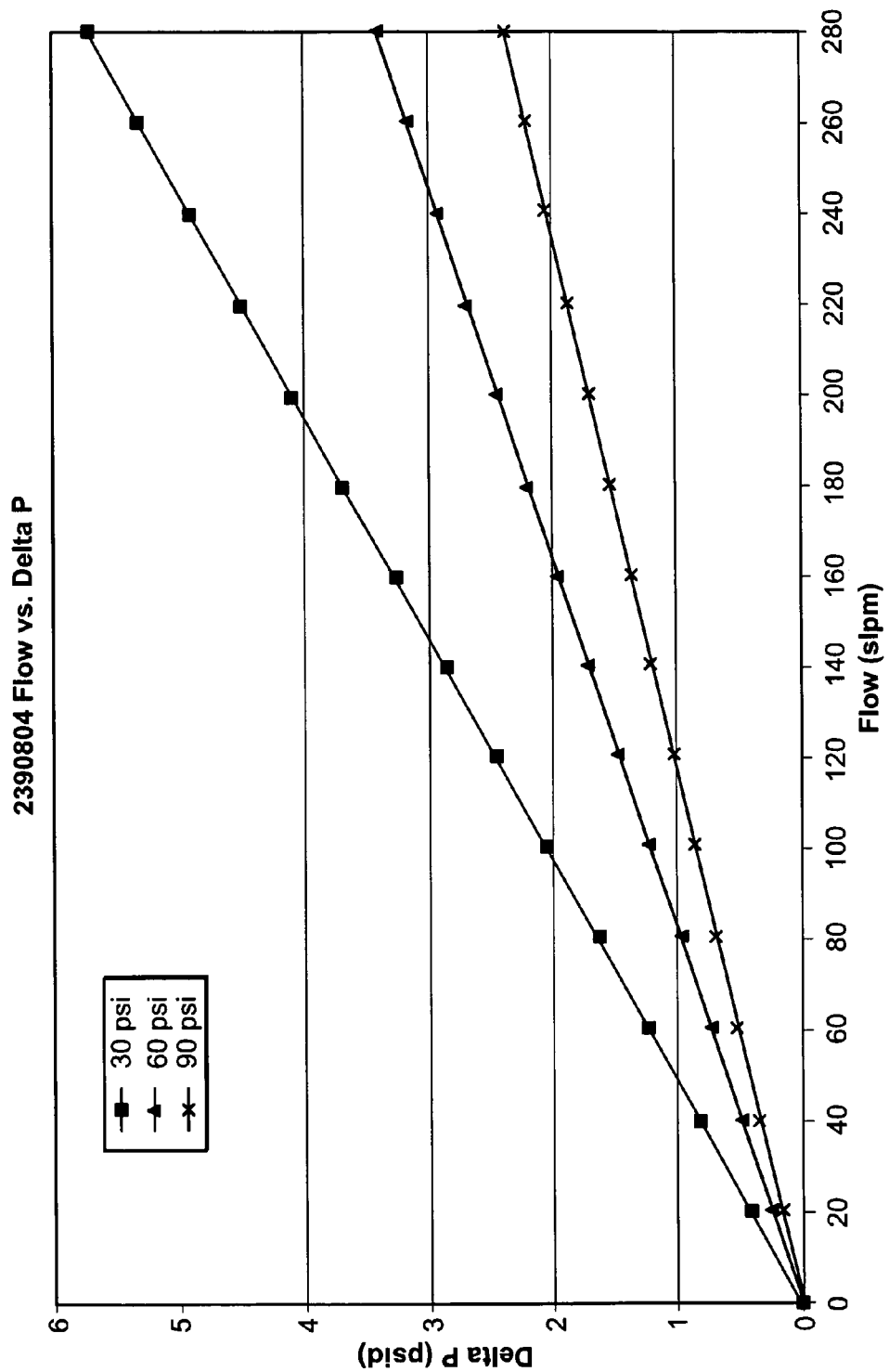
FIGS. 13A–13C are plots of pressure drop versus flow rate at various inlet gas stream pressures for a Mott Corporation high purity concentric tube particle filter part number 2390804.
Figure 13B:
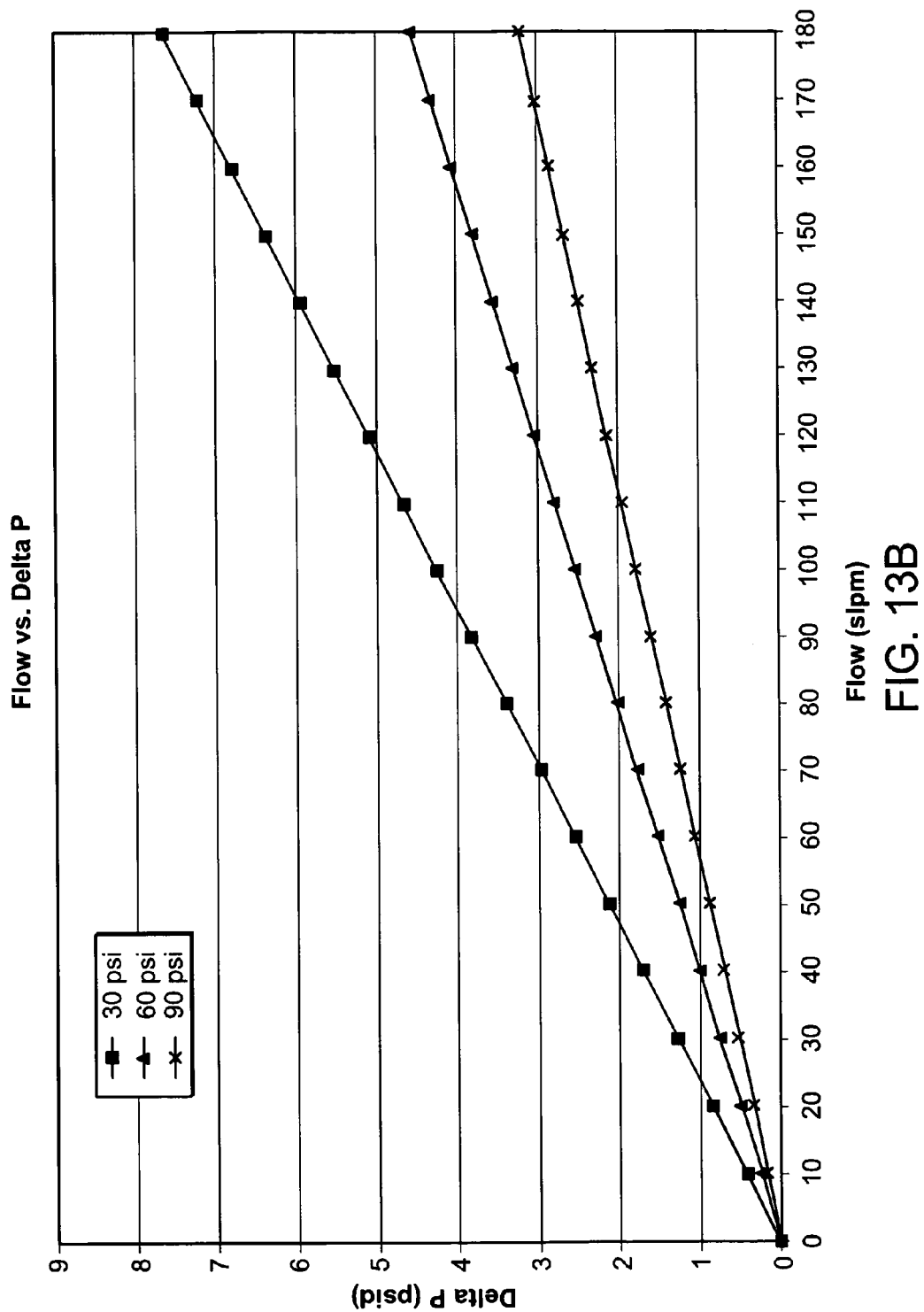
Figure 13C:
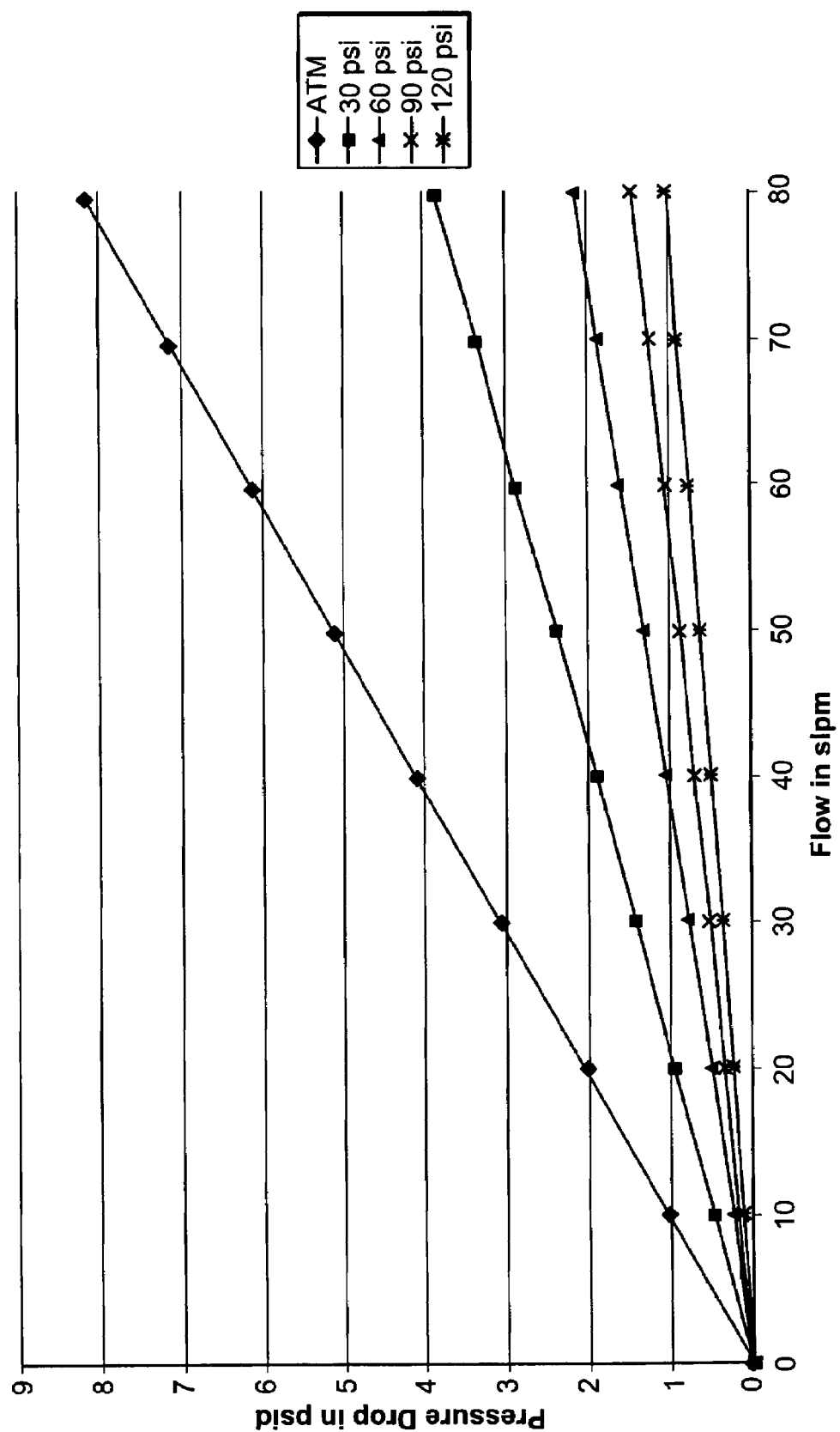

FIG. 12B shows a plot 1250 of pressure for inlet gas pressures of 30 psig, 60 psig and 90 psig. The diamonds 1252 are actual data points for 90 psig, the squares 1254 for 60 psig, and the triangles 1256 for 30 psig inlet gas pressures. Also shown are fits to the data and the formulas for the fitted equations noted on and about the plot. The plot shows: a linear fit to the 30 psig data 1258 and fitted function 1264; a polynomial fit to the 60 psig data 1260 and fitted function 1266; and a polynomial fit to the 90 psig data and fitted function 1268. FIGS. 13A–13C show plots of pressure drop (in psi) versus flow rate (in slpm) at various inlet gas stream pressures for a Mott Corporation high purity concentric tube particle filter part number 2390804. FIGS. 13A and 13B show plots for inlet gas pressures of 30 psig, 60 psig arid 90 psig, where FIG. 13A shows a plot for flow rates up to 280 slpm and FIG. 13B shows a plot of the same data up to 180 slpm. FIG. 13C shows a plot of the same data of FIGS. 13A and 13B for flow rates up to 80 slpm and also data for inlet gas pressures of atmosphere (ATM or 0 psig) and 120 psig. In FIGS. 13A–13C, the squares are actual data points for 30 psig, the triangle for 60 psig, and the x's for 90 psig inlet gas pressures; while in FIG. 13C the diamonds are actual data points for atmosphere and the asterisks for 120 psig inlet gas pressures. Also shown in FIGS. 13A–13C are lines, illustrating the linearity of the data.

In view of the wide variety of embodiments to which the principles of the present invention can be applied, it should be understood that the illustrated embodiments are exemplary only, and should not be taken as limiting the scope of the present invention. The claims should not be read as limited to the described order or elements unless stated to that effect. Therefore, all embodiments that come within the scope and spirit of the following claims and equivalents thereto are claimed as the invention.

What is claimed:

1. A gas filter for a reactive gas comprising:
a container comprising
a substantially cylindrical tube portion having an inlet end, an outlet end, and an internal charter;
an inlet port having an inlet particle filter that extends into the internal chamber;
an outlet port having an outlet particle filter that extends into the internal chamber; and
a filter media that fills the internal charter, the gas filter supplying an output gas stream having a concentration of ammonia of no greater than about 1 ppbv and a concentration of sulfur dioxide no greater than about 1 ppbv for an input gas stream having a concentration of ammonia no greater than about 10 ppbv and a concentration of sulfur dioxide no greater than about 5 ppbv, the gas filter having a pressure drop of no greater than about 35 psi for an input gas stream pressure in the range from about 70 psi to about 100 psi and an inlet gas stream flow rate in the range from about 20 slpm to about 50 slpm.

2. The gas filter of claim 1, the inlet end further having a fill port.

3. The gas filter of claim 1, wherein the substantially cylindrical tube portion has a central axis and one of the inlet port and outlet port is offset from the central axis and the other of the inlet port and outlet port is substantially on the central axis.

4. The gas filter of claim 1, wherein the substantially cylindrical tube portion has a central axis and the inlet port and outlet port are offset from the central axis.

5. The gas filter of claim 1, wherein at least one of the inlet particle filter and outlet particle filter comprise a porous nickel particle filter capable of filtering particles having a diameter of about 0.003 microns or greater.

6. The gas filter of claim 1, wherein the reactive gas comprises clean dry air.

7. The gas filter of claim 1, wherein the volume of filter media is no greater than about 3.0 liters.

8. The gas filter of claim 1, wherein the filter media comprises granulated activated charcoal (GAC).

9. The gas filter of claim 1, wherein the filter media comprises phosphoric acid treated granulated activated charcoal.

10. The gas filter of claim 1, wherein the filter media comprises potassium carbonate treated granulated activated charcoal.

11. The gas filter of claim 1, wherein the filter media comprises two or more bedded filter materials.

12. The gas filter of claim 1, wherein the filter media comprises a bed substantially of a GAC filter material and a bed comprising a phosphoric acid treated granulated activated charcoal filter material.

13. The gas filter of claim 11, wherein the filter media further comprises a potassium carbonate treated GAC filter material.

14. The gas filter of claim 1, wherein the gas filter supplies an output gas stream having a concentration of hexamethyldisiloxane (HMDSO) of no greater than about 10 ppbv for an input gas stream having a concentration of condensable organics no greater than about 100 ppbv.

15. A gas filter for a reactive gas comprising:
a container comprising
a substantially cylindrical tube portion having an inlet end, an outlet end, and an internal chamber;
an inlet port having an inlet particle filter that extends into the internal chamber;
an outlet port having an outlet particle filter that extends into the internal chamber; and
a filter media in the internal chamber, the filter media having a volume of no greater than about 0.5 liters, the gas filter supplying an output gas stream having a concentration of ammonia of no greater than about 1 ppbv and a concentration of sulfur dioxide no greater than about 1 ppbv for an input gas stream having a concentration of ammonia no greater than about 10 ppbv and a concentration of sulfur dioxide no greater than about 5 ppbv, the gas filter having a pressure drop of no greater than about 35 psi for an input gas stream pressure in the range from about 70 psi to about 100 psi and an inlet gas stream flow rate in the range from about 20 slpm to about 50 slpm.

16. The gas filter of claim 15, the inlet end further having a fill port.

17. The gas filter of claim 15, wherein the substantially cylindrical tube portion has a central axis and one of the inlet port and outlet port is offset from the central axis and the other of the inlet port and outlet port is substantially on the central axis.

18. The gas filter of claim 15, wherein the substantially cylindrical tube portion has a central axis and the inlet port and outlet port are offset from the central axis.

19. The gas filter of claim 15, wherein at least one of the inlet particle filter and outlet particle filter comprise a porous nickel particle filter capable of filtering particles having a diameter of about 0.003 microns of greater.

20. The gas filter of claim 15, wherein the reactive gas comprises clean dry air.

21. The gas filter of claim 15, wherein the filter media comprises granulated activated charcoal (GAC).

22. The gas filter of claim 15, wherein the filter media comprises phosphoric acid treated granulated activated charcoal.

23. The gas filter of claim 15, wherein the filter media comprises potassium carbonate treated granulated activated charcoal.

24. The gas filter of claim 15, wherein the filter media comprises two or more bedded filter materials.

25. The gas filter of claim 15, wherein the filter media comprises a bed substantially of a GAC filter material and a bed comprising a phosphoric acid treated granulated activated charcoal filter material.

26. The gas filter of claim 24, wherein the filter media further comprises a potassium carbonate treated GAC filter material.

27. The gas filter of claim 15, wherein the gas filter supplies an output gas stream having a concentration of hexamthyldisiloxane (HMDSO) of no greater than about 10 ppbv for an input gas stream having a concentration of condensable organics no greater than about 100 ppbv.

* * * * *